(12) United States Patent
Lee et al.

(10) Patent No.: US 12,468,169 B2
(45) Date of Patent: Nov. 11, 2025

(54) CAMERA ACTUATOR AND CAMERA MODULE COMPRISING SAME

(71) Applicant: LG INNOTEK CO., LTD., Seoul (KR)

(72) Inventors: Hyun Joong Lee, Seoul (KR); Jeong Gi You, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 449 days.

(21) Appl. No.: 18/042,364

(22) PCT Filed: Aug. 17, 2021

(86) PCT No.: PCT/KR2021/010859
§ 371 (c)(1),
(2) Date: Feb. 21, 2023

(87) PCT Pub. No.: WO2022/039463
PCT Pub. Date: Feb. 24, 2022

(65) Prior Publication Data
US 2023/0314830 A1 Oct. 5, 2023

(30) Foreign Application Priority Data

Aug. 19, 2020 (KR) .......... 10-2020-0104098
Oct. 21, 2020 (KR) .......... 10-2020-0136640

(51) Int. Cl.
G02B 27/64 (2006.01)
G03B 5/00 (2021.01)

(52) U.S. Cl.
CPC .......... G02B 27/646 (2013.01); G03B 5/00 (2013.01); G03B 2205/0023 (2013.01)

(58) Field of Classification Search
None
See application file for complete search history.

(56) References Cited

U.S. PATENT DOCUMENTS

2014/0139694 A1  5/2014  Grandin et al.
2015/0181122 A1  6/2015  Kang
2019/0268515 A1  8/2019  Im et al.

FOREIGN PATENT DOCUMENTS

CN    111367036 A      7/2020
JP    2015-11353 A     1/2015
KR    10-2010-0075763 A  7/2010

(Continued)

OTHER PUBLICATIONS

Office Action dated Jan. 10, 2025 in Korean Application No. 10-2020-0104098.

(Continued)

Primary Examiner — Richard H Kim
(74) Attorney, Agent, or Firm — Saliwanchik, Lloyd & Eisenschenk

(57) ABSTRACT

An embodiment of the present invention provides a camera actuator comprising: a housing; a mover disposed inside the housing and including an optical member; a tilting guide part for guiding tilting of the mover; and a driving part disposed inside the housing and driving the motor, wherein, the driving part comprises at least one magnet and at least one coil, and the at least one magnet at least partially overlaps the tilting guide part in a first direction perpendicular to an optical axis or in a second direction perpendicular to the optical axis.

20 Claims, 43 Drawing Sheets

(56) References Cited

FOREIGN PATENT DOCUMENTS

| KR | 10-2018-0116965 A | 10/2018 |
|---|---|---|
| KR | 10-1942743 B1 | 1/2019 |
| KR | 10-2020-0041062 A | 4/2020 |
| KR | 10-2020-0086482 A | 7/2020 |
| WO | 2020/076112 A1 | 4/2020 |

OTHER PUBLICATIONS

International Search Report dated Nov. 8, 2021 in International Application No. PCT/KR2021/010859.
Supplementary European Search Report dated Jan. 19, 2024 in European Application No. 21858550.3.

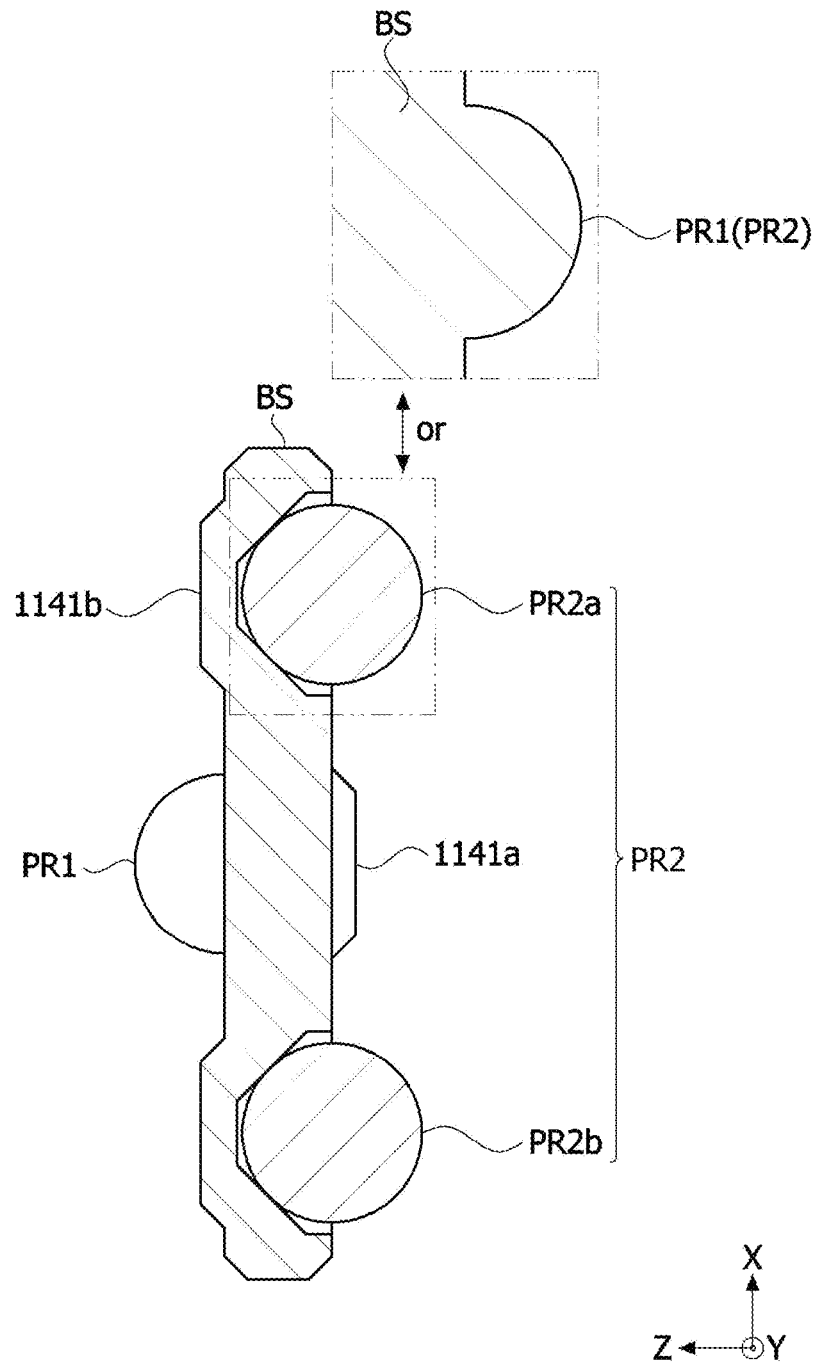

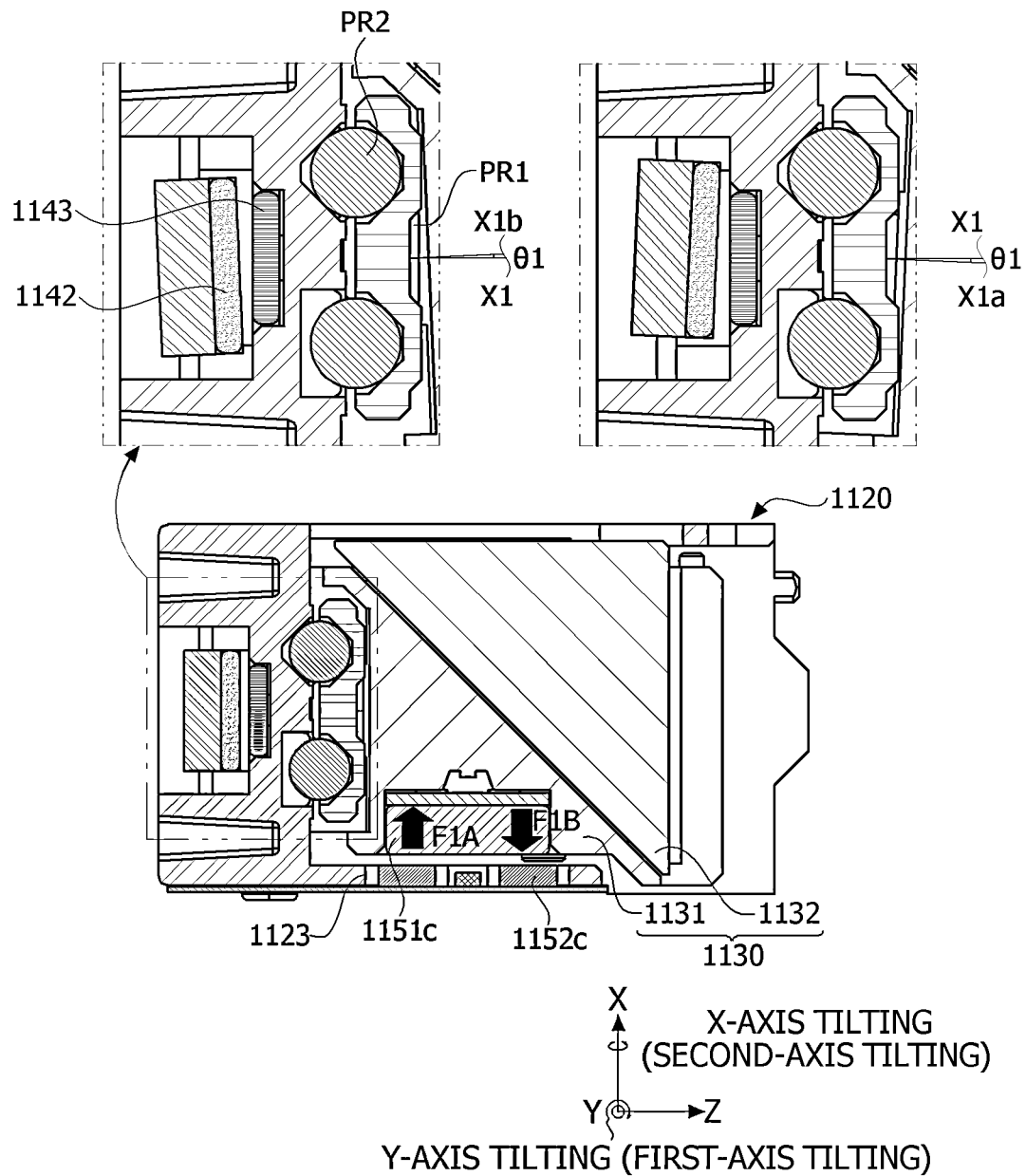

Y-AXIS TILTING (FIRST-AXIS TILTING)

X-AXIS TILTING (SECOND-AXIS TILTING)

ated Aug. 19, 2020; and 10-2020-0136640, filed Oct. 21, 2020, the disclosures of each of which are incorporated herein by reference in their entirety.

CAMERA ACTUATOR AND CAMERA MODULE COMPRISING SAME

CROSS-REFERENCE TO RELATED APPLICATIONS

This application is the U.S. national stage application of International Patent Application No. PCT/KR2021/010859, filed Aug. 17, 2021, which claims the benefit under 35 U.S.C. § 119 of Korean Application Nos. 10-2020-0104098, filed Aug. 19, 2020; and 10-2020-0136640, filed Oct. 21, 2020, the disclosures of each of which are incorporated herein by reference in their entirety.

TECHNICAL FIELD

The present invention relates to a camera actuator and a camera module including the same.

BACKGROUND ART

Cameras are devices for taking pictures or videos of subjects and are mounted on portable devices, drones, vehicles, or the like. A camera module may have an image stabilization (IS) function of correcting or inhibiting the image shake caused by the movement of a user in order to improve the quality of an image, an auto focusing function of aligning a focal length of a lens by automatically adjusting an distance between an image sensor and the lens, and a zoom function of capturing a remote subject by increasing or decreasing the magnification of the remote subject through a zoom lens.

Meanwhile, the greater the number of pixels in the image sensor, the higher the resolution and the smaller the size of each pixel, but the smaller the pixels, the less the amount of light received in the same period of time. Therefore, as the number of pixels of the camera increases, the image shake caused by hand shaking occurring when a shutter speed is decreased in a dark environment may more severely occur. As a representative image stabilization (IS) technique, there is an optical image stabilizer (OIS) technique of correcting motion by changing a path of light.

According to the general OIS technique, the motion of the camera may be detected through a gyro sensor or the like, and a lens may be tilted or moved based on the detected motion, or a camera module including a lens and an image sensor may be tilted or moved. When the lens or the camera module including the lens and the image sensor is tilted or moved for OIS, it is necessary to additionally secure a space for tilting or moving around the lens or the camera module.

Meanwhile, an actuator for OIS may be disposed around the lens. In this case, the actuator for OIS may include actuators responsible for tilting about two axes perpendicular to a Z-axis, which is an optical axis, i.e., an actuator responsible for X-axis tilting and an actuator responsible for Y-axis tilting.

However, according to the needs of ultra-slim and ultra-small camera modules, there is a large space constraint for arranging the actuator for OIS, and it may be difficult to secure a sufficient space where the lens or the camera module itself including the lens and the image sensor may be tilted or moved for OIS. In addition, as the number of pixels in the camera increases, it is preferable that a size of the lens be increased to increase the amount of received light, but there may be a limit to increasing the size of the lens due to a space occupied by the actuator for OIS.

In addition, when a zoom function, an AF function, and an OIS function are all included in the camera module, there is also a problem that an OIS magnet and an AF or zoom magnet are disposed close to each other to cause magnetic field interference.

In addition, there are a problem of a large moment difference due to a posture difference and a need for energy efficiency improvement.

Technical Problem

The present invention is directed to providing a camera actuator capable of accurate rotation driving such as the suppression of errors due to a posture difference.

In addition, the present invention is directed to providing a camera actuator with improved reliability by improving the stiffness of a housing.

In addition, the present invention is directed to providing a camera actuator in which the center of gravity is positioned adjacent to a rotational axis or a rotational surface, thereby minimizing a change in moment due to a posture difference.

In addition, the present invention is directed to providing a camera actuator with improved energy efficiency for rotation driving.

In addition, the present invention is directed to providing a camera actuator in which tilting of a mover is easily controlled through a plurality of coils.

In addition, the present invention is directed to providing a camera actuator applicable to ultra-slim, ultra-small, and high-resolution cameras.

The objects of the embodiments are not limited thereto and will also include the objects or effects that can be identified from the configurations or embodiments, which will be described below.

Technical Solution

A camera actuator according to an embodiment of the present invention includes a housing, a mover disposed in the housing and including an optical member, a tilting guide part configured to guide tilting of the mover, and a driving part disposed in the housing and configured to drive the mover, wherein the driving part includes at least one magnet and at least one coil, and at least a portion of the at least one magnet overlaps the tilting guide part in a first direction perpendicular to an optical axis or in a second direction perpendicular to the optical axis.

The mover may include a holder on which the optical member is seated, and the holder may include a first holder outer surface, a second holder outer surface facing the first holder outer surface, and a third holder outer surface disposed on a lower portion of the holder between the first holder outer surface and the second holder outer surface.

The at least one magnet may include a first magnet disposed on the first holder outer surface and a second magnet disposed on the second holder outer surface, and the first magnet and the second magnet may overlap in the second direction.

The tilting guide part may include a base, a first protrusion protruding from a first surface of the base and a second protrusion protruding from a second surface of the base, and the first protrusion may be disposed between the mover and the base.

The first protrusion may overlap the first magnet and the second magnet in the second direction.

At least a portion of the base may overlap the first magnet and the second magnet in the second direction.

The at least one magnet may further include a third magnet disposed on the third holder outer surface, and at least a portion of the third magnet may overlap the first protrusion in the first direction.

The mover may include a holder coupled to the optical member and a fastening member coupled to the holder, the fastening member may pass through one side portion of the housing and include a first groove disposed in an inner surface thereof, and the housing may include a second groove disposed in an outer surface of the one side portion of the housing.

The camera actuator may further include a first magnetic substance disposed in the first groove and a second magnetic substance disposed in the second groove.

The tilting guide part may be in close contact with the one side portion of the housing and the holder by a repulsive force between the first magnetic substance and the second magnetic sub stance.

A camera actuator according to an embodiment includes a mover including a reflective member, a tilting guide part configured to guide tilting of the mover, and a driving part configured to drive the mover, wherein the driving part includes at least one magnet and at least one coil, and at least a portion of the driving part overlaps the tilting guide part in a direction perpendicular to an optical axis.

The mover may include a holder on which the reflective member is seated, and the holder may include a first holder outer surface, a second holder outer surface facing the first holder outer surface, and a third holder outer surface disposed on a lower portion of the holder between the first holder outer surface and the second holder outer surface.

The at least one magnet may include a first magnet disposed adjacent to the first holder outer surface and a second magnet disposed on the second holder outer surface, the at least one coil may include a first coil corresponding to the first magnet and a second coil corresponding to the second magnet, the first magnet and the second magnet may overlap in a second direction, and the first coil and the second coil may overlap in the second direction.

The tilting guide part may include a base, a first protrusion protruding from a first surface of the base, and a second protrusion protruding from a second surface of the base, and the first protrusion may be disposed between the mover and the base.

The first protrusion may overlap the first magnet, the second magnet, the first coil, and the second coil in the second direction.

At least a portion of the base may overlap the first magnet, the second magnet, the first coil, and the second coil in the second direction.

The at least one magnet may further include a third magnet disposed adjacent to the third holder outer surface, and at least a portion of the third magnet may overlap the first protrusion in the direction perpendicular to the optical axis.

The at least one coil may further include a third coil corresponding to the third magnet, and at least a portion of the third coil may overlap the first protrusion in a first direction.

A camera actuator according to an embodiment includes a mover including a reflective member, a tilting guide part configured to guide tilting of the mover, and a magnet or a coil disposed on the mover, wherein the mover includes a first sidewall on which the magnet or the coil is disposed and a second sidewall disposed perpendicular to the first sidewall and including a cavity in which the tilting guide part is disposed, and at least a portion of the cavity overlaps at least a portion of the magnet or the coil in a direction perpendicular to an optical axis.

At least a portion of the tilting guide part may be in contact with the at least a portion of the cavity.

A camera actuator according to an embodiment of the present invention includes a housing, a mover disposed in the housing and including an optical member, and a driving part disposed in the housing and configured to move the mover, wherein the driving part includes a driving magnet and a driving coil facing the driving magnet, the driving coil includes a first coil part including a 1-1 coil and a 1-2 coil disposed side by side in a first direction and a second coil part including a 2-1 coil and a 2-2 coil disposed side by side in the first direction, the 1-1 coil and the 2-1 coil are disposed to overlap in a second direction perpendicular to the first direction, the 1-2 coil and the 2-2 coil are disposed to overlap in the second direction, the 1-1 coil includes a 1-1 winding portion turning from one end toward the other end, the 1-2 coil includes a 1-2 winding portion turning from one end toward the other end, the 2-1 coil includes a 2-1 winding portion turning from one end toward the other end, the 2-2 coil includes a 2-2 winding portion turning from one end toward the other end, each of the 1-1 winding portion and the 2-2 winding portion winds from one end to the other end in any one of clockwise and counterclockwise directions with respect to the second direction, and each of the 1-2 winding portion and the 2-1 winding portion winds from one end to the other end in the other of the clockwise and counterclockwise directions with respect to the second direction.

The 1-1 coil may include a 1-1 one end and a 1-1 other end, the 1-1 winding portion may be disposed between the 1-1 one end and the 1-1 other end, the 1-2 coil may include a 1-2 one end and a 1-2 other end, the 1-2 winding portion may be disposed between the 1-2 one end and the 1-2 other end, the 2-1 coil may include a 2-1 one end and a 2-1 other end, the 2-1 winding portion may be disposed between the 2-1 one end and the 2-1 other end, the 2-2 coil may include a 2-2 one end and a 2-2 other end, and the 2-2 winding portion may be disposed between the 2-2 one end and the 2-2 other end.

A direction of a current flowing in the 1-1 winding portion may be the same as a direction of a current flowing in the 2-2 winding portion with respect to the second direction.

A direction of a current flowing in the 1-2 winding portion may be the same as a direction of a current flowing in the 2-1 winding portion with respect to the second direction.

The 1-1 one end and the 2-2 one end may form a first node, and the 1-1 other end and the 2-2 other end may form a second node.

The 1-2 one end and the 2-1 one end may form a third node, and the 1-2 other end and the 2-1 other end may form a fourth node.

A current applied to the first node and a current applied to the third node may be applied in the same direction.

The driving magnet may include a first magnet and a second magnet disposed to be spaced apart from each other in the second direction, the first magnet may be disposed to face the first coil part, and the second magnet may be disposed to face the second coil part.

The first coil part and the second coil part may overlap in the second direction.

A camera actuator according to an embodiment includes a housing, a mover disposed in the housing and including an optical member, and a driving part disposed in the housing and configured to move the mover, wherein the driving part includes a driving magnet and a driving coil facing the driving magnet, the driving coil includes a first coil part including a 1-1 coil and a 1-2 coil disposed side by side in a first direction and a second coil part including a 2-1 coil and a 2-2 coil disposed side by side in the first direction, the 1-1 coil and the 2-1 coil generate electromagnetic forces in different directions, and the 1-2 coil and the 2-2 coil generate electromagnetic force in different directions.

Advantageous Effects

According to embodiments of the present invention, it is possible to provide a camera actuator applicable to ultra-slim, ultra-small, and high-resolution cameras. In particular, it is possible to efficiently arrange an OIS actuator even without increasing the overall size of a camera module.

According to the embodiments of the present invention, tilting in an X-axis direction does not magnetically interfere with tilting in a Y-axis direction, the tilting in the X-axis direction and the tilting in the Y-axis direction can be implemented in a stable structure, and for an actuator for auto-focusing or zooming, it does not generate magnetic field interference, thereby implementing a precise OIS function.

According to the embodiments of the present invention, it is possible to secure a sufficient amount of light by eliminating the size limitation of a lens and implement OIS having low power consumption.

According to the present invention, it is possible to implement a camera actuator capable of accurate rotation driving such as the suppression of errors due to a posture difference.

In addition, according to the present invention, it is possible to implement a camera actuator with improved reliability by improving the stiffness of a housing.

In addition, it is possible to implement a camera actuator in which the center of gravity is positioned adjacent to a rotational axis or a rotational surface, thereby minimizing a change in moment due to a posture difference.

In addition, it is possible to implement a camera actuator with improved energy efficiency for rotation driving.

In addition, it is possible to implement a camera actuator in which tilting of a mover is easily controlled through a plurality of coils.

In addition, accurate rotation driving such as the suppression of errors due to a posture difference can be performed.

Various beneficial advantages and effects of the present invention are not limited to the above description and will be able to be more easily understood in the process of describing specific embodiments of the present invention.

DESCRIPTION OF DRAWINGS

FIG. 9C is a cross-sectional view along line F-F' in FIG. 9A.

FIG. 12C is an exemplary view of the movement of the first camera actuator shown in FIG. 12B.

MODES OF THE INVENTION

Figure 1:
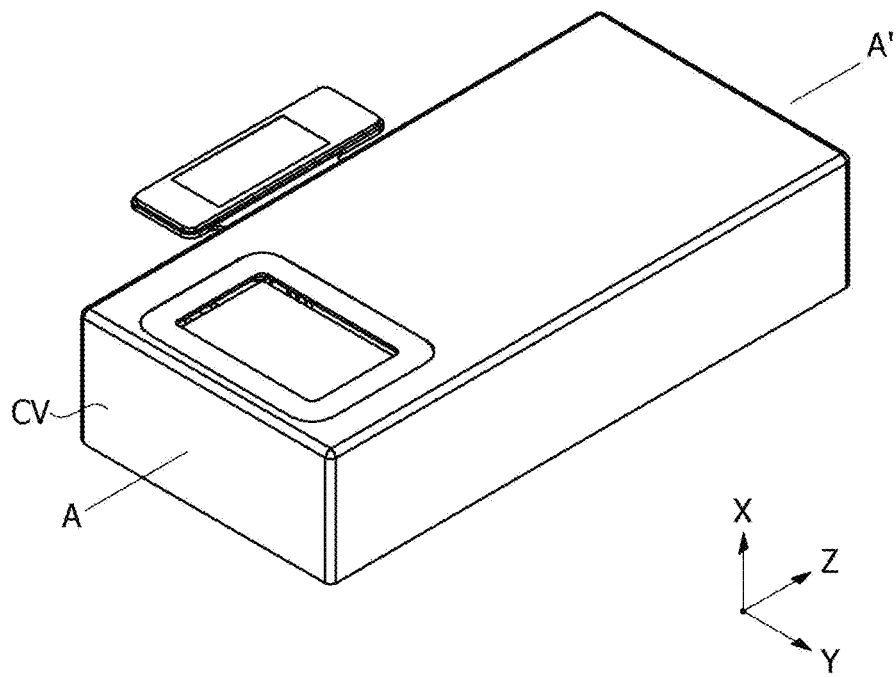
FIG. 1 is a perspective view of a camera module according to an embodiment.

Since the present disclosure may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present disclosure.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present disclosure. The term "and/or" includes a combination of a plurality of related listed items or any of the plurality of related listed items.

When a certain component is described as being "connected" or "coupled" to another component, it is understood that it may be directly connected or coupled to another component or other components may also be present therebetween. On the other hand, when a certain component is described as being "directly connected" or "directly coupled" to another component, it should be understood that other components are not present therebetween.

The terms used in the application are only used to describe specific embodiments and are not intended to limit the present disclosure. The singular expression includes the plural expression unless the context clearly dictates otherwise. In the application, it should be understood that terms such as "comprise" or "have" are intended to specify that a feature, number, step, operation, component, part, or combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present disclosure pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are given the same reference numerals regardless of the reference numerals, and overlapping descriptions thereof will be omitted.

Figure 2:
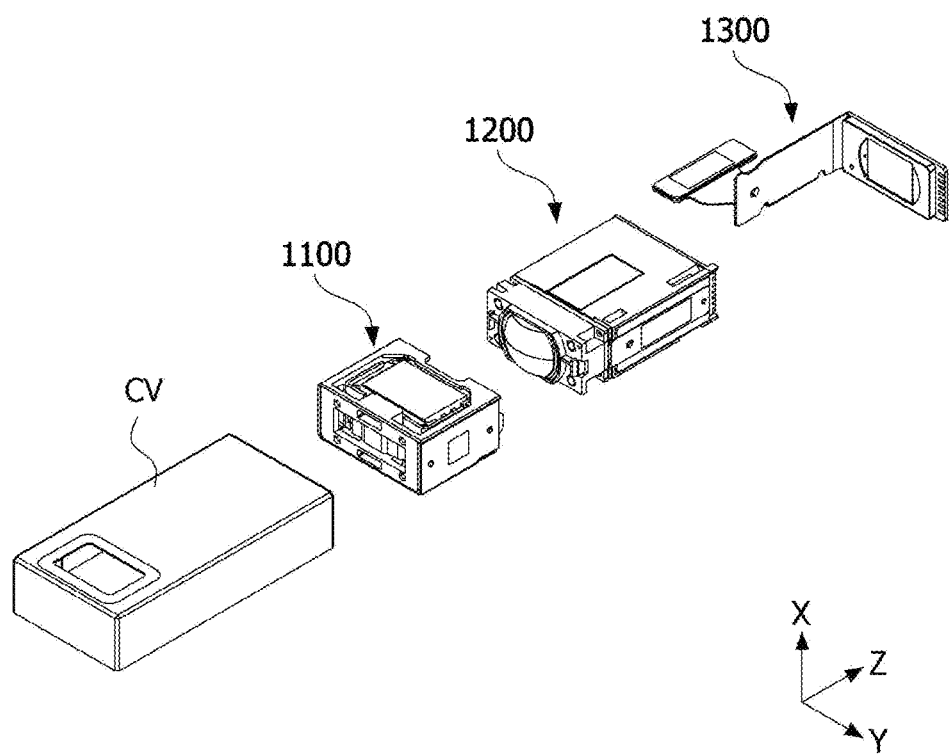
FIG. 2 is an exploded perspective view of the camera module according to the embodiment.
Figure 3:
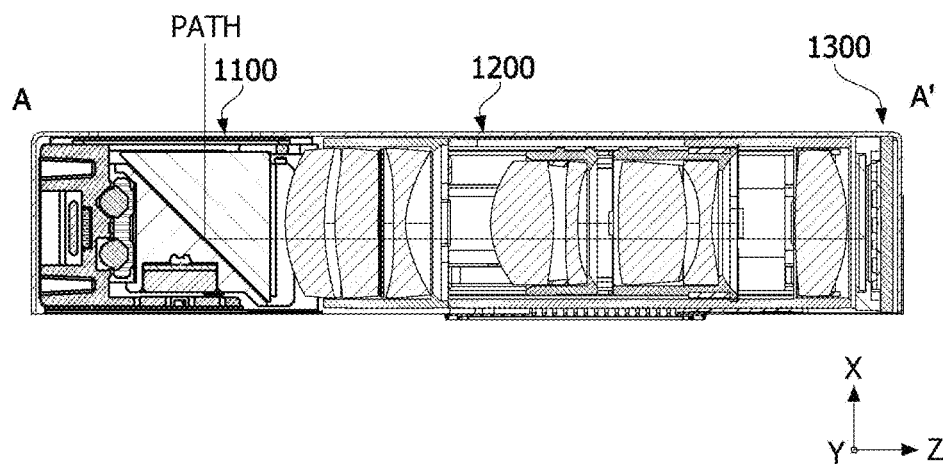
FIG. 3 is a cross-sectional view along line A-A' in FIG. 1.

FIG. 1 is a perspective view of a camera module according to an embodiment, FIG. 2 is an exploded perspective view of the camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with a first actuator, and the second camera actuator 1200 may be used interchangeably with a second actuator.

The cover CV may cover the first camera actuator 1100 and the second camera actuator 1200. It is possible to increase a coupling force between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator. For example, the first camera actuator 1100 may move the optical member in a direction perpendicular to an optical axis.

The first camera actuator 1100 may include a fixed focal length lens disposed in a predetermined lens barrel (not shown). The fixed focal length lens may also be referred to as a "single focal length lens" or a "single lens."

The first camera actuator 1100 may change an optical path. In an embodiment, the first camera actuator 1100 may vertically change the optical path through an internal optical member (e.g., a prism or a mirror). With this configuration, a configuration of a lens having a greater thickness than the mobile terminal is disposed by changing the optical path even when a thickness of the mobile terminal is reduced, and thus magnification and auto focusing (AF) and OIS functions may be performed.

However, the present invention is not limited thereto, and the first camera actuator 1100 may change the optical path vertically or at a predetermined angle multiple times.

The second camera actuator 1200 may be disposed on a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one lens or a plurality of lenses and perform the AF function or the zoom function by moving the lenses according to a predetermined control signal of a control part.

In addition, one lens or a plurality of lenses move independently or individually in an optical axis direction.

The circuit board 1300 may be disposed on a rear end of the second camera actuator 1200. The circuit board 1300 may be electrically connected to the second camera actuator 1200 and the first camera actuator 1100. In addition, a plurality of circuit boards 1300 may be present. The circuit board 1300 may include an image sensor and the like, and include a connector electrically connected to another external camera module or a processor of the terminal.

A camera module according to an embodiment may be formed as a single camera module or a plurality of camera modules. For example, the plurality of camera modules may include a first camera module and a second camera module. In addition, in the present invention, a camera module may be referred to as "camera apparatus," "camera device," "camera assembly," "imaging apparatus," "imaging unit," "imaging device," "imaging module," or the like. Furthermore, camera actuators (e.g., first and second camera actuators) to be described below are members for moving (or rotating) a lens or an optical member and may or may not include the lens or the optical member. Hereinafter, the following description will be given on the basis of a concept that the camera actuator includes the lens or the optical member. Furthermore, "lens driving device," "lens unit," "driving device," "driving unit," or the like may also be used as a concept including the camera actuator and the lens (or the optical member).

In addition, the first camera module may include a single actuator or a plurality of actuators. For example, the first camera module may include the first camera actuator 1100 and the second camera actuator 1200.

In addition, the second camera module may include an actuator (not shown) disposed in a predetermined housing (not shown) and capable of driving a lens part. The actuator may be a voice coil motor, a micro actuator, a silicon actuator, and the like, and may be applied in various methods such as an electrostatic method, a thermal method, a bi-morph method, and an electrostatic force method but the present invention is not limited thereto. In addition, in the specification, the camera actuator may be referred to as an actuator or the like. In addition, a camera module composed of a plurality of camera modules may be mounted in various electronic devices such as a mobile terminal.

Referring to FIG. 3, the camera module according to the embodiment may include the first camera actuator 1100 for performing an OIS function and the second camera actuator 1200 for performing a zoom function and an AF function.

Light may be incident into the camera module or the first camera actuator through an opening region position in an upper surface of the first camera actuator 1100. In other words, light may be incident into the first camera actuator 1100 in an optical axis direction (e.g., an X-axis direction), and an optical path may be changed in a vertical axis direction (e.g., a Z-axis direction) through an optical member. In addition, light may pass through the second camera actuator 1200 and may be incident on an image sensor IS positioned on one end of the second camera actuator 1200 (PATH).

In the specification, a bottom surface refers to one side in a first direction. In addition, the first direction is the X-axis direction in the drawing and may be used interchangeably with a second axis direction or the like. The second direction is a Y-axis direction in the drawing and may be used interchangeably with a first axis direction. The second direction is a direction perpendicular to the first direction. In addition, a third direction is the Z-axis direction in the drawing and may be used interchangeably with a third axis direction. In addition, the third direction is a direction perpendicular to both of the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. In addition, hereinafter, in the description of the first camera actuator 1100 and the second camera actuator 1200, the optical axis direction is the third direction (Z-axis direction), and the following description will be given on the basis of this.

In addition, in the specification, an inner side may be a direction from the cover CV toward the first camera actuator, and an outer side may be a direction opposite to the inner side. In other words, the first camera actuator and the second camera actuator may be positioned inside the cover CV, and the cover CV may be positioned outside the first camera actuator or the second camera actuator.

In addition, with this configuration, the camera module according to the embodiment can overcome the spatial limitations of the first camera actuator and the second camera actuator by changing the optical path. In other words, the camera module according to the embodiment may extend the optical path while minimizing the thickness of the camera module in response to the change in the optical path. Furthermore, it should be understood that the second camera actuator may also provide a high range of magnification by controlling a focus or the like in the extended optical path.

In addition, the camera module according to the embodiment may implement OIS through the control of the optical path through the first camera actuator, thereby minimizing the occurrence of a de-center or tilt phenomenon and providing the best optical characteristics.

Furthermore, the second camera actuator 1200 may include an optical system and a lens driving part. For example, the second camera actuator 1200 may include one or more of a first lens assembly, a second lens assembly, a third lens assembly, and a guide pin.

In addition, the second camera actuator 1200 may include a coil and a magnet and perform a high-magnification zoom function.

For example, the first lens assembly and the second lens assembly may be moving lenses for moving through the coil, the magnet, and the guide pin, and the third lens assembly may be a fixed lens but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below. In addition, the first lens assembly to the third lens assembly may move in the optical axis direction, that is, in the third direction. In addition, the first lens assembly to the third lens assembly may move in the third direction independently of or depending on each other.

Meanwhile, when an OIS actuator and an AF or zoom actuator are disposed according to the embodiment of the present invention, it is possible to inhibit magnetic field interference with an AF magnet or a zoom magnet upon OIS operation. Since a first driving magnet of the first camera actuator 1100 is disposed separately from the second camera actuator 1200, it is possible to inhibit the magnetic field interference between the first camera actuator 1100 and the second camera actuator 1200. In the specification, OIS may be used interchangeably with terms such as hand shaking correction, optical image stabilization, optical image correction, and shake correction.

Figure 4:
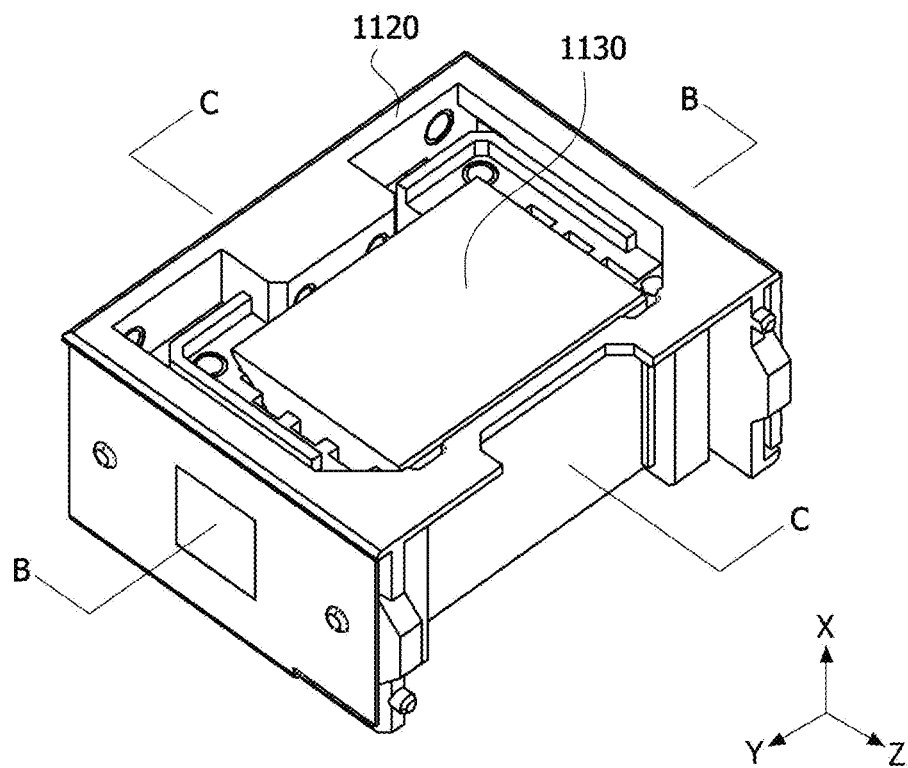
FIG. 4 is a perspective view of a first camera actuator according to an embodiment.
Figure 5:
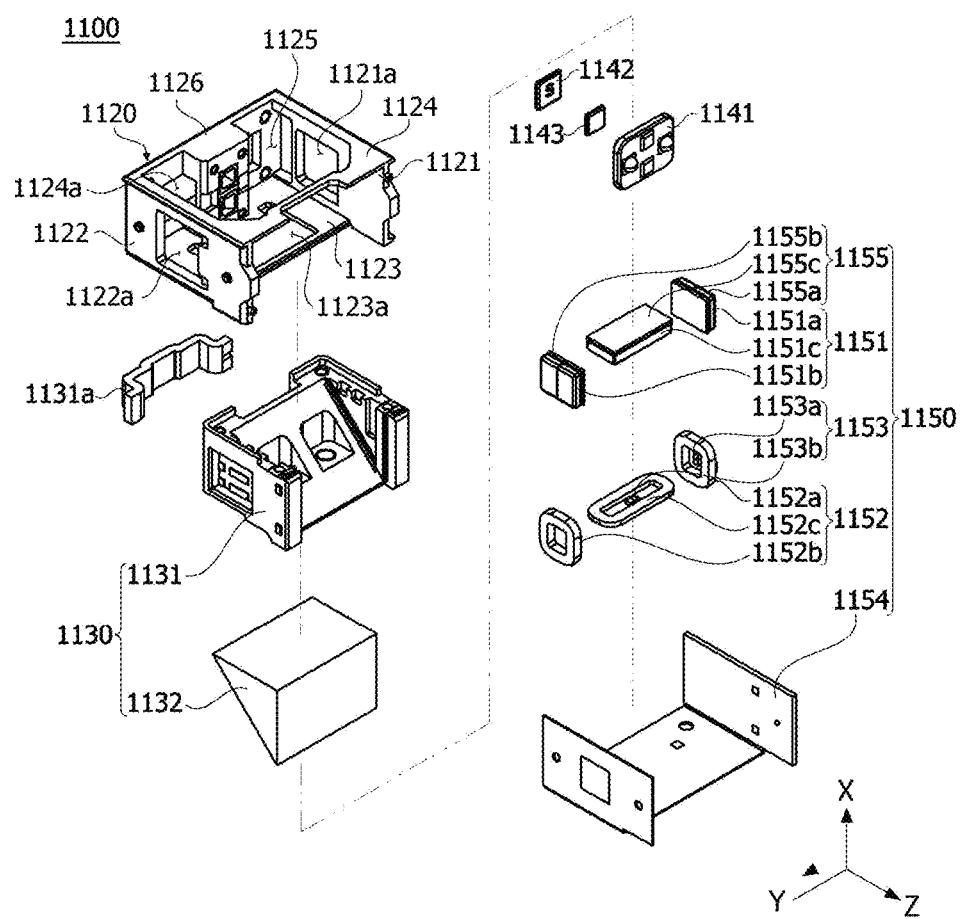
FIG. 5 is an exploded perspective view of the first camera actuator according to the embodiment.

FIG. 4 is a perspective view of the first camera actuator according to the embodiment, and FIG. 5 is an exploded perspective view of the first camera actuator according to the embodiment.

Referring to FIGS. 4 and 5, the first camera actuator 1100 according to the embodiment includes a first housing 1120, a mover 1130, a rotational part 1140, a first driving part 1150, and a fastening member 1131a.

The mover 1130 may include a holder 1131 and an optical member 1132 seated on the holder 1131. Furthermore, the mover 1130 may also include the fastening member 1131a described above and may be coupled to the fastening member 1131a to rotate integrally.

In addition, the rotational part 1140 may include a tilting guide part 1141 and a first magnetic substance 1142 and a second magnetic substance 1143 having different polarities to press the tilting guide part 1141.

In addition, the first driving part 1150 includes a first driving magnet 1151, a first driving coil 1152, a Hall sensor part 1153, a first board part 1154, and a yoke part 1155.

First, the first camera actuator 1100 may include a shield can (not shown). The shield can (not shown) may be positioned on an outermost side of the first camera actuator 1100 and positioned to surround the rotational part 1140 and the first driving part 1150, which will be described below.

The shield can (not shown) may block or reduce electromagnetic waves generated from the outside. In other words, the shield can (not shown) may reduce the occurrence of a malfunction of the rotational part 1140 or the first driving part 1150.

The first housing 1120 may be positioned inside the shield can (not shown). When there is no shield can, the first housing 1120 may be positioned on the outermost side of the first camera actuator.

In addition, the first housing 1120 may be positioned inside the first board part 1154 to be described below. The first housing 1120 may be fastened by being fitted into or matched with the shield can (not shown).

The first housing 1120 may include a first housing side portion 1121, a second housing side portion 1122, a third housing side portion 1123, a fourth housing side portion 1124, and a fifth housing side portion 1126. A detailed description thereof will be given below.

In particular, the fifth housing side portion 1126 may be formed integrally with or separately from the first housing 1120. In the specification, the following description will be given on the basis of the fifth housing side portion 1126 and the first housing 1120 formed integrally. In addition, the fastening member 1131a may pass through the fifth housing side portion 1126. A description thereof will be given below.

The mover 1130 includes the holder 1131 and the optical member 1132 seated on the holder 1131.

The holder 1131 may be seated in an accommodating part 1125 of the first housing 1120. The holder 1131 may include a first holder outer surface to a fourth holder outer surface respectively corresponding to the first housing side portion 1121, the second housing side portion 1122, the third housing side portion 1123, and the fifth housing side portion 1126. For example, the first holder outer surface to the fourth holder outer surface may correspond to or facing inner surfaces of each of the first housing side portion 1121, the second housing side portion 1122, the third housing side portion 1123, and the fifth housing side portion 1126.

In addition, the holder 1131 may include the fastening member 1131a disposed in a fourth seating groove. A detailed description thereof will be given below.

The optical member 1132 may be seated on the holder 1131. To this end, the holder 1131 may have a seating surface, and the seating surface may be formed by the accommodating groove. In an embodiment, the optical member 1132 may be formed as a mirror or a prism. Hereinafter, although a description thereof will be given on the basis of the prism, the optical member 1132 may also be composed of a plurality of lenses as in the above-described embodiment. Alternatively, the optical member 1132 may be composed of a plurality of lenses and prisms or mirrors. In addition, the optical member 1132 may include a reflector disposed therein. However, the present invention is not limited thereto.

In addition, the optical member 1132 may reflect light reflected from the outside (e.g., an object) into the camera module. In other words, the optical member 1132 can overcome the spatial limitations of the first camera actuator and the second camera actuator by changing the path of the reflected light. As described above, it should be understood that the camera module may also provide a high range of magnification by extending the optical path while minimizing a thickness.

The fastening member 1131a may be coupled to the holder 1131. The fastening member 1131a may be disposed outside the holder 1131, and at least a portion thereof may be disposed inside the housing. In addition, the fastening member 1131a may be seated in an additional groove positioned in a region of the fourth holder outer surface of the holder 1131 other than the fourth seating groove. In this case, the fastening member 1131a and the holder 1131 may be coupled through a bonding member. For example, the bonding member may be made of a material such as epoxy. Therefore, the fastening member 1131a may be coupled to the holder 1131, and at least a portion of the fifth housing side portion 1126 may be positioned between the fastening member 1131a and the holder 1131. For example, at least a portion of the fifth housing side portion 1126 may pass through a space formed between the fastening member 1131a and the holder 1131.

In addition, the fastening member 1131a may be formed in a structure separated from the holder 1131. With this configuration, it is possible to easily assemble the first camera actuator as will be described below. Alternatively, the fastening member 1131a may be formed integrally with the holder 1131, but will be described below as having the separated structure.

The rotational part 1140 includes the tilting guide part 1141 and the first magnetic substance 1142 and the second magnetic substance 1143 having different polarities to press the tilting guide part 1141.

The tilting guide part 1141 may be coupled to the mover 1130 and the first housing 1120 described above. Specifically, the tilting guide part 1141 may be disposed between the holder 1131 and the fifth housing side portion 1126. Therefore, the tilting guide part 1141 may be coupled to the mover 1130 of the holder 1131 and the first housing 1120. However, unlike the above description, in the embodiment, the tilting guide part 1141 may be disposed between the fifth housing side portion 1126 and the holder 1131. Specifically, the tilting guide part 1141 may be positioned between the fifth housing side portion 1126 and the fourth seating groove of the holder 1131.

The fastening member 1131a, the fifth housing side portion 1126, the tilting guide part 1141, and the holder 1131 may be sequentially disposed in the third direction (Z-axis direction) (with respect to the outermost side). In addition, the first magnetic substance 1142 and the second magnetic substance 1143 are respectively seated in a first groove gr1 formed in the fastening member 1131a and a second groove gr2 formed in the fifth housing side portion 1126. In the embodiment, the first groove gr1 and the second groove gr2 may have different positions from the first and second grooves described in another embodiment described above. However, the first groove gr1 is positioned in the fastening member 1131a and moves integrally with the holder, and the second groove gr2 is positioned in the fifth housing side portion 1126 corresponding to the first groove gr1 and coupled to the first housing 1120. Therefore, these terms will be used interchangeably. In addition, the second groove gr2 may be positioned between the first groove gr1 and the tilting guide part 1141.

In addition, the tilting guide part 1141 may be disposed adjacent to the optical axis. Therefore, the actuator according to the embodiment may easily change the optical path according to a first axis tilt and a second axis tilt, which will be described below.

The tilting guide part 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be given below.

In addition, as described above, the first magnetic substance 1142 may be positioned in the fastening member 1131a. In addition, the second magnetic substance 1143 may be positioned in the fifth housing side portion 1126.

The first magnetic substance 1142 and the second magnetic substance 1143 may have the same polarity. For example, the first magnetic substance 1142 may be a magnet having an N pole, and the second magnetic substance 1143 may be the magnet having the N pole. Alternatively, conversely, the first magnetic substance 1142 may be a magnet having an S pole, and the second magnetic substance 1143 may be the magnet having the S pole.

For example, a second pole surface of the second magnetic substance 1143 and a first pole surface of the first magnetic substance 1142 facing the second pole surface may have the same polarity. In other words, the first magnetic substance 1142 and the second magnetic substance 1143 may generate forces pushing each other and to this end, may have various materials, functions, and the like.

For example, the first magnetic substance 1142 and the second magnetic substance 1143 may generate a repulsive force therebetween due to the polarities described above. With this configuration, the repulsive force described above may be applied to the fastening member 1131a or the holder 1131 coupled to the first magnetic substance 1142 and the fifth housing side portion 1126 or the first housing 1120 coupled to the second magnetic substance 1143. At this time, the repulsive force applied to the fastening member 1131a may be transmitted to the holder 1131 coupled to the fastening member 1131a. Therefore, the tilting guide part 1141 disposed between the fastening member 1131a and the fifth housing side portion 1126 may be pressed tightly by the repulsive force. In other words, the repulsive force may maintain a position of the tilting guide part 1141 between the holder 1131 and the first housing 1120 (or the fifth housing side portion 1126). With this configuration, the position between the mover 1130 and the first housing 1120 may be maintained even upon X-axis tilt or Y-axis tilt. In addition, the tilting guide part may be in close contact with the fifth housing side portion 1126 and the holder 1131 by the repulsive force between the second magnetic substance 1143 and the first magnetic substance 1142.

The first driving part 1150 includes the first driving magnet 1151, the first driving coil 1152, the Hall sensor part 1153, the first board part 1154, and the yoke part 1155. A description thereof will be given below.

Figure 6A:
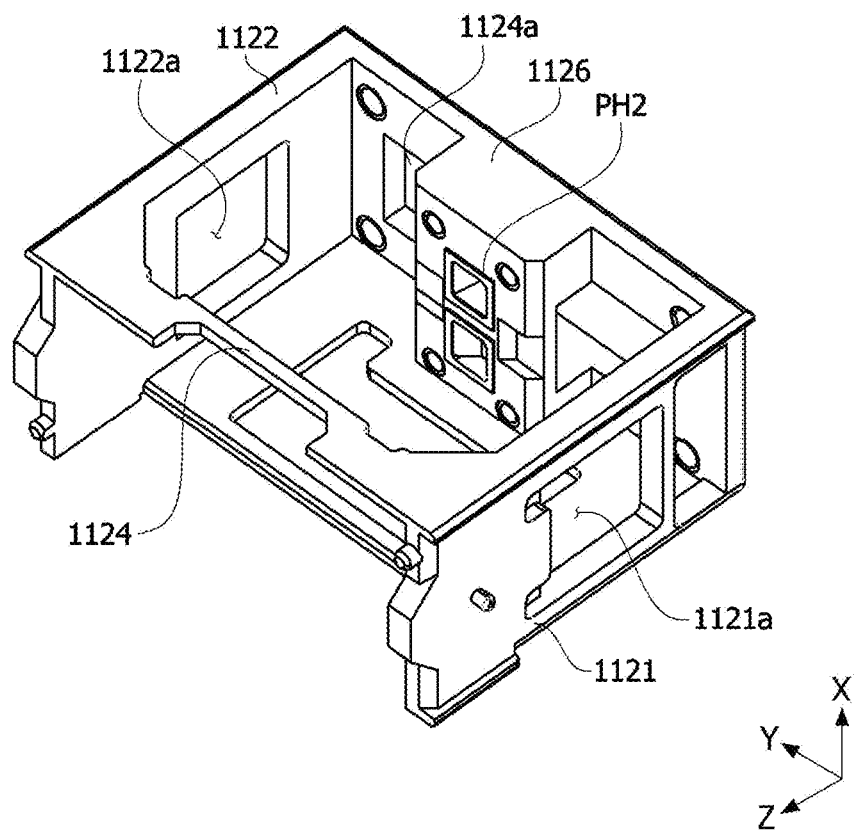
FIG. 6A is a perspective view of a first housing of the first camera actuator according to the embodiment.
Figure 6B:
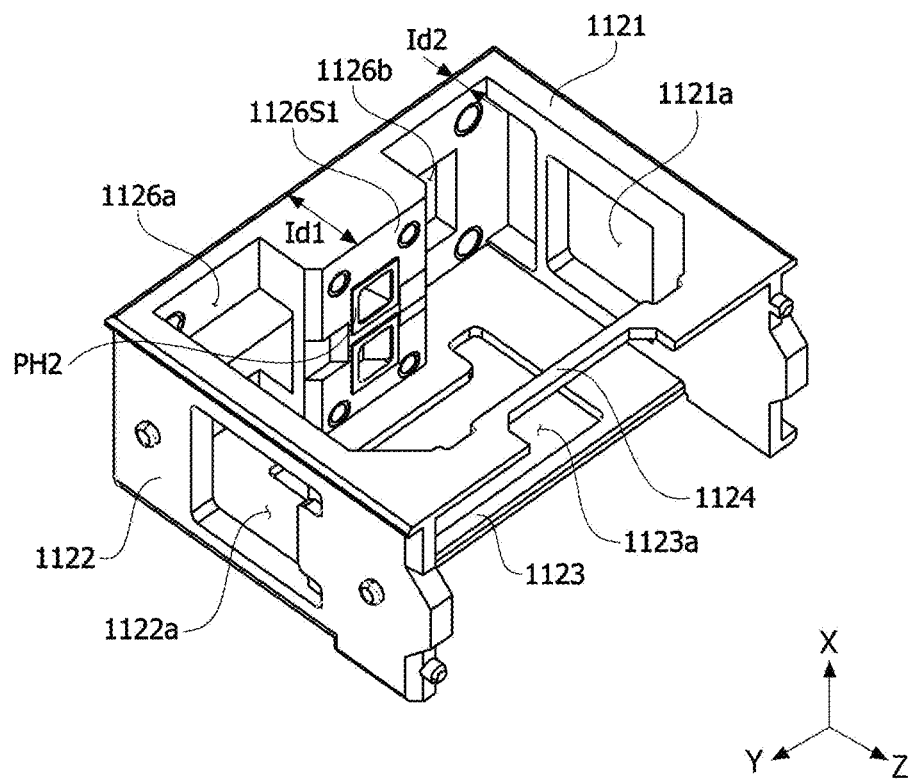
FIG. 6B is a perspective view in a direction different from that of FIG. 6A.
Figure 6C:
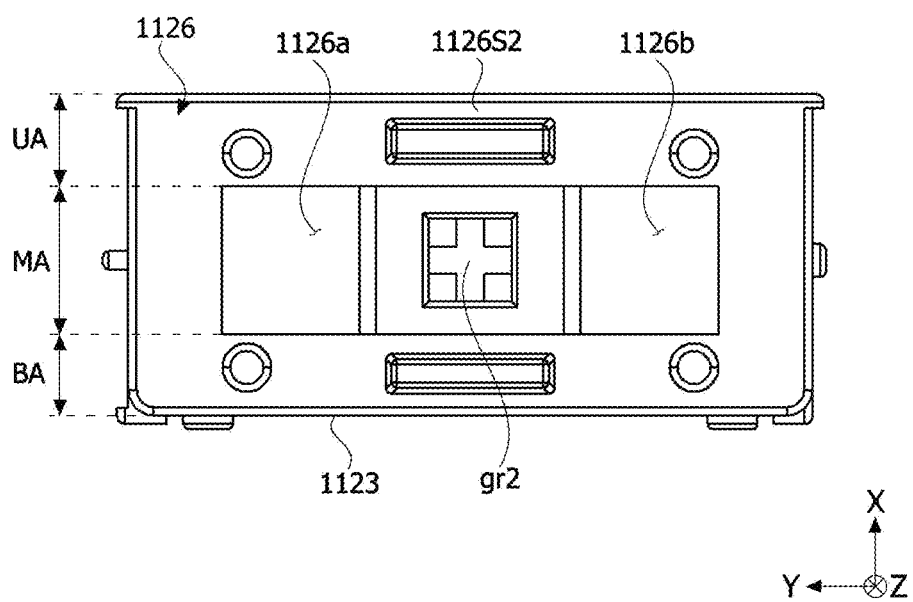
FIG. 6C is a front view of the first housing of the first camera actuator according to the embodiment.

FIG. 6A is a perspective view of the first housing of the first camera actuator according to the embodiment, FIG. 6B is a perspective view in a direction different from that of FIG. 6A, and FIG. 6C is a front view of the first housing of the first camera actuator according to the embodiment.

Referring to FIGS. 6A to 6C, the first housing 1120 according to the embodiment may include the first housing side portion 1121 to the fifth housing side portion 1126. The first housing side portion 1121 and the second housing side portion 1122 may be disposed to face each other. In addition, the third housing side portion 1123 and the fourth housing side portion 1124 may be disposed to face each other.

In addition, the third housing side portion 1123 and the fourth housing side portion 1124 may be disposed between the first housing side portion 1121 and the second housing side portion 1122.

The third housing side portion 1123 and the fourth housing side portion 1124 may be in contact with the first housing side portion 1121, the second housing side portion 1122, and the fourth housing side portion 1124. In addition, the third housing side portion 1123 may be a bottom surface of the first housing 1120. In addition, the fourth housing side portion 1124 may be an upper surface of the first housing 1120. In addition, the above description may also be applied to a description of the direction in the same manner.

In addition, the first housing side portion 1121 may include a first housing hole 1121a. A first coil to be described below may be positioned in the first housing hole 1121a.

In addition, the second housing side portion 1122 may include a second housing hole 1122a. In addition, a second coil to be described below may be positioned in the second housing hole 1122a.

In addition, the first housing side portion 1121 and the second housing side portion 1122 may be side surfaces of the first housing 1120.

The first coil and the second coil may be coupled to the first board part. In an embodiment, the first coil and the second coil may be electrically connected to the first board part so that a current may flow. The current is an element of an electromagnetic force by which the second camera actuator may tilt with respect to the X axis.

In addition, the third housing side portion 1123 may include a third housing hole 1123a.

A third coil to be described below may be positioned in the third housing hole 1123a. In addition, the third coil may be electrically connected to the first board part in contact with the first housing 1120, and the third coil and the first board part may be coupled to each other. Therefore, the third coil may be electrically connected to the first board part to receive a current from the first board part. The current is an element of the electromagnetic force by which the second camera actuator may tilt with respect to the Y-axis.

The fifth housing side portion 1126 may be seated between the first housing side portion 1121 to the fourth housing side portion 1124. Therefore, the fifth housing side portion 1126 may be positioned above the third housing side portion 1123. For example, the fifth housing side portion 1126 may be positioned on one side. The fifth housing side portion 1126 and the holder may be sequentially positioned with respect to the third direction.

The fourth housing side portion 1124 may be disposed between the first housing side portion 1121 and the second housing side portion 1122 and may be in contact with the first housing side portion 1121, the second housing side portion 1122, and the third housing side portion 1123.

In addition, the fourth housing side portion 1124 may include a fourth housing hole 1124a. The fourth housing hole 1124a may be positioned above the optical member. Therefore, light may pass through the fourth housing hole 1124a and may be incident on the optical member.

In addition, the first housing 1120 may include the accommodating part 1125 formed by the first housing side portion 1121 to the fifth housing side portion 1126. The fastening member, the tilting guide part, the mover, and the like may be positioned in the accommodating part 1125 as components.

In an embodiment, the fifth housing side portion 1126 may be positioned between the first housing side portion 1121 and the second housing side portion 1122. In addition, the fifth housing side portion 1126 may be positioned between the third housing side portion 1123 and the fourth housing side portion 1124.

In addition, the fifth housing side portion 1126 may be positioned above the third housing side portion 1123 and may be in contact with the first housing side portion to the third housing side portion.

In addition, the fifth housing side portion 1126 includes a second accommodating groove in which the second protrusion of the tilting guide part is seated. A second accommodating groove PH2 may be positioned in an inner surface 1126s1 of the fifth housing side portion 1126. The inner surface 1126s1 of the fifth housing side portion 1126 may protrude inward between the through holes 1126a and 1126b of the fifth housing side portion 1126. Therefore, in the fifth housing side portion 1126, the protrusion (e.g., the second protrusion) of the tilting guide part is disposed adjacent to a prism in the fourth seating groove so that the protrusion, which is a reference axis of tilt, is disposed close to the center of gravity of the mover 1130. Therefore, when the holder tilts, it is possible to minimize the moment for moving the mover 1130 for tilt. Therefore, current consumption for driving the coil can also be minimized, thereby reducing the power consumption of the camera actuator.

In addition, the fifth housing side portion 1126 may include the through holes 1126a and 1126b. A plurality of through holes may be present, and composed of the first through hole 1126a and the second through hole 1126b.

First and second extensions of the fastening member to be described below may respectively pass through the first through hole 1126a and the second through hole 1126b. Therefore, the fastening member and the fifth housing side portion may be coupled. In other words, the first housing and the mover may be coupled to each other.

The second accommodating groove PH2 may be positioned between the first through hole 1126a and the second through hole 1126b. With this configuration, it is possible to improve the coupling force between the tilting guide part 1141 and the fifth housing side portion 1126, thereby blocking a reduction in the accuracy of the tilt caused by the movement of the tilting guide part 1141 in the first housing.

In addition, the second groove gr2 may be positioned in an outer surface 1126s2 of the fifth housing side portion 1126. The second magnetic substance may be seated in the second groove gr2. In addition, the outer surface 1126s2 of the fifth housing side portion 1126 may face the inner surface of the fastening member or a member base part. Furthermore, the first magnetic substance seated on the fastening member and the second magnetic substance of the fifth housing side portion 1126 may face each other and generate the repulsive force described above. Therefore, since the fifth housing side portion 1126 presses the tilting guide part inward or the holder by the repulsive force, the mover may be spaced apart by a predetermined distance from the third housing side portion in the first housing even when a current is injected into the coil. In other words, the coupling force between the mover, the housing, and the tilting guide part may be maintained.

In addition, a plurality of other grooves may be present in the outer surface 1126s2 of the fifth housing side portion 1126. This is to easily manufacture the first housing in a process.

In addition, when the fifth housing side portion 1126 is formed integrally with the first housing 1120, it is possible to improve the coupling force between the fifth housing side portion 1126 and the first housing 1120, thereby improving the reliability of the camera actuator. In addition, when the fifth housing side portion 1126 and the first housing 1120 are formed separately, it is possible to improve the ease of the assembling and manufacturing of the fifth housing side portion 1126 and the first housing 1120.

In addition, in an embodiment, the fifth housing side portion 1126 may include the first through hole 1126a and the second through hole 1126b. In addition, the first through hole 1126a and the second through hole 1126b may be disposed side by side in the second direction (Y-axis direction) to overlap each other.

In addition, the fifth housing side portion 1126 may include an upper member UA positioned above the first through hole 1126a and the second through hole 1126b and a lower member BA positioned under the first through hole 1126a and the second through hole 1126b. Therefore, the first through hole 1126a and the second through hole 1126b may be positioned in the middle of the fifth housing side portion 1126. In other words, the fifth housing side portion 1126 may include a connecting member MA positioned in side portions of the first through hole 1126a and the second through hole 1126b. In other words, the upper member UA and the lower member BA may be connected to each other through the connecting member MA. In addition, a plurality of lower members BA may be present to form the first and second through holes and disposed to be spaced apart from each other in the second direction (Y-axis direction).

Therefore, the fifth housing side portion 1126 may have the upper member UA, thereby improving stiffness. For example, the stiffness of the fifth housing side portion 1126 may increase as compared to a case in which the upper member UA is not present. For example, in the embodiment, the part of stiffness may be N/μm. Therefore, it is possible to improve the reliability of the first camera actuator according to the embodiment.

In addition, the fifth housing side portion 1126 may further include the first protrusion and the second protrusion. The first protrusion may be in contact with the first housing side portion, and the second protrusion may be in contact with the second housing side portion. The first protrusion may extend from one end of the outer surface 1126s2 of the fifth housing side portion in the third direction (Z-axis direction). The second protrusion may extend from the other end of the outer surface 1126s2 of the fifth housing side portion in the third direction (Z-axis direction). In other words, the first protrusion and the second protrusion may extend toward the holder.

Furthermore, the fifth housing side portion 1126 may have an inner thickness Id1 greater than an outer thickness Id2. The thickness may be a length in the third direction (Z-axis direction). With this configuration, even when the second protrusion of the tilting guide part is seated in the second accommodating groove PH2 formed in the inner surface 1126s1 of the fifth housing side portion 1126, it is possible to suppress damage to the fifth housing side portion 1126. In other words, it is possible to improve the reliability of the camera actuator.

Figure 7:
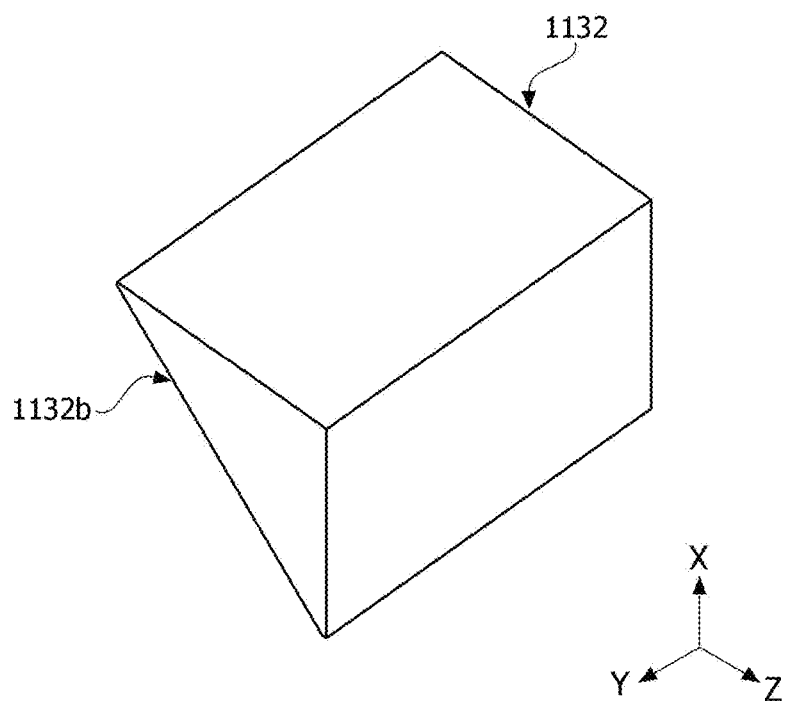
FIG. 7 is a perspective view of an optical member of the first camera actuator according to the embodiment.

FIG. 7 is a perspective view of an optical member of the first camera actuator according to the embodiment.

The optical member 1132 may be seated on the holder. The optical member 1132 may be a right angle prism as a reflector, but the present invention is not limited thereto.

In an embodiment, the optical member 1132 may have a protrusion (not shown) on a portion of an outer surface thereof. The optical member 1132 may be easily coupled to the holder through the protrusion (not shown). In addition, the holder may have a groove or a protrusion and thus may also be coupled to the optical member 1132.

In addition, a bottom surface 1132b of the optical member 1132 may be seated on a seating surface of the holder. Therefore, the bottom surface 1132b of the optical member 1132 may correspond to the seating surface of the holder. In an embodiment, the bottom surface 1132b may be formed to have an inclined surface like the seating of the holder. Therefore, the prism moves according to the movement of the holder and at the same time, can inhibit the optical member 1132 from being separated from the holder due to the movement.

In addition, a groove may be formed in the bottom surface 1132b of the optical member 1132 and a bonding member may be applied, and thus the optical member 1132 may be coupled to the holder. Alternatively, the bonding member may be applied to the groove or protrusion of the holder, and thus the holder may also be coupled to the optical member 1132.

In addition, as described above, the optical member 1132 may be formed in a structure capable of reflecting light reflected from the outside (e.g., an object) into the camera module. As in the embodiment, the optical member 1132 may also be formed as a single mirror. In addition, the optical member 1132 can overcome the spatial limitations of the first camera actuator and the second camera actuator by changing the path of the reflected light. As described above, it should be understood that the camera module may also provide a high range of magnification by extending the optical path while minimizing a thickness. In addition, it should be understood that the camera module including the camera actuator according to the embodiment may also provide the high range of magnification by extending the optical path while minimizing the thickness.

Figure 8A:
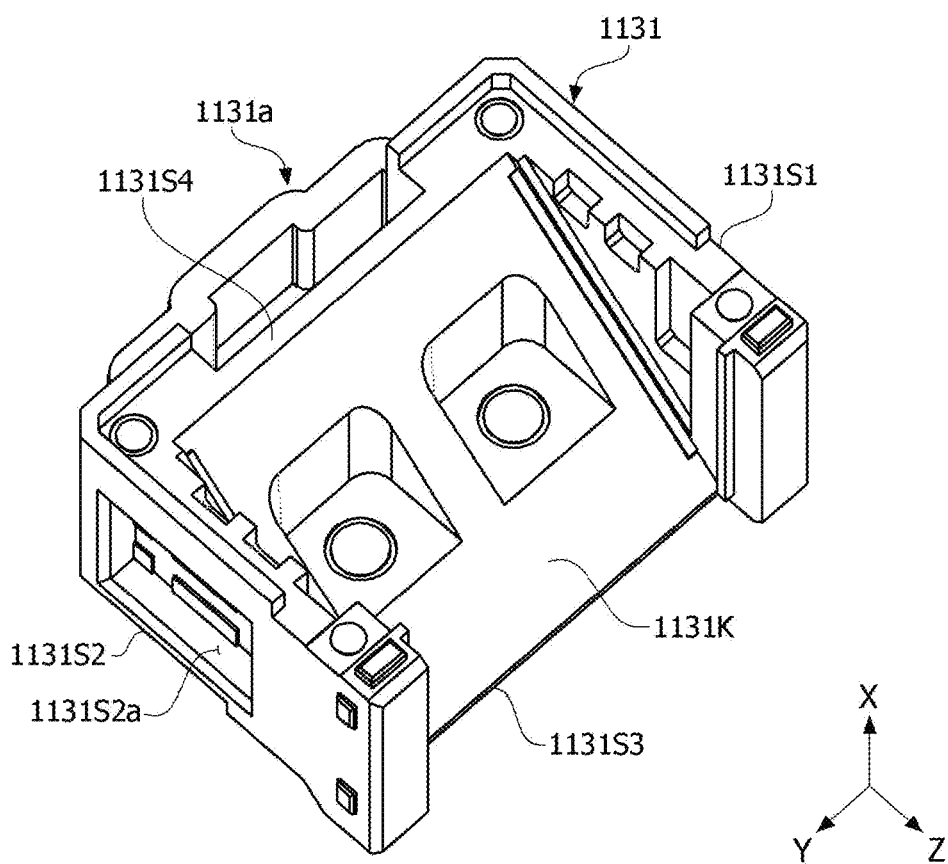
FIG. 8A is a perspective view of a holder of the first camera actuator according to the embodiment.
Figure 8B:
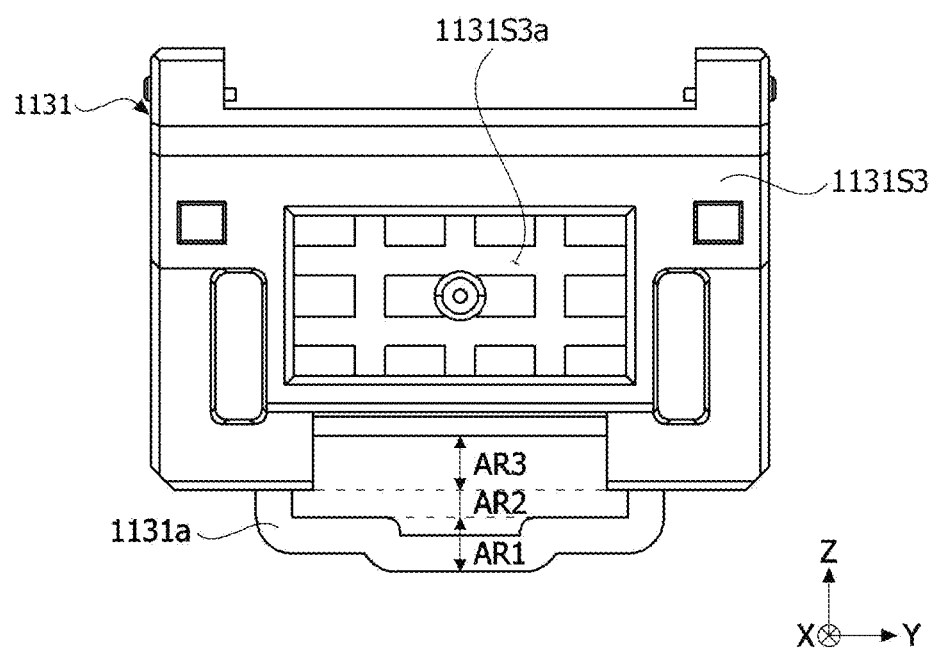
FIG. 8B is a bottom view of the holder of the first camera actuator according to the embodiment.
Figure 8C:
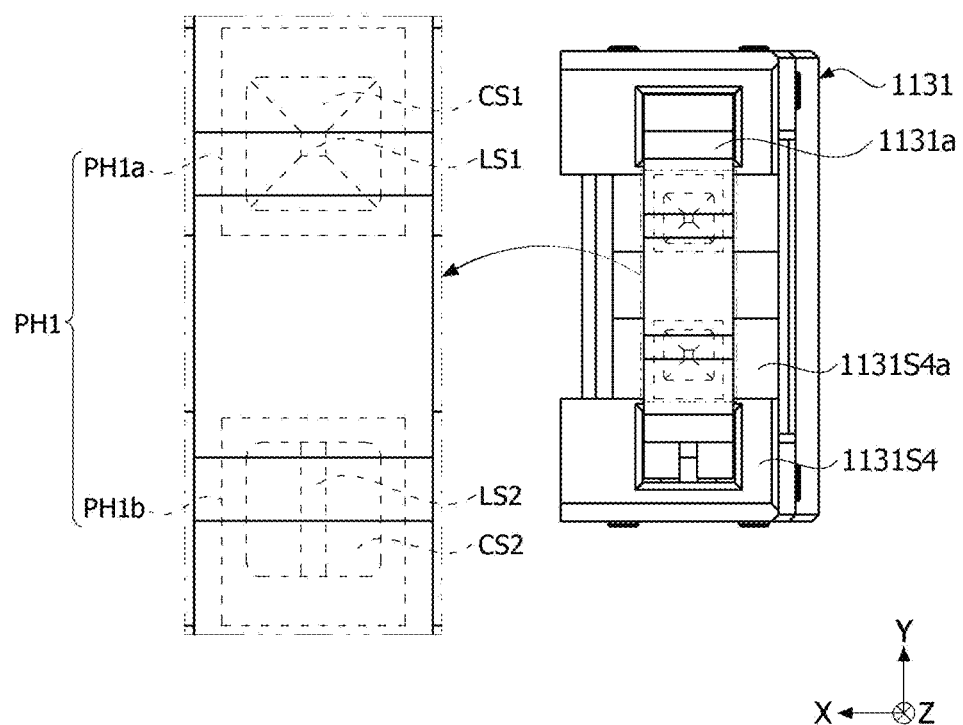
FIG. 8C is a front view of the holder of the first camera actuator according to the embodiment.
Figure 8D:
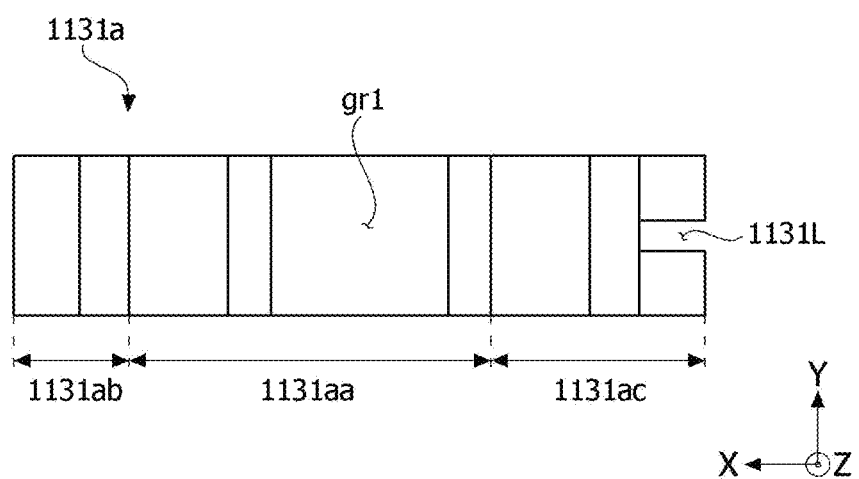
FIG. 8D is a rear view of a fastening member of the first camera actuator according to the embodiment.
Figure 8E:
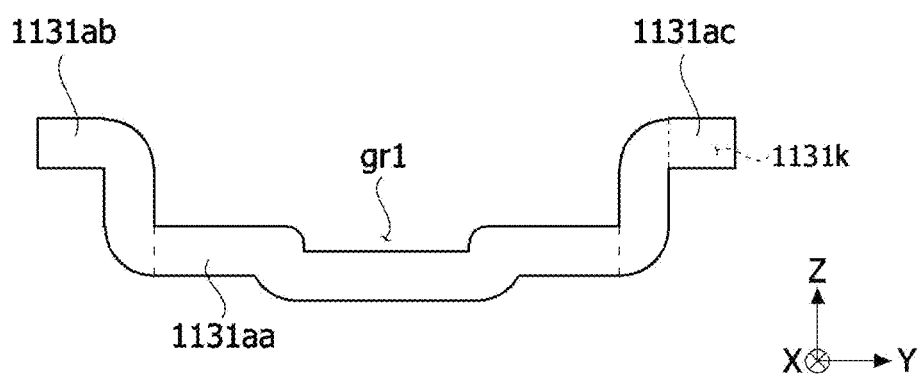
FIG. 8E is a bottom view of the fastening member of the first camera actuator according to the embodiment.

FIG. 8A is a perspective view of a holder of the first camera actuator according to the embodiment, FIG. 8B is a bottom view of the holder of the first camera actuator according to the embodiment, FIG. 8C is a front view of the holder of the first camera actuator according to the embodiment, FIG. 8D is a rear view of a fastening member of the first camera actuator according to the embodiment, and FIG. 8E is a bottom view of the fastening member of the first camera actuator according to the embodiment.

Referring to FIGS. 8A to 8E, the holder 1131 may include a seating surface 1131k on which the optical member 1132 is seated. The seating surface 1131k may be an inclined surface. In addition, the holder 1131 may include a jaw portion on an upper portion of the seating surface 1131k. In addition, the jaw portion of the holder 1131 may be coupled to a protrusion (not shown) of the optical member 1132.

The holder 1131 may include a plurality of outer surfaces. For example, the holder 1131 may include a first holder outer surface 1131S1, a second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be disposed symmetrically with the second holder outer surface 1131S2 with respect to the first direction (X-axis direction).

The first holder outer surface 1131S1 may be positioned to correspond to the first housing side portion. In other words, the first holder outer surface 1131S1 may be positioned to face the first housing side portion. In addition, the second holder outer surface 1131S2 may be positioned to correspond to the second housing side portion. In other words, the second holder outer surface 1131S2 may be positioned to face the second housing side portion.

In addition, the first holder outer surface 1131S1 may include a first seating groove 1131S1a. In addition, the second holder outer surface 1131S2 may include a second seating groove 1131S2a. The first seating groove 1131S1a and the second seating groove 1131S2a may be disposed symmetrically with respect to the first direction (X-axis direction).

In addition, the first seating groove 1131S1a and the second seating groove 1131S2a may be disposed to overlap in the second direction (Y-axis direction). In addition, a first magnet 1151a may be disposed in the first seating groove 1131S1a, and a second magnet 1151b may be disposed in the second seating groove 1131S2a. The first magnet 1151a and the second magnet 1151b may also be disposed symmetrically with respect to the first direction (X-axis direction). In the specification, it should be understood that the first magnet to the third magnet may be coupled to the housing through a yoke or a bonding member.

As described above, due to the positions of the first and second seating grooves and the first and second magnets, electromagnetic forces generated by each magnet may be coaxially provided to the first holder outer surface S1131S1 and the second holder outer surface 1131S2. For example, a region of the first holder outer surface S1131S1 where the electromagnetic force is applied (e.g., a portion having the strongest electromagnetic force) and a region of the second holder outer surface S1131S1 where the electromagnetic force is applied (e.g., a portion having the strongest electromagnetic force) may be positioned on an axis parallel to the second direction (Y-axis direction). Therefore, the X-axis tilting can be accurately performed.

The first magnet 1151a may be disposed in the first seating groove 1131S1a, and the second magnet 1151b may be disposed in the second seating groove 1131S2a.

The third holder outer surface 1131S3 may be an outer surface that is in contact with the first holder outer surface 1131S1 and the second holder outer surface 1131S2 and extends from one side of each of the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2. The third holder outer surface 1131S3 may be the bottom surface of the holder 1131. In other words, the third holder outer surface 1131S3 may be positioned to face the third housing side portion.

In addition, the third holder outer surface 1131S3 may include a third seating groove 1131S3a. A third magnet 1151c may be disposed in the third seating groove 1131S3a. The third holder outer surface 1131S3 may be positioned to face the third housing side portion 1123.

In addition, the third housing hole 1123a may at least partially overlap the third seating groove 1131S3a in the first direction (X-axis direction). Therefore, the third magnet 1151c in the third seating groove 1131S3a and the third coil 1152c in the third housing hole 1123a may be positioned to face each other. In addition, the third magnet 1151c and the third coil 1152c generate an electromagnetic force so that the second camera actuator may perform the Y-axis tilt.

In addition, the X-axis tilt may be implemented by a plurality of magnets (first and second magnets 1151a and 1151b) while the Y-axis tilt may be implemented by only the third magnet 1151c.

In an embodiment, the third seating groove 1131S3a may have a greater width than the first seating groove 1131S1a or the second seating groove 1131S2a. With this configuration, the Y-axis tilt may be performed by current control similar to that of the X-axis tilt.

Furthermore, at least one of the first seating groove 1131S1a, the second seating groove 1131S2a, and the third seating groove 1131S3a may at least partially overlap the tilting guide part in the first direction (X-axis direction) or the second direction (Y-axis direction) corresponding to the first magnet 1151a, the second magnet 1151b, and the third magnet 1151c, which will be described below. For example, the first protrusion of the tilting guide part may overlap the first seating groove 1131S1a and the second seating groove 1131S2a in the second direction (Y-axis direction). In addition, a portion of the base of the tilting guide part may overlap the first seating groove 1131S1a and the second seating groove 1131S2a in the second direction (Y-axis direction). In addition, at least a portion of the tilting guide part may overlap the third seating groove 1131S3a in the first direction (X-axis direction). With this configuration, tilt driving may be performed as will be described below.

The fourth holder outer surface 1131S4 may be an outer surface that is in contact with the first holder outer surface 1131S1 and the second holder outer surface 1131S2 and extends from the first holder outer surface 1131S1 and the second holder outer surface 1131S2 in the first direction (X-axis direction). In addition, the fourth holder outer surface 1131S4 may be positioned between the first holder outer surface 1131S1 and the second holder outer surface 1131S2. In other words, the fourth holder outer surface 1131S4 may be positioned to face the fifth housing side portion.

The fourth holder outer surface 1131S4 may include a fourth seating groove 1131S4a. The tilting guide part 1141 may be positioned in the fourth seating groove 1131S4a. In addition, the fastening member 1131a and the fifth housing side portion 1126 may be positioned in the fourth seating groove 1131S4a. In addition, the fourth seating groove 1131S4a may include a plurality of regions. The plurality of regions may include a first region AR1, a second region AR2, and a third region AR3.

The fastening member 1131a may be positioned in the first region AR1. In particular, the member base part of the fastening member 1131a may be positioned in the first region AR1. In other words, the first region AR1 may overlap the fastening member 1131a in the first direction (X-axis direction). In this case, the first region AR1 may be positioned above the fourth holder outer surface 1131S4. In other words, the first region AR1 may correspond to a region positioned above the fourth seating groove 1131S4a. In this case, the first region AR1 may not be one region in the fourth seating groove 1131S4a.

The fifth housing side portion 1126 may be positioned in the second region AR2. In other words, the second region AR2 may overlap the fifth housing side portion 1126 in the first direction (X-axis direction).

In addition, the second region AR2 may be positioned above the fourth holder outer surface 1131S4 like the first region. In other words, the second region AR2 may correspond to the region positioned above the fourth seating groove 1131S4a.

The tilting guide part may be positioned in the third region AR3. In particular, the base of the tilting guide part may be positioned in the third region AR3. In other words, the third region AR3 may overlap the tilting guide part (e.g., the base) in the first direction (X-axis direction).

In addition, the second region AR2 may be positioned between the first region AR1 and the third region AR3.

In addition, the fastening member may be disposed in the first region AR1, and the first groove gr1 may be positioned in the fastening member 1131a. In an embodiment, the fastening member 1131a may include the first groove gr1 formed in an inner surface 1131aas. In addition, the first magnetic substance may be disposed in the first groove gr1 as described above. In other words, the first magnetic substance may also be positioned in the first region AR1.

In addition, as described above, the fifth housing side portion may be disposed in the second region AR2. The first groove gr1 may be positioned to face the second groove gr2. For example, the first groove gr1 may at least partially overlap the second groove gr2 in the third direction (Z-axis direction).

In addition, a repulsive force generated by the second magnetic substance may be transmitted to the fourth seating groove 1131S4a of the holder 1131 through the fastening member. Therefore, the holder may apply a force to the tilting guide part in the same direction as the repulsive force generated by the second magnetic substance.

The fifth housing side portion may include the second groove gr2 facing the first groove gr1 formed in an outer surface thereof. In addition, as described above, the fifth housing side portion may include the second accommodating groove formed in an inner surface thereof. In addition, the second protrusion may be seated in the second accommodating groove.

In addition, like the second magnetic substance, the repulsive force generated by the first magnetic substance and the second magnetic substance may be applied to the fifth housing side portion. Therefore, the fifth housing side portion and the fastening member may press the tilting guide part disposed between the fifth housing side portion and the holder 1131 through the repulsive force.

The tilting guide part 1141 may be disposed in the third region AR3.

In addition, a first accommodating groove PH1 may be positioned in the fourth seating groove 1131S4a. In addition, the first protrusion of the tilting guide part 1141 may be accommodated in the first accommodating groove PH1. Therefore, a first protrusion PR1 may be in contact with the first accommodating groove. A maximum diameter of the first accommodating groove PH1 may correspond to a maximum diameter of the first protrusion PR1. This may also be applied to the second accommodating groove and a second protrusion PR2 in the same manner. In other words, a maximum diameter of the second accommodating groove may correspond to a maximum diameter of the second protrusion PR2. Therefore, the second protrusion may be in contact with the second accommodating groove. With this configuration, the first axis tilt may be easily performed with respect to the first protrusion, and the second axis tilt may be easily performed with respect to the second protrusion, thereby improving a radius of the tilt.

In addition, in an embodiment, a plurality of first accommodating grooves PH1 may be present. For example, any one of the first accommodating groove PH1 and the second accommodating groove PH2 may include a 1-1 accommodating groove PH1a and a 1-2 accommodating groove PH1b. Hereinafter, it will be described that the first accommodating groove PH1 includes the 1-1 accommodating groove PH1a and the 1-2 accommodating groove PH1b. In addition, the following description may also be applied to the second accommodating groove PH2 in the same manner. For example, the second accommodating groove PH2 may include a 2-1 accommodating groove and a 2-2 accommodating groove, the description of the 1-1 accommodating groove may be applied to the 2-1 accommodating groove, and the description of the 1-2 accommodating groove may be applied to the 2-2 accommodating groove.

The 1-1 accommodating groove PH1a and the 1-2 accommodating groove PH1b may be disposed side by side in the first direction (X-axis direction). The 1-1 accommodating groove PH1a and the 1-2 accommodating groove PH1b may have the same maximum area.

The plurality of first accommodating grooves PH1 may have different numbers of inclined surfaces. For example, the first accommodating groove PH1 may include a groove bottom surface and an inclined surface. In this case, the plurality of accommodating grooves may have different numbers of inclined surfaces. In addition, the bottom surfaces of the accommodating grooves may also have different areas.

For example, the 1-1 accommodating groove PH1a may include a first groove bottom surface LS1 and a first inclined surface CS1. The 1-2 accommodating groove PH1b may include a second groove bottom surface LS2 and a second inclined surface CS2.

In this case, the first groove bottom surface LS1 and the second groove bottom surface LS2 may have different areas. The area of the first groove bottom surface LS1 may be smaller than the area of the second groove bottom surface LS2.

In addition, the number of first inclined surfaces CS1 in contact with the first groove bottom surface LS1 may be different from the number of second inclined surfaces CS2. For example, the number of first inclined surfaces CS1 may be greater than the number of second inclined surfaces CS2.

With this configuration, it is possible to easily compensate for an assembly tolerance of the first protrusion seated in the first accommodating groove PH1. For example, since the number of first inclined surfaces CS1 is greater than the number of second inclined surfaces CS2, the first protrusion may be in contact with more inclined surfaces, and thus the position of the first protrusion in the 1-1 accommodating groove PH1a may be more accurately maintained.

Unlike this, in the 1-2 accommodating groove PH1b, since the number of inclined surfaces in contact with the first protrusion is smaller than that of the 1-1 accommodating groove PH1b, the position of the first protrusion may be easily adjusted.

In an embodiment, the second inclined surfaces CS2 may be disposed to be spaced apart from each other in the second direction (Y-axis direction). In addition, the second groove bottom surface LS2 may extend in the first direction (X-axis direction), and the first protrusion may easily move in the first direction (X-axis direction) in a state of being in contact with the second inclined surface CS2. In other words, the position of the first protrusion may be easily adjusted in the 1-2 accommodating groove PH1b.

In addition, in the embodiment, the first region AR1, the second region AR2, and the third region AR3 may have different heights in the first direction (X-axis direction). In an embodiment, the first region AR1 may have a greater height than the second region AR2 and the third region AR3 in the first direction (X-axis direction). Therefore, a step may be positioned between the first region AR1 and the second region AR2.

In addition, the fastening member 1131a may include the first groove gr1. In other words, the first coupling groove gr1 may be positioned on an inner surface of a member base part 1131aa. In addition, the first magnetic substance described above may be seated in the first groove gr1. In addition, a plurality of first fastening grooves gr1 may be present according to the number of first magnetic substances. In other words, the number of first fastening grooves gr1 may correspond to the number of first magnetic substances.

Furthermore, the area of the first groove gr1 may be different from the area of the second groove. For example, the area of the first groove gr1 may be greater than the area of the second groove. Therefore, the center of gravity may be moved adjacent to the tilting guide part. Therefore, it is possible to reduce a difference in a driving force due to a posture difference and minimize current consumption for rotation.

In addition, the fastening member 1131a may include the member base part 1131aa, a first extension 1131ab, and a second extension 1131ac.

The member base part 1131aa may be positioned on an outermost side of the first camera actuator. The member base part 1131aa may be positioned outside the fifth housing side portion. In other words, the fifth housing side portion may be positioned between the member base part 1131aa and the tilting guide part.

The first extension 1131ab may extend from an edge of the member base part 1131aa in the third direction (Z-axis direction). Furthermore, the first extension 1131ab may be bent and then may extend in the second direction (Y-axis direction). For example, the first extension 1131ab may extend in an opposite direction toward the first groove gr1. In other words, the first extension 1131ab may extend from the member base part 1131aa toward the holder 1131. This is also the same for the second extension 1131ac. In addition, the second extension 1131ac may extend from the edge of the member base part 1131aa in the third direction (Z-axis direction). In an embodiment, the first extension 1131ab and the second extension 1131ac may be positioned on the edge of the member base part 1131aa in the second direction (Y-axis direction). In addition, the first extension 1131ab and the second extension 1131ac may be disposed between the upper member and the lower member.

Therefore, the fastening member 1131a may have a groove formed by the first extension 1131ab and the second extension 1131ac. In other words, the groove may be positioned between the first extension 1131ab and the second extension 1131*ac*. Therefore, the first extension 1131*ab* and the second extension 1131*ac* may be connected to each other by only the member base part 1131*aa*. With this configuration, the fastening member 1131*a* may continuously receive the repulsive force by the first magnetic substance seated on a center of the member base part 1131*aa*, in particular, in the first groove gr1.

In addition, since the fastening member 1131*a* is coupled to the holder and moves upon the X-axis tilt and the Y-axis tilt, the stiffness of the fastening member 1131*a* may be greater than the stiffness of the fifth housing side portion.

Furthermore, as described above, the fifth housing side portion according to the embodiment may have the upper member and the lower member, thereby increasing stiffness. With this configuration, it is possible to reduce a difference in stiffness between the fastening member and the fifth housing side portion. Therefore, when the fastening member 1131*a* and the holder 1131 coupled to the fastening member 1131*a* are tilted to the X axis or the Y axis together, the fastening member 1131*a* may have a small distance adjacent to the fifth housing side portion and may be in contact with the fifth housing side portion. Therefore, as described above, since the fifth housing side portion has improved stiffness, the fifth housing side portion may be easily operated as a stopper. In other words, it is possible to improve the reliability of the camera actuator.

In addition, the first extension 1131*ab* may be spaced apart from the second extension 1131*ac* in the second direction (Y-axis direction) to form a separation space. The fifth housing side portion and the tilting guide part may be seated in the separation space. In addition, the second magnetic substance and the first magnetic substance may be positioned in the separation space.

In addition, the first extension 1131*ab* and the second extension 1131*ac* may have the same length in the third direction (Z-axis direction). Therefore, the coupling force, the weight, and the like are formed in a balanced manner, and thus the holder may be accurately tilted without tilting to one side.

In addition, the first extension 1131*ab* and the second extension 1131*ac* may be coupled to the holder. In the specification, it should be understood that coupling may mean coupling through a bonding member other than the protrusion and groove structure described above. In an embodiment, the first extension 1131*ab* and the second extension 1131*ac* may include a coupling groove 1131L that is open to the outside. The bonding member (e.g., epoxy) may be applied through a coupling groove 1131L, and the first extension 1131*ab* and the second extension 1131*ac* may be easily coupled to the holder or the fourth holder outer surface. However, in the specification, it should be understood that the positions of the protrusion and groove structure for coupling may also be changed.

Figure 9A:
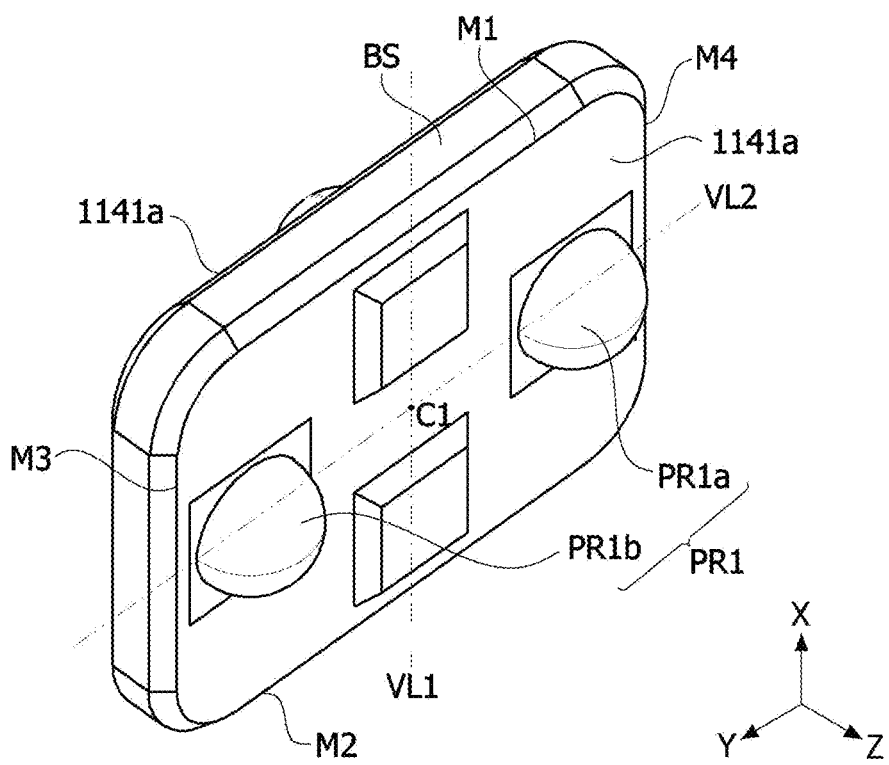
FIG. 9A is a perspective view of a tilting guide part of the first camera actuator according to the embodiment.
Figure 9B:
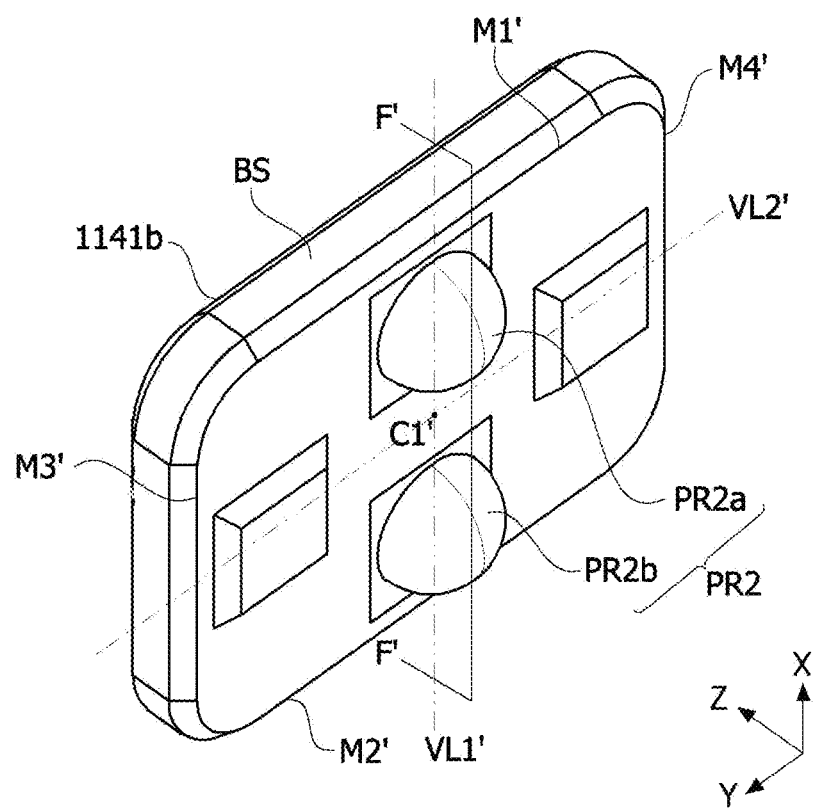
FIG. 9B is a perspective view in a direction different from that of FIG. 9A.

FIG. 9A is a perspective view of a tilting guide part of the first camera actuator according to the embodiment, FIG. 9B is a perspective view in a direction different from that of FIG. 9A, and FIG. 9C is a cross-sectional view along line F-F' in FIG. 9A.

The tilting guide part 1141 according to the embodiment may include a base BS, the first protrusion PR1 protruding from the first surface 1141*a* of the base BS, and the second protrusion PR2 protruding from a second surface 1141*b* of the base BS. In addition, the first protrusion and the second protrusion may be formed on surfaces opposite to each other according to the structure, but the following description will be given on the basis of the drawings. In addition, it should be understood that the first protrusion PR1 and the second protrusion PR2 may be formed integrally with the base BS, and as shown in the drawings, the first protrusion PR1 and the second protrusion PR2 may have a spherical shape like a ball. For example, in the tilting guide part 1141, the base BS may include grooves at positions corresponding to the first protrusion PR1 and the second protrusion PR2. In addition, the ball may be inserted into the groove of the base BS. In addition, the tilting guide part 1141 may also have a structure in which the protrusion (first protrusion or second protrusion) described above, the groove of the base BS, and the ball inserted into the groove are combined in various methods.

First, the base BS may include a first surface 1141*a* and a second surface 1141*b* opposite to the first surface 1141*a*. In other words, the first surface 1141*a* may be spaced apart from the second surface 1141*b* in the third direction (Z-axis direction), and the first surface 1141*a* and the second surface 1141*b* may be outer surfaces opposite to or facing each other in the tilting guide part 1141. For example, the first surface 1141*a* is a surface adjacent to the holder, and the second surface 1141*b* is a surface adjacent to the fifth housing side portion.

The tilting guide part 1141 may include the first protrusion PR1 extending to one side of the first surface 1141*a*. According to the embodiment, the first protrusion PR1 may protrude from the first surface 1141*a* toward the holder. The plurality of first protrusions PR1 may be present and may include a 1-1 protrusion PR1*a* and a 1-2 protrusion PR1*b*.

The 1-1 protrusion PR1*a* and the 1-2 protrusion PR1*b* may be positioned side by side in the second direction (Y-axis direction). In other words, the 1-1 protrusion PR1*a* and the 1-2 protrusion PR1*b* may overlap in the second direction (Y-axis direction). In addition, in an embodiment, the 1-1 protrusion PR1*a* and the 1-2 protrusion PR1*b* may be bisected by a virtual line VL1 or VL2 or a surface extending in the first direction (X-axis direction) or the second direction (Y-axis direction).

In addition, the 1-1 protrusion PR1*a* and the 1-2 protrusion PR1*b* may have a curvature and for example, a hemispherical shape. Therefore, a center of the first protrusion PR1 may be positioned on the first surface 1141*a*. Therefore, the rotation (Y-axis tilt) of the tilting guide part may be performed with respect to the first surface 1141*a*.

In addition, an alignment groove may be positioned in the first surface 1141*a*. The alignment groove may be disposed on one side of the first surface 1141*a* and may provide an assembled position or assembled direction of the tilting guide part 1141 in an assembling process.

In addition, the tilting guide part 1141 may include the second protrusion PR2 extending to one side of the second surface 1141*b*. According to the embodiment, the second protrusion PR2 may protrude from the second surface 1141*b* toward the housing. In addition, a plurality of second protrusions PR2 may be present and may include the 2-1 protrusion PR2*a* and the 2-2 protrusion PR2*b* in the embodiment. Likewise, since a center of the second protrusion PR2 may be present on the second surface 1141*b*, and the rotation (X-axis tilt) of the tilting guide part may be performed with respect to the second surface 1141*b*.

The 2-1 protrusion PR2*a* and the 2-2 protrusion PR2*b* may be positioned side by side in the first direction (X-axis direction). In other words, the 2-1 protrusion PR2*a* and the 2-2 protrusion PR2*b* may overlap in the first direction (X-axis direction). In addition, in an embodiment, the 2-1 protrusion PR2*a* and the 2-2 protrusion PR2*b* may be bisected by a virtual line VL1' or VL2' or a surface extending in the first direction (X-axis direction) or the second direction (Y-axis direction).

The 2-1 protrusion PR2a and the 2-2 protrusion PR2b may have a curvature and for example, a hemispherical shape. In addition, the 2-1 protrusion PR2a and the 2-2 protrusion PR2b may be in contact with the fastening member 1131a at a point spaced apart from the second surface 1141b of the base BS.

The 1-1 protrusion PR1a and the 1-2 protrusion PR1b may be positioned in a region between the 2-1 protrusion PR2a and the 2-2 protrusion PR2b in the second direction. According to the embodiment, the 1-1 protrusion PR1a and the 1-2 protrusion PR1b may be positioned at a center of the separation space between the 2-1 protrusion PR2a and the 2-2 protrusion PR2b in the first direction. With this configuration, the actuator according to the embodiment may have an angle of the X-axis tilt in the same range with respect to the X-axis. In other words, the tilting guide part 1141 may provide a range in which the holder may be tilted to the Y-axis (e.g., a negative/positive range) with respect to the 1-1 protrusion PR1a and the 1-2 protrusion PR1b equally with respect to the Y-axis.

In addition, the 2-1 protrusion PR2a and the 2-2 protrusion PR2b may be positioned in a region between the 1-1 protrusion PR1a and the 1-2 protrusion PR1b in the second direction. According to the embodiment, the 2-1 protrusion PR2a and the 2-2 protrusion PR2b may be positioned at a center of the separation space between the 1-1 protrusion PR1a and the 1-2 protrusion PR1b in the first direction. With this configuration, the actuator according to the embodiment may have the angle of the X-axis tilt in the same range with respect to the X-axis. In other words, the actuator may provide a range in which the tilting guide part 1141 and the holder may be tilted to the X-axis (e.g., a negative/positive range) with respect to the 2-1 protrusion PR2a and the 2-2 protrusion PR2b equally with respect to the X-axis.

Specifically, the first surface 1141a may include a first outer line M1, a second outer line M2, a third outer line M3, and a fourth outer line M4. The first outer line M1 and the second outer line M2 may face each other, and the third outer line M3 and the fourth outer line M4 may face each other. In addition, the third outer line M3 and the fourth outer line M4 may be positioned between the first outer line M1 and the second outer line M2. In addition, the first outer line M1 and the second outer line M2 may be perpendicular to the first direction (X-axis direction), but the third outer line M3 and the fourth outer line M4 may be parallel to the first direction (X-axis direction).

In this case, the first protrusion PR1 may be positioned on the second virtual line VL2. Here, the first virtual line VL1 is a line that bisects the first outer line M1 and the second outer line M2. Alternatively, the first and third virtual lines VL1 and VL1' are lines that bisect the base BS in the second direction (Y-axis direction). Therefore, the tilting guide part 1141 may easily perform the Y-axis tilt through the first protrusion PR1. In addition, since the tilting guide part 1141 performs the Y-axis tilt with respect to the second virtual line VL2, a rotational force may be uniformly applied to the tilting guide part 1141. Therefore, it is possible to precisely perform the X-axis tilt and improve the reliability of the device.

In addition, the 1-1 protrusion PR1a and the 1-2 protrusion PR1b may be disposed symmetrically with respect to the first virtual line VL1 and the second virtual line VL2. Alternatively, the 1-1 protrusion PR1a and the 1-2 protrusion PR1b may be positioned symmetrically with respect to a first center point C1. With this configuration, upon the Y-axis tilt, a support force supported by the first protrusion PR1 may be equally applied above and under the second virtual line VL2. Therefore, it is possible to improve the reliability of the tilting guide part. Here, the second virtual line VL2 is a line that bisects the third outer line M3 and the fourth outer line M4. Alternatively, the second and fourth virtual lines LV2 and LV2' are lines that bisect the base BS in the first direction (X-axis direction).

In addition, the first center point C1 may be an intersection of the first virtual line VL1 and the second virtual line VL2. Alternatively, the first center point C1 may be disposed at a point corresponding to (e.g., overlapping) the center of gravity in the third direction according to the shape of the tilting guide part 1141.

In addition, the second surface 1141b may include a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. In addition, the seventh outer line M3' and the eighth outer line M4' may be positioned between the fifth outer line M1' and the sixth outer line M2'. In addition, the fifth outer line M1' and the sixth outer line M2' may be perpendicular to the first direction (X-axis direction), but the seventh outer line M3' and the eighth outer line M4' may be parallel to the first direction (X-axis direction).

In addition, since the tilting guide part 1141 performs the X-axis tilt with respect to the third virtual line VL1', a rotational force may be uniformly applied to the tilting guide part 1141. Therefore, it is possible to precisely perform the X-axis tilt and improve the reliability of the device.

In addition, the 2-1 protrusion PR2a and the 2-2 protrusion PR2b may be disposed on the third virtual line VL1' symmetrically with respect to the fourth virtual line VL2'. Alternatively, the 2-1 protrusion PR2a and the 2-2 protrusion PR2b may be positioned symmetrically with respect to a second center point C1'. With this configuration, upon the X-axis tilt, a support force supported by the second protrusion PR2 may be equally applied to a left and right of the tilting guide part with respect to the third virtual line VL1'. Therefore, it is possible to improve the reliability of the tilting guide part. Here, the third virtual line LV1' is a line that bisects the fifth outer line M1' and the sixth outer line M2'. In addition, the second center point C1' may be an intersection of the third virtual line VL1' and the fourth virtual line VL2'. Alternatively, the second center point C1' may also be a point corresponding to the center of gravity according to the shape of the tilting guide part 1141.

In addition, a distance between the 1-1 protrusion PR1a and the 1-2 protrusion PR1b in the second direction (Y-axis direction) may be greater than a length of the second protrusion PR2 in the second direction (Y-axis direction). Therefore, when the Y-axis tilt is performed with respect to the 1-1 protrusion PR1a and the 1-2 protrusion PR1b, it is possible to minimize resistance due to the second protrusion PR2.

Correspondingly, a distance between the 2-1 protrusion PR2a and the 2-2 protrusion PR2b in the first direction (X-axis direction) may be greater than a length of the first protrusion PR1 in the first direction (X-axis direction). Therefore, when the X-axis tilt is performed with respect to the 2-1 protrusion PR2a and the 2-2 protrusion PR2b, it is possible to minimize resistance due to the first protrusion PR1.

Figure 10:
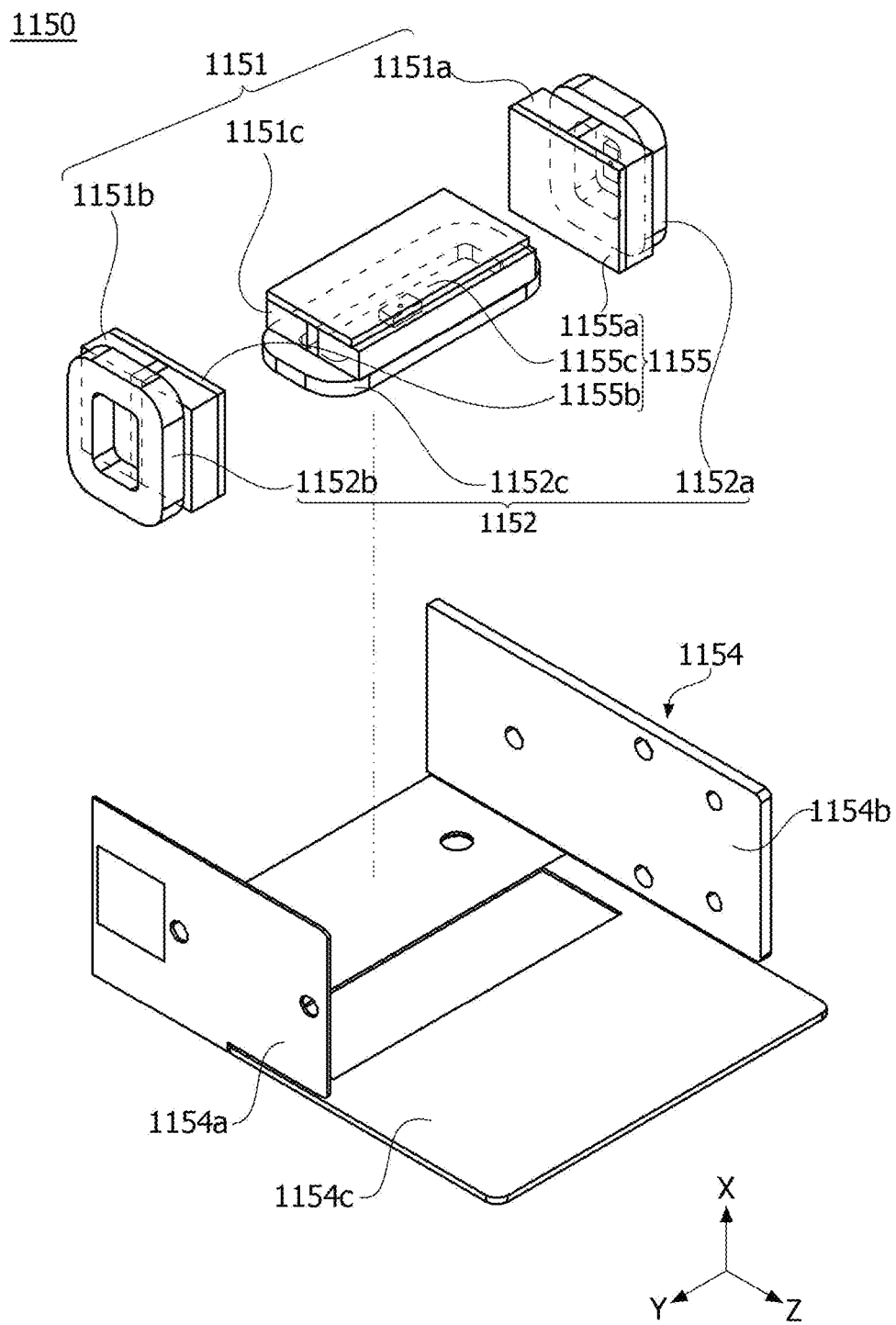
FIG. 10 is a view showing a first driving part of the first camera actuator according to the embodiment.

FIG. 10 is a view showing a first driving part of the first camera actuator according to the embodiment.

Referring to FIG. 10, the first driving part 1150 includes the first driving magnet 1151, the first driving coil 1152, the Hall sensor part 1153, the first board part 1154, and the yoke part 1155.

In addition, as described above, the first driving magnet 1151 may include the first magnet 1151a, the second magnet 1151b, and the third magnet 1151c for providing a driving force by an electromagnetic force. Each of the first magnet 1151a, the second magnet 1151b, and the third magnet 1151c may be positioned adjacent to the outer surface of the holder 1131. For example, each of the first magnet 1151a, the second magnet 1151b, and the third magnet 1151c may be positioned in the groove of the outer surface of the holder 1131.

In addition, the first driving coil 1152 may include a plurality of coils. In an embodiment, the first driving coil 1152 may include at least one coil, and the at least one coil may be positioned to correspond to at least one magnet of the first driving magnet described above. For example, the first driving coil 1152 may include a first coil 1152a, a second coil 1152b, and a third coil 1152c.

The first coil 1152a may be positioned opposite to the first magnet 1151a. Therefore, as described above, the first coil 1152a may be positioned in the first housing hole 1121a of the first housing side portion 1121. In addition, the second coil 1152b may be positioned opposite to the second magnet 1151b. Therefore, as described above, the second coil 1152b may be positioned in the second housing hole 1122a of the second housing side portion 1122.

The second camera actuator according to the embodiment may provide the best optical characteristics by controlling the mover 1130 to rotate along the first axis (X-axis direction) or the second axis (Y-axis direction) by the electromagnetic force between the first driving magnet 1151 and the first driving coil 1152, thereby minimizing the occurrence of a de-center or tilt phenomenon when OIS is implemented.

In addition, according to the embodiment, there may be provided the ultra-slim and ultra-small camera actuator and the camera module including the same, which may implement OIS through the tilting guide part 1141 of the rotational part 1140 disposed between the first housing 1120 and the mover 1130, thereby eliminating the size limitation of the actuator.

The first board part 1154 may include a first board side portion 1154a, a second board side portion 1154b, and a third board side portion 1154c.

The first board side portion 1154a and the second board side portion 1154b may be positioned to face each other. In addition, the third board side portion 1154c may be positioned between the first board side portion 1154a and the second board side portion 1154b.

In addition, the first board side portion 1154a may be positioned between the first housing side portion and the shield can, and the second board side portion 1154b may be positioned between the second housing side portion and the shield can. In addition, the third board side portion 1154c may be positioned between the third housing side portion and the shield can and may be a bottom surface of the first board part 1154.

The first board side portion 1154a may be coupled to and electrically connected to the first coil 1152a. In addition, the first board side portion 1154a may be coupled to and electrically connected to the first Hall sensor 1153a.

The second board side portion 1154b may be coupled to and electrically connected to the second coil 1152b. It should be understood that the second board side portion 1154b may also be coupled to and electrically connected to the first Hall sensor.

The third board side portion 1154c may be coupled to and electrically connected to the third coil 1152c. In addition, the third board side portion 1154c may be coupled to and electrically connected to the second Hall sensor 1153b.

The yoke part 1155 may include a first yoke 1155a, a second yoke 1155b, and a third yoke 1155c. The first yoke 1155a may be positioned in the first seating groove and coupled to the first magnet 1151a. In addition, the second yoke 1155b may be positioned in the second seating groove and coupled to the second magnet 1151b. In addition, the third yoke 1155c may be positioned in the third seating groove and coupled to the third magnet 1151c. The first yoke 1155a to the third yoke 1155c allow the first magnet 1151a to the third magnet 1151c to be easily seated in the first to third seating grooves and coupled to the housing.

Figure 11A:
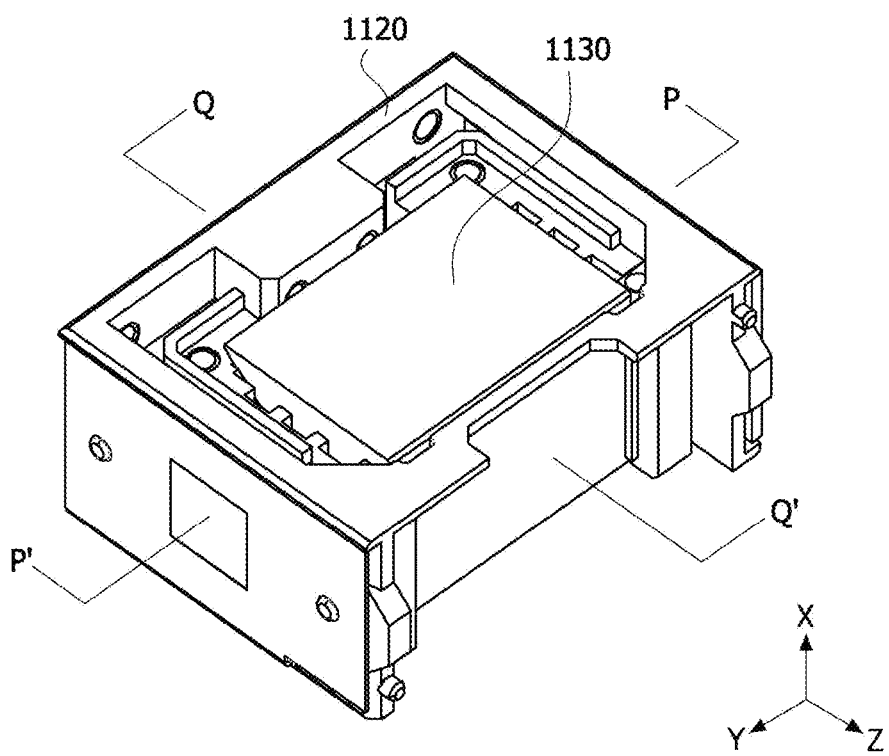
FIG. 11A is a perspective view of the first camera actuator according to the embodiment.
Figure 11B:
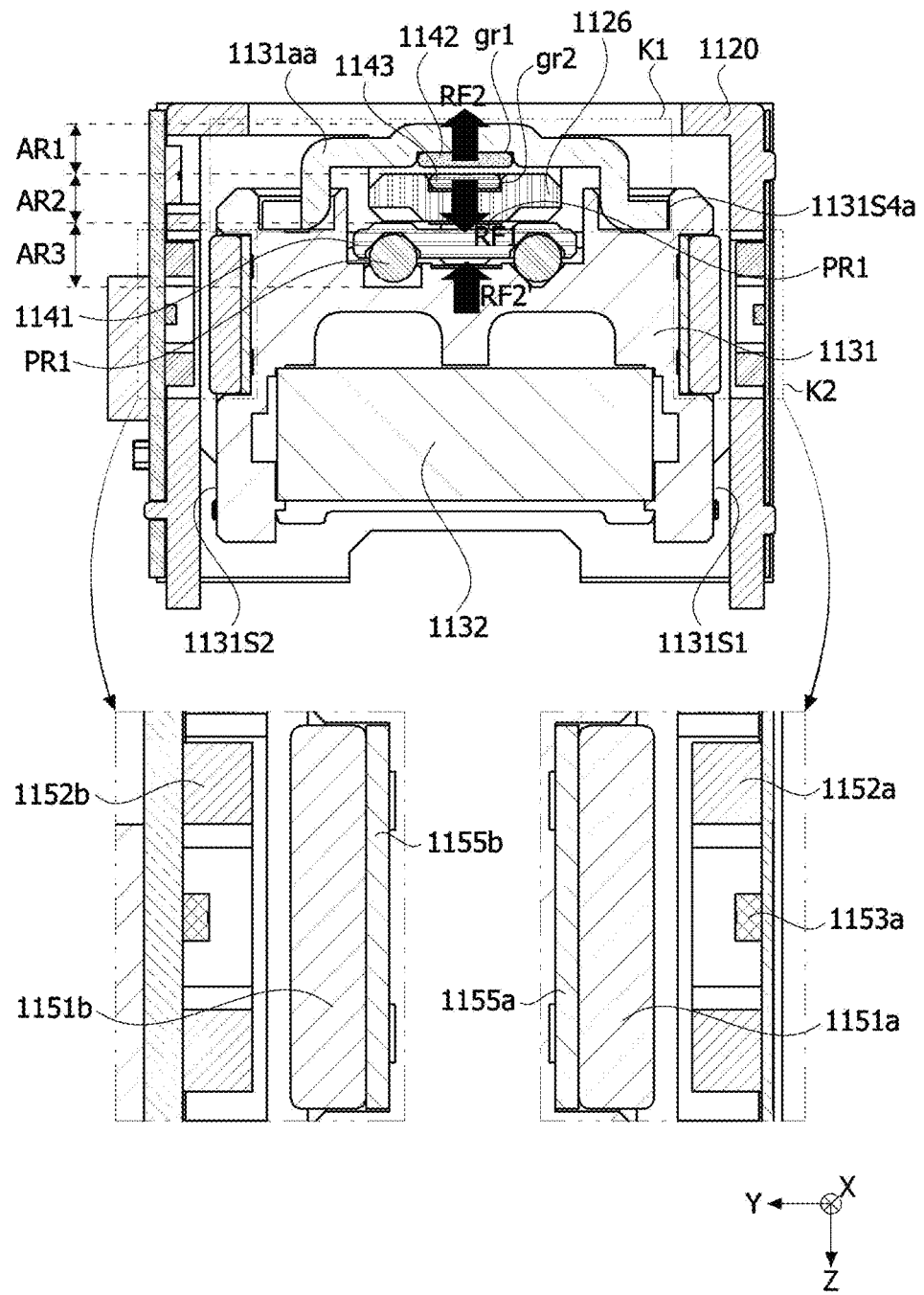
FIG. 11B is a cross-sectional view along line P-P' in FIG. 11A.
Figure 11C:
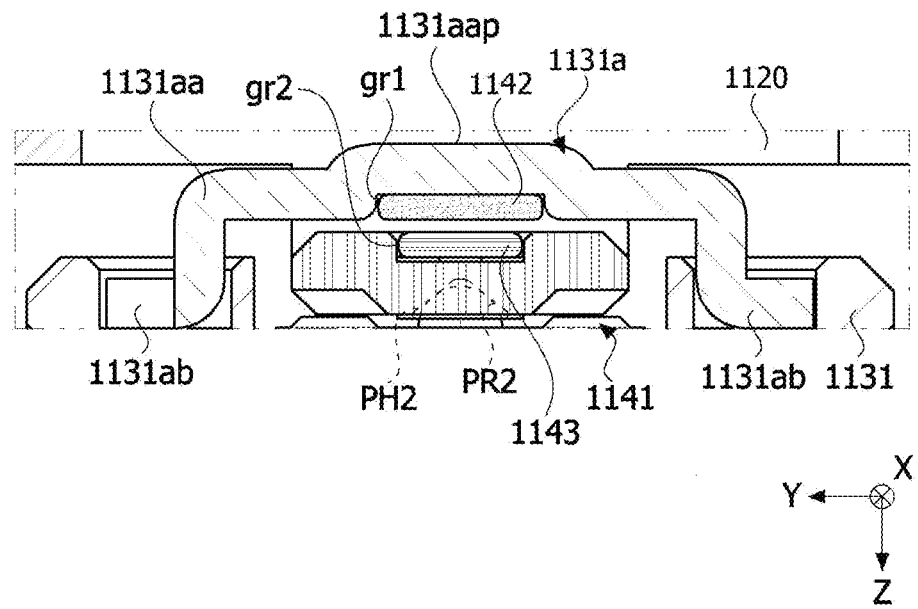
FIG. 11C is an enlarged view of portion K1 in FIG. 11B.
Figure 11D:
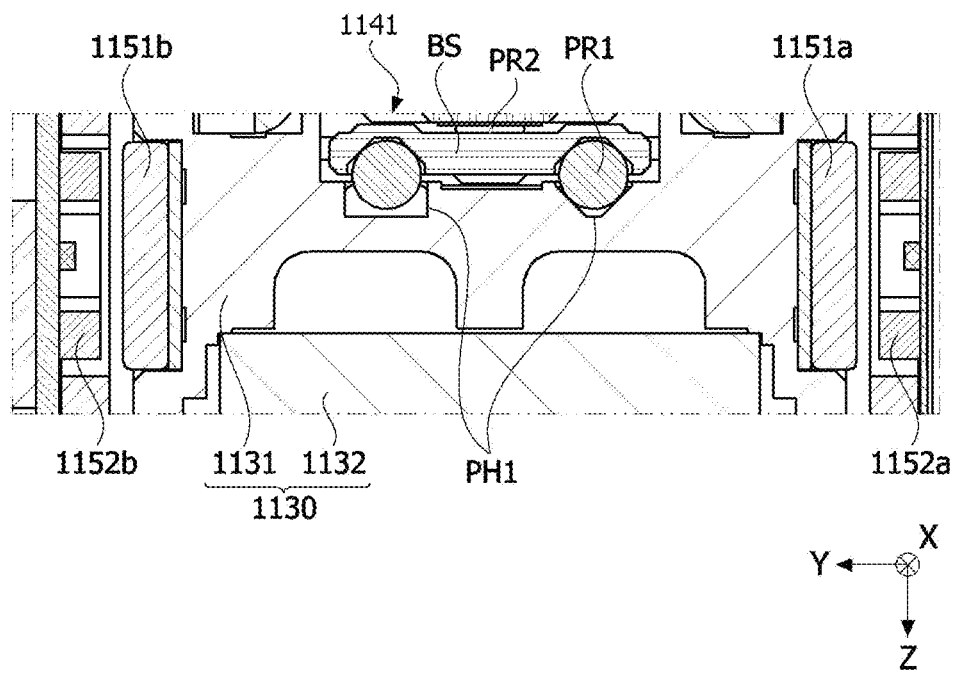
FIG. 11D is an enlarged view of portion K2 in FIG. 11B.
Figure 11E:
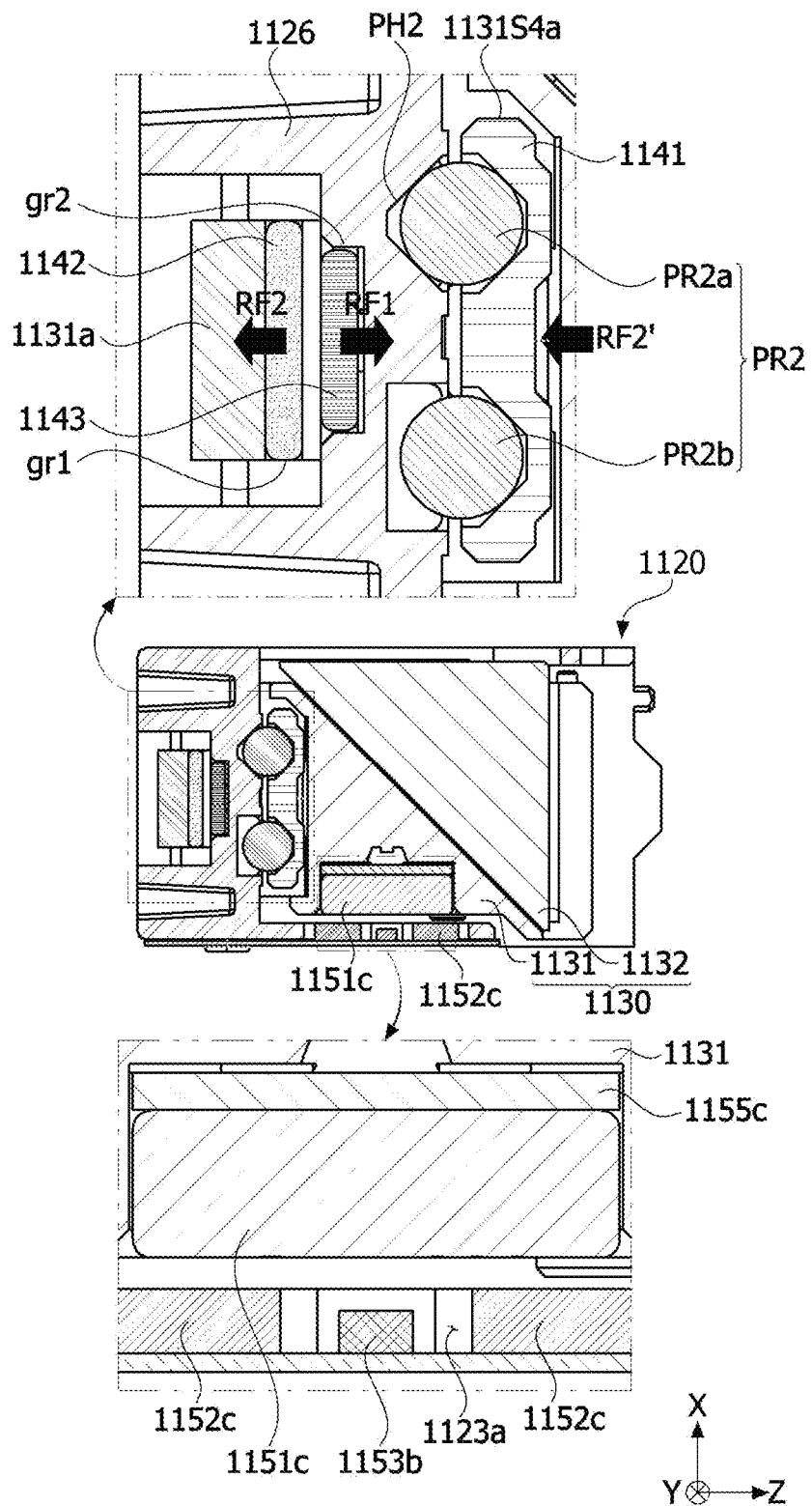
FIG. 11E is a cross-sectional view along line Q-Q' in FIG. 11A.

FIG. 11A is a perspective view of the first camera actuator according to the embodiment, FIG. 11B is a cross-sectional view along line P-P' in FIG. 11A, FIG. 11C is an enlarged view of portion K1 in FIG. 11B, FIG. 11D is an enlarged view of portion K2 in FIG. 11B, and FIG. 11E is a cross-sectional view along line Q-Q' in FIG. 11A.

Referring to FIGS. 11A to 11E, the first coil 1152a may be positioned on the first housing side portion 1121, and the first magnet 1151a may be positioned on the first holder outer surface 1131S1 of the holder 1131. Therefore, the first coil 1152a and the first magnet 1151a may be positioned opposite to each other. The first magnet 1151a may at least partially overlap the first coil 1152a in the second direction (Y-axis direction).

In addition, the second coil 1152b may be positioned on the second housing side portion 1122, and the second magnet 1151b may be positioned on the second holder outer surface 1131S2 of the holder 1131. Therefore, the second coil 1152b and the second magnet 1151b may be positioned opposite to each other. The second magnet 1151b may at least partially overlap the second coil 1152b in the second direction (Y-axis direction).

In addition, the first coil 1152a and the second coil 1152b may overlap in the second direction (Y-axis direction), and the first magnet 1151a and the second magnet 1151b may overlap in the second direction (Y-axis direction).

With this configuration, the electromagnetic forces applied to the outer surfaces of the holder (first holder outer surface and second holder outer surface) may be positioned on an axis parallel to the second direction (Y-axis direction), thereby performing the X-axis tilt accurately and precisely.

In addition, the second protrusions PR2a and PR2b of the tilting guide part 1141 may be in contact with the fifth housing side portion 1126 of the first housing 1120. The second protrusion PR2 may be seated in the second accommodating groove PH2 formed in one side surface of the fifth housing side portion 1126. In addition, when the X-axis tilt is performed, the second protrusions PR2a and PR2b may be reference axes (or rotational axes) of the tilt. Therefore, the tilting guide part 1141 and the mover 1130 may move in the second direction.

In addition, as described above, the first Hall sensor 1153a may be positioned outside for electrical connection and coupling with the first board part 1154. However, the present invention is not limited to these positions.

In addition, the third coil 1152c may be positioned on the third housing side portion 1123, and the third magnet 1151c may be positioned on the third holder outer surface 1131S3 of the holder 1131. The third coil 1152c and the third magnet 1151c may at least partially overlap in the first direction (X-axis direction). Therefore, an intensity of the electromagnetic force between the third coil 1152c and the third magnet 1151c may be easily controlled.

As described above, the tilting guide part 1141 may be positioned on the fourth holder outer surface 1131S4 of the holder 1131. In addition, the tilting guide part 1141 may be seated in the fourth seating groove 1131S4a of the fourth holder outer surface. As described above, the fourth seating groove 1131S4a may include the first region, the second region, and the third region described above.

The fastening member 1131a may be disposed in the first region, and the fastening member 1131a may include the first groove gr1 formed in an inner surface thereof. In addition, as described above, the first magnetic substance 1142 may be disposed in the first groove gr1, and a repulsive force RF2 generated by the first magnetic substance 1142 may be transmitted to the fourth seating groove 1131S4a of the holder 1131 through the fastening member 1131a (RF2'). Therefore, the holder 1131 may apply a force to the tilting guide part 1141 in the same direction as the repulsive force RF2 generated by the first magnetic substance 1142.

The fifth housing side portion 1126 may be disposed in the second region. The fifth housing side portion 1126 may include the second groove gr2 facing the first groove gr1. In addition, the fifth housing side portion 1126 may include the second accommodating groove PH2 disposed on a surface opposite to the second groove gr2. In addition, a repulsive force RF1 generated by the second magnetic substance 1143 may be applied to the fifth housing side portion 1126. Therefore, the fifth housing side portion 1126 and the fastening member 1131a may press the tilting guide part 1141 disposed between the fifth housing side portion 1126 and the holder 1131 through the generated repulsive forces RF1 and RF2'. Therefore, the coupling between the holder 1131, the first housing 1120, and the tilting guide part 1141 may be maintained even after the holder is tilted to the X-axis or the Y-axis by the current applied to the first and second coils or the third coil 1152c.

The tilting guide part 1141 may be disposed in the third region. As described above, the tilting guide part 1141 may include the first protrusion PR1 and the second protrusion PR2. In this case, the first protrusion PR1 and the second protrusion PR2 may also be respectively disposed on the second surface and the first surface of the base. As described above, even in other embodiments to be described below, the first protrusion PR1 and the second protrusion PR2 may be variously positioned on the facing faces of the base.

The first accommodating groove PH1 may be positioned in the fourth seating groove 1131S4a. In addition, the first protrusion PR1 of the tilting guide part 1141 may be accommodated in the first accommodating groove PH1. Therefore, the first protrusion PR1 may be in contact with the first accommodating groove PH1. The maximum diameter of the first accommodating groove PH1 may correspond to the maximum diameter of the first protrusion PR1. This may also be applied to the second accommodating groove PH2 and the second protrusion PR2 in the same manner. In other words, the maximum diameter of the second accommodating groove PH2 may correspond to the maximum diameter of the second protrusion PR2. In addition, therefore, the second protrusion PR2 may be in contact with the second accommodating groove PH2. With this configuration, the first axis tilt may be easily performed with respect to the first protrusion PR1, and the second axis tilt may be easily performed with respect to the second protrusion PR2, thereby improving the radius of the tilt.

In addition, the tilting guide part 1141 may be disposed side by side with the fastening member 1131a and the fifth housing side portion 1126 in the third direction (Z-axis direction), and thus the tilting guide part 1141 and the optical member 1132 may partially overlap in the first direction (X-axis direction). More specifically, in an embodiment, the first protrusion PR1 may overlap the optical member 1132 in the first direction (X-axis direction). Furthermore, at least a portion of the first protrusion PR1 may overlap the third coil 1152c or the third magnet 1151c in the first direction (X-axis direction). In other words, in the camera actuator according to the embodiment, each protrusion, which is the center axis of the tilt, may be positioned adjacent to a center of gravity of the mover 1130. Therefore, the tilting guide part may be positioned adjacent to a center of gravity of the holder. Therefore, the camera actuator according to the embodiment can minimize a moment value for tilting the holder and also minimize the consumption of the current applied to the coil part or the like in order to tilt the holder, thereby improving power consumption and the reliability of the device.

In addition, the first magnetic substance 1142 and the second magnetic substance 1143 may not overlap the third coil 1152c or the optical member 1132 in the first direction (X-axis direction). In other words, in an embodiment, the first magnetic substance 1142 and the second magnetic substance 1143 may be disposed to be spaced apart from the third coil 1152c or the optical member 1132 in the third direction (Z-axis direction). Furthermore, the first magnetic substance 1142 and the second magnetic substance 1143 may be disposed to be spaced apart from the tilting guide part 1141 in a direction opposite to the third direction. Therefore, the third coil 1152c can minimize the magnetic force received from the first magnetic substance 1142 and the second magnetic substance 1143. Therefore, the camera actuator according to the embodiment can easily perform a vertical driving (Y-axis tilt) and minimize power consumption.

Furthermore, as described above, the second Hall sensor 1153b positioned inside the third coil 1153c may detect a change in magnetic flux, and thus perform position sensing between the third magnet 1151c and the second Hall sensor 1153b. In this case, an offset voltage of the second Hall sensor 1153b may be changed depending on the influence of the magnetic field formed from the first magnetic substance 1142 and the second magnetic substance 1143.

In the first camera actuator according to the embodiment, the fastening member 1131a, the first magnetic substance 1142, the second magnetic substance 1143, the fifth housing side portion 1126, the tilting guide part 1141, and the holder 1131 may be sequentially disposed. However, since the first magnetic substance may be positioned on the fastening member and the second magnetic substance may be positioned on the fifth housing side portion, the fastening member, the fifth housing side portion, the tilting guide part, and the holder may be sequentially disposed.

In addition, in an embodiment, separation distances of the first magnetic substance 1142 and the second magnetic substance 1143 from the holder 1131 (or the optical member 1132) in the third direction may be greater than separation distances from the tilting guide part 1141. Therefore, the second Hall sensor 1153b under the holder 1131 may also be disposed to be spaced apart by a predetermined distance from the first magnetic substance 1142 and the second magnetic substance 1143. Therefore, it is possible to minimize the influence of the magnetic field formed by the first magnetic substance 1142 and the second magnetic substance 1143 in the second Hall sensor 1153b, thereby inhibiting a Hall voltage from being concentrated to a positive or negative value and saturated. In other words, with this configuration, a Hall electrode may have a range in which Hall calibration may be performed. Furthermore, a temperature also affects the electrode of the Hall sensor, and a resolution of the camera lens varies depending on the temperature, but in an embodiment, by inhibiting a case in which the Hall voltage is concentrated to the positive or negative value, it is also possible to compensate for the resolution of the lens in response thereto, thereby easily inhibiting a reduction in the resolution.

In addition, it is also possible to easily design a circuit for compensating for an offset of the output (i.e., the Hall voltage) of the second Hall sensor 1153b.

The tilting guide part 1141 may be seated in the fourth seating groove 1131S4a with respect to the base except for the first protrusion PR1 and the second protrusion PR2. In other words, a length of the base BS in the third direction (Z-axis direction) may be smaller than a length of the fourth seating groove 1131S4a in the third direction (Z-axis direction). With this configuration, it is possible to easily realize miniaturization.

In addition, a maximum length of the tilting guide part 1141 in the third direction (Z-axis direction) may be greater than the length of the fourth seating groove 1131S4a in the third direction (Z-axis direction). Therefore, as described above, an end of the second protrusion PR2 may be positioned between the fourth holder outer surface and the fifth housing side portion 1126. In other words, at least a portion of the second protrusion PR2 may be positioned in a direction opposite to the third direction (Z-axis direction) from the holder 1131. In other words, the holder 1131 may be spaced apart by a predetermined distance from the end of the second protrusion PR2 (the portion in contact with the second accommodating groove) in the third direction (Z-axis direction).

The fifth housing side portion 1126 may have an inward extended and bent structure. In addition, a partial region of the fastening member 1131a may be positioned in a groove formed by the extended and bent structure of the fifth housing side portion 1126 described above. With this configuration, the fastening member 1131a may be positioned inside the fifth housing side portion 1126, thereby improving space efficiency and realizing miniaturization. Furthermore, even when a driving (tilt or rotation of the mover 1130) by the electromagnetic force is performed, the fastening member 1131a does not protrude to the outside of the fifth housing side portion 1126, and thus can be blocked from being in contact with surrounding devices. Therefore, it is possible to improve reliability.

In addition, a predetermined separation space may be present between the first magnetic substance 1142 and the second magnetic substance 1143. In other words, the first magnetic substance 1142 and the second magnetic substance 1143 may be opposite to each other with the same polarity.

In addition, as described above, the first driving part may rotate and drive the mover 1130 in the first housing with respect to the first direction (X-axis direction) or the second direction (Y-axis direction). In this case, in the first driving part, the driving magnet may include at least one magnet, and the driving coil may also include at least one coil. In this case, at least a portion of at least one magnet may overlap the tilting guide part 1141 in the first direction (X-axis direction) or the second direction (Y-axis direction). Furthermore, at least a portion of at least one coil may also overlap the tilting guide part 1141 in the first direction (X-axis direction) or the second direction (Y-axis direction).

The first magnet 1151a and the second magnet 1151b may overlap in the second direction (Y-axis direction), and the tilting guide part 1141 may be positioned in a region between the first magnet 1151a and the second magnet 1151b in the second direction (Y-axis direction).

A portion of the tilting guide part 1141 may be positioned between the first magnet 1151a and the second magnet 1151b and may overlap the first magnet 1151a and the second magnet 1151b in the second direction (Y-axis direction).

For example, the first protrusion PR1 of the tilting guide part 1141 may overlap the first magnet 1151a and the second magnet 1151b in the second direction (Y-axis direction). In this case, the first protrusion PR1 may be positioned between the mover 1130 and the base BS of the tilting guide part 1141.

Therefore, the separation distances of the first magnet 1151a and the second magnet 1151b from the tilting guide part 1141 in the third direction (Z-axis direction) can be reduced. In other words, the first magnet 1151a and the second magnet 1151b may be positioned adjacent to the tilting guide part 1141. Therefore, the center of gravity of the holder 1131 on which the first magnet 1151a and the second magnet 1151b are seated or the mover 1130 including the holder 1131 may be positioned adjacent to the tilting guide part 1141. In other words, the center of gravity of the holder 1131 or the mover 1130 including the holder 1131 may be adjacent to the tilting guide part 1141 having a rotational axis or a rotation surface for rotation driving, and thus it is possible to reduce a change in the moment or energy (e.g., a current) consumed for tilt driving at a certain angle according to a posture of the camera actuator or the camera module. In other words, it is possible to reduce the influence due to the posture difference. Therefore, the camera actuator and the camera module according to the embodiment can perform the tilting driving more accurately. In addition, as the movement of the center of gravity described above becomes close to the rotational axis or the rotational surface, the electromagnetic force, which is a force for rotating the mover (or the holder), can be reduced. In other words, it is possible to improve energy efficiency for driving the camera actuator or camera module. In other words, the first driving part may be positioned adjacent to the tilting guide part 1141. In this case, the first driving part means the first driving magnet and the first driving coil, and hereinafter, each of the first driving magnet and the first driving coil will be described.

Furthermore, the base BS of the tilting guide part 1141 may at least partially overlap the first magnet 1151a and the second magnet 1151b in the second direction (Y-axis direction). Therefore, the first magnet 1151a and the second magnet 1151b may be disposed closer to the tilting guide part 1141. However, when the first magnet 1151a and the second magnet 1151b are positioned in front of the rotational axis or the rotational surface, the electromagnetic force required for tilt in the second direction (Y-axis direction) increases, and thus a center of the first magnet 1151a and the second magnet 1151b (point that bisects the two magnets in the third direction) may be disposed to be spaced apart from the first protrusion PR1 in the third direction (Z-axis direction) without overlapping in the second direction (Y-axis direction). Furthermore, the center of the first magnet 1151a and the second magnet 1151b (point that bisects the two magnets in the third direction) may be positioned on a rear end of the first protrusion PR1, that is, toward the third direction (Z-axis direction).

Correspondingly, the base BS of the tilting guide part 1141 may at least partially overlap the first coil 1152*a* and the second coil 1152*b* in the second direction (Y-axis direction). Therefore, like the first magnet and the second magnet described above, the first coil 1152*a* and the second coil 1152*b* may be disposed closer to the tilting guide part 1141. Therefore, it is possible to reduce the electromagnetic force required for tilt and reduce the influence due to the posture difference.

In addition, the third magnet disposed on the third holder outer surface may at least partially overlap the first protrusion PR1 in the first direction (X-axis direction). Therefore, the center of gravity of the holder 1131 or the mover 1130 including the holder 1131 may further move toward the tilting guide part 1141. Therefore, as described above, it is possible to reduce the influence due to the posture difference. Therefore, the camera actuator and the camera module according to the embodiment can perform the tilting driving more accurately. In addition, as the movement of the center of gravity described above becomes close to the rotational axis or the rotational surface, the electromagnetic force, which is a force for rotating the mover (or the holder), can be reduced. In other words, it is possible to improve energy efficiency for driving the camera actuator or camera module. The description of the third magnet may also be applied to the third coil in the same manner. In other words, the third coil may at least partially overlap the first protrusion PR1 in the first direction.

According to the embodiment, the center of gravity of the holder 1131 or the mover 1130 including the holder 1131 may be positioned to overlap the first protrusion PR1 in the third direction (Z-axis direction). Therefore, it is possible to suppress an increase in the change in the electromagnetic force according to the rotational direction or the posture difference. Therefore, the camera actuator and the camera module according to the embodiment can accurately perform tilting.

Furthermore, as described above, the mover 1130 may include the fastening member 1131*a* passing through one side portion of the housing (e.g., the fifth housing side portion) and may be coupled to the housing by the fastening member 1131*a*. Furthermore, the first groove gr1 may be present in the fastening member 1131*a*, and the first magnetic substance 1142 may be positioned in the first groove gr1.

In addition, the second groove gr2 may be positioned on one side portion of the housing, for example, the outer surface of the fifth housing side portion. The second groove gr2 may be positioned to face the first groove gr1 of the fastening member 1131*a*. In addition, the second magnetic substance 1143 may be positioned in the second groove gr2. Therefore, the mover 1130 and the fastening member 1131*a* coupled to the mover 1130 and integrally performing the first axis tilt and the second axis tilt are coupled to the first magnetic substance 1142, and the first magnetic substance 1142 and the second magnetic substance 1143 are positioned on the front end of the tilting guide part 1141, and thus the centers of gravity of the mover 1130 and the fastening member 1131*a* may be positioned closer to the tilting guide part 1141 as described above. Therefore, it is possible to reduce the change in the moment due to the posture difference and minimize the electromagnetic force required for tilt. In this case, the second magnetic substance 1143 may be positioned between the first magnetic substance 1142 and the mover 1130 in the third direction.

In addition, the fastening member 1131*a* may be a non-magnetic substance and made of metal. Furthermore, the fastening member 1131*a* may have a protrusion region 1131*aap* protruding in a direction opposite to the third direction (Z-axis direction), and thus the center of gravity described above may be positioned closer to the tilting guide part 1141. Furthermore, the first magnetic substance 1142 and the second magnetic substance 1143 may be disposed to at least partially overlap the first protrusion PR1 in the third direction (Z-axis direction), thereby minimizing the influence due to the posture difference.

In addition, the first magnetic substance 1142 and the second magnetic substance 1143 may have different lengths in the first direction (X-axis direction) or the second direction (Y-axis direction), thereby further reducing the change in the electromagnetic force due to the posture difference.

In addition, the mover 1130 according to the embodiment may include the holder 1131 and the optical member 1132. In addition, as described above, the first driving magnet and the first driving coil may be disposed on a portion of the outer surface of the holder 1131. In this case, the holder 1131 may include a first sidewall and a second sidewall. Here, the first sidewall may be the first holder outer surface, the second holder outer surface, and the third holder outer surface where the magnet or the coil is positioned adjacent thereto. In addition, the second sidewall may be the fourth holder outer surface where the tilting guide part 1141 is positioned.

Based on this, the first sidewall may be disposed perpendicular to the second sidewall. Furthermore, the second sidewall may include a cavity in which the tilting guide part 1141 is disposed. In this case, the cavity may correspond to the third region AR3 and may be a region formed by the fourth outer seating groove as a space where the tilting guide part 1141 is disposed. In addition, at least a portion of the cavity according to the embodiment may overlap at least a portion of the first driving magnet or the first driving coil in a direction perpendicular to the optical axis. For example, the cavity may overlap at least a portion of the first magnet and the second magnet of the first driving magnet in the second direction. In addition, the cavity may overlap at least a portion of the first coil and the second coil of the first driving coil in the second direction. In addition, the cavity may overlap the third magnet of the first driving magnet in the first direction. In addition, the cavity may overlap the third coil of the first driving coil in the first direction.

In addition, at least a portion of the cavity may be in contact with at least a portion of the tilting guide part 1141. In other words, since the tilting guide part 1141 may be seated in the third region AR3 and the tilting guide part 1141 is in close contact with the housing and the holder by the repulsive force, at least a portion of the tilting guide part 1141 may be in contact with the cavity. In other words, at least a portion of the tilting guide part 1141 may be positioned in the cavity.

Figure 12A:
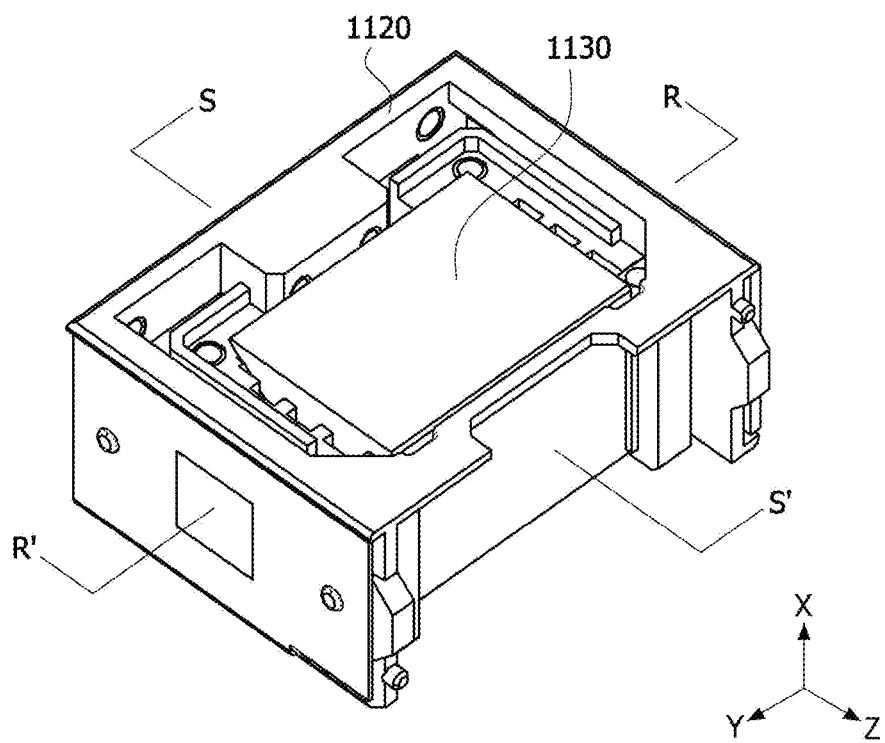
FIG. 12A is a perspective view of the first camera actuator according to the embodiment.
Figure 12B:
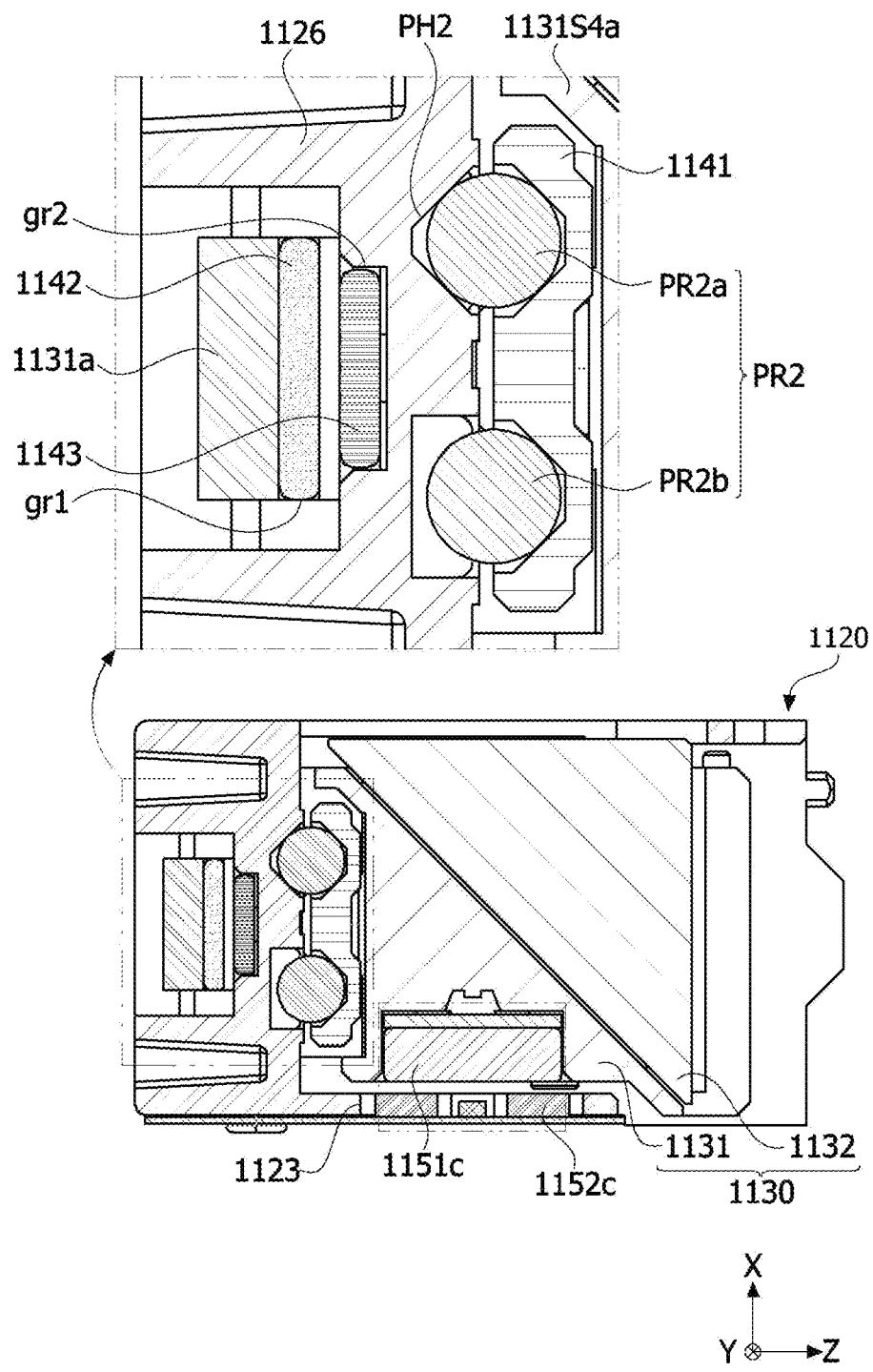
FIG. 12B is a cross-sectional view along line S-S' in FIG. 12A.

FIG. 12A is a perspective view of the first camera actuator according to the embodiment, FIG. 12B is a cross-sectional view along line S-S' in FIG. 12A, and FIG. 12C is an exemplary view of the movement of the first camera actuator shown in FIG. 12B.

Referring to FIGS. 12A to 12C, the Y-axis tilt may be performed in the first camera actuator according to the embodiment. In other words, OIS can be implemented by the rotation in the first direction (X-axis direction).

In an embodiment, the third magnet 1151*c* disposed under the holder 1131 may tilt or rotate the mover 1130 and the fastening member 1131*a* with respect to the second direction (Y-axis direction) by generating an electromagnetic force with the third coil 1152*c*.

Specifically, the repulsive force between the first magnetic substance 1142 and the second magnetic substance 1143 may be transmitted to the fastening member 1131*a* and the fifth housing side portion 1126 and finally transmitted to the tilting guide part 1141 disposed between the fifth housing side portion 1126 and the holder 1131. Therefore, as described above, the tilting guide part 1141 may be pressed by the mover 1130 and the first housing 1120 by the repulsive force described above.

In addition, the 1-1 protrusion PR1*a* and the 1-2 protrusion PR1*b* may be spaced apart in the second direction (Y-axis direction) and supported by the first accommodating groove PH1 formed in the fourth seating groove 1131S4*a* of the holder 1131. In addition, in an embodiment, the tilting guide part 1141 may rotate or tilt about the first protrusion PR1 protruding toward the holder 1131 (e.g., in the third direction), which is a reference axis (or a rotational axis), that is, with respect to the second direction (Y-axis direction).

For example, OIS can be implemented by rotating (X1→X1*a* or X1*b*) the mover 1130 at a first angle θ1 in the X-axis direction or the direction opposite to the X-axis direction by first electromagnetic forces F1A and F1B between the third magnet 1151*c* disposed in the third seating groove and the third coil part 1152*c* disposed on the third board side portion. The first angle θ1 may be in the range of ±1° to ±3°. However, the present invention is not limited thereto.

Hereinafter, in the first camera actuator according to various embodiments, the electromagnetic force may move the mover by generating a force in the described direction or move the mover in the described direction even when generating a force in another direction. In other words, the described direction of the electromagnetic force means a direction of the force generated by the magnet and the coil to move the mover.

In addition, the first magnetic substance 1142 and the second magnetic substance 1143 may have different lengths in the first direction (X-axis direction).

In an embodiment, an area of the first magnetic substance 1142 coupled to the fastening member 1131*a* and tilted together with the mover 1130 may be greater than an area of the second magnetic substance 1143. For example, the length of the first magnetic substance 1142 in the first direction (X-axis direction) may be greater than the length of the second magnetic substance 1143 in the first direction (X-axis direction). In addition, the length of the first magnetic substance 1142 in the second direction (Y-axis direction) may be greater than the length of the second magnetic substance 1143 in the second direction (Y-axis direction). In addition, the second magnetic substance 1143 may be positioned between virtual straight lines extending both ends of the first magnetic substance 1142 in the third direction.

With this configuration, upon tilting or rotating, even when the magnetic substance on one side (e.g., the second magnetic substance) is tilted, it is possible to easily inhibit the generation of forces other than a vertical force due to the tilt. In other words, even when the second magnetic substance is vertically tilted together with the mover 1130, the mover 1130 may not receive a force against the tilt (e.g., the repulsive force or the attractive force) from the second magnetic substance 1143. Therefore, it is possible to improve driving efficiency.

Figure 13A:
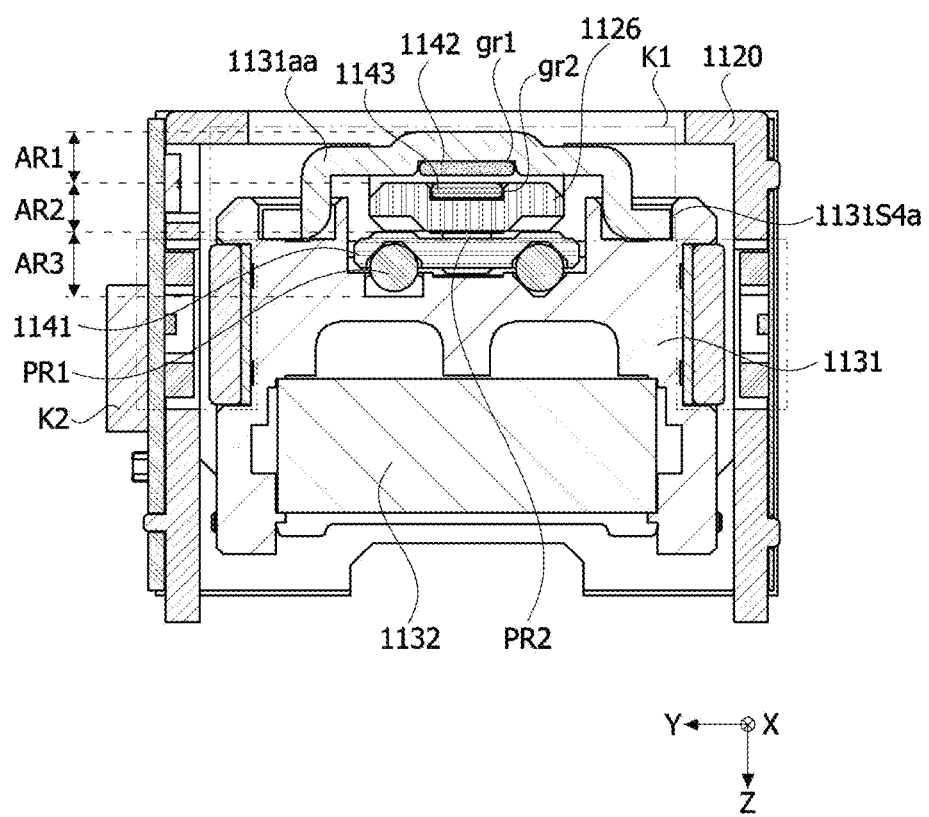
FIG. 13A is a cross-sectional view along line R-R' in FIG. 12A.
Figure 13B:
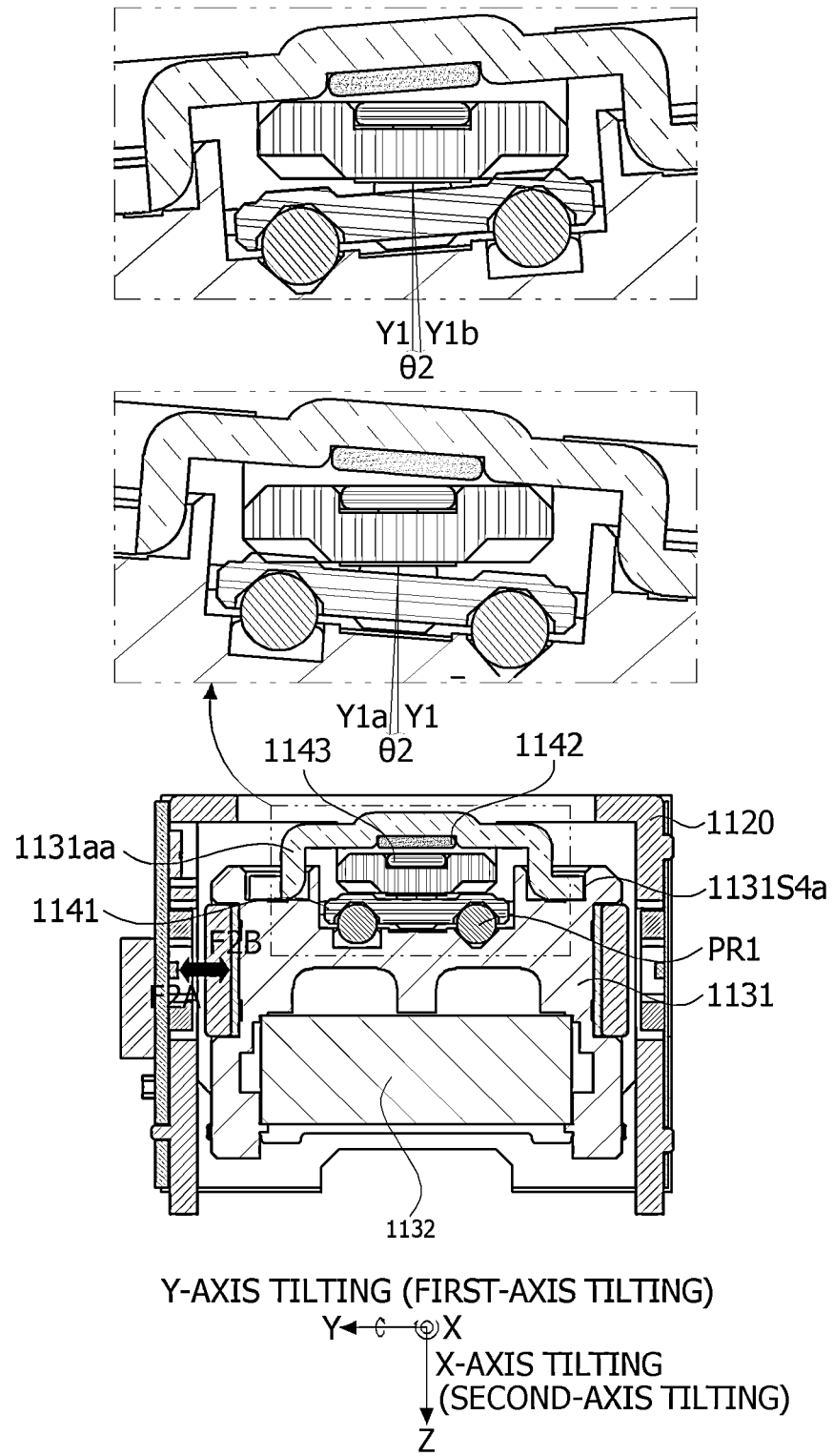
FIG. 13B is an exemplary view of the movement of the first camera actuator shown in FIG. 13A.

FIG. 13A is a cross-sectional view along line R-R' in FIG. 12A, and FIG. 13B is an exemplary view of the movement of the first camera actuator shown in FIG. 13A.

Referring to FIGS. 13A and 13B, the X-axis tilt may be performed. In other words, OIS can be implemented by tilting or rotating the mover 1130 in the Y-axis direction.

In an embodiment, the first magnet 1151*a* and the second magnet 1151*b* disposed on the holder 1131 may respectively tilt or rotate the tilting guide part 1141, the mover 1130, and the fastening member 1131*a* with respect to the first direction (X-axis direction) by generating the electromagnetic forces with the first coil 1152*a* and the second coil 1152*b* in the first direction (X-axis direction).

Specifically, the repulsive force between the first magnetic substance 1142 and the second magnetic substance 1143 may be transmitted to the fifth housing side portion 1126 and the holder 1131 and finally transmitted to the tilting guide part 1141 between the holder 1131 and the fifth housing side portion 1126. Therefore, the tilting guide part 1141 may be pressed by the mover 1130 and the first housing 1120 by the repulsive force described above.

In addition, the second protrusion PR2 may be supported by the fifth housing side portion 1126. In this case, in an embodiment, the tilting guide part 1141 may rotate or tilt about the second protrusion PR2 protruding toward the holder 1131, which is the reference axis (or the rotational axis), that is, with respect to the first direction (X-axis direction). In other words, the tilting guide part 1141 may rotate or tilt about the second protrusion PR2 protruding toward the fifth housing side portion 1126, which is the reference axis (or the rotational axis), that is, in the second direction (Y-axis direction).

For example, OIS can be implemented by rotating (Y1→>Y1*a* or Y1*b*) the mover 1130 at a second angle θ2 in the Y-axis direction or the direction opposite to the Y-axis direction by second electromagnetic forces F2A and F2B between the first and second magnets 1151*a* and 1151*b* disposed in the first seating groove and the first and second coil parts 1152*a* and 1152*b* disposed on the first and second board side portions. The second angle θ2 may be in the range of ±1° and 3°. However, the present invention is not limited thereto.

In addition, as described above, the electromagnetic forces by the first and second magnets 1151*a* and 1151*b* and the first and second coil parts 1152*a* and 1152*b* may act in the third direction or a direction opposite to the third direction. For example, the electromagnetic force may be generated from a left portion of the mover 1130 in the third direction (Z-axis direction) and may act from a right portion of the mover 1130 in the direction opposite to the third direction (Z-axis direction). Therefore, the mover 1130 may rotate with respect to the first direction. Alternatively, the mover 1130 may move in the second direction.

As described above, the second camera actuator according to the embodiment may provide the best optical characteristics by controlling the mover 1130 to rotate in the first direction (X-axis direction) or the second direction (Y-axis direction) by the electromagnetic force between the first driving magnet in the holder and the first driving coil disposed in the first housing, thereby minimizing the occurrence of the de-center or tilt phenomenon when OIS is implemented. In addition, as described above, the "Y-axis tilt" refers to rotating or tilting in the first direction (X-axis direction), and the "X-axis tilt" refers to rotating or tilting in the second direction (Y-axis direction).

Figure 14:
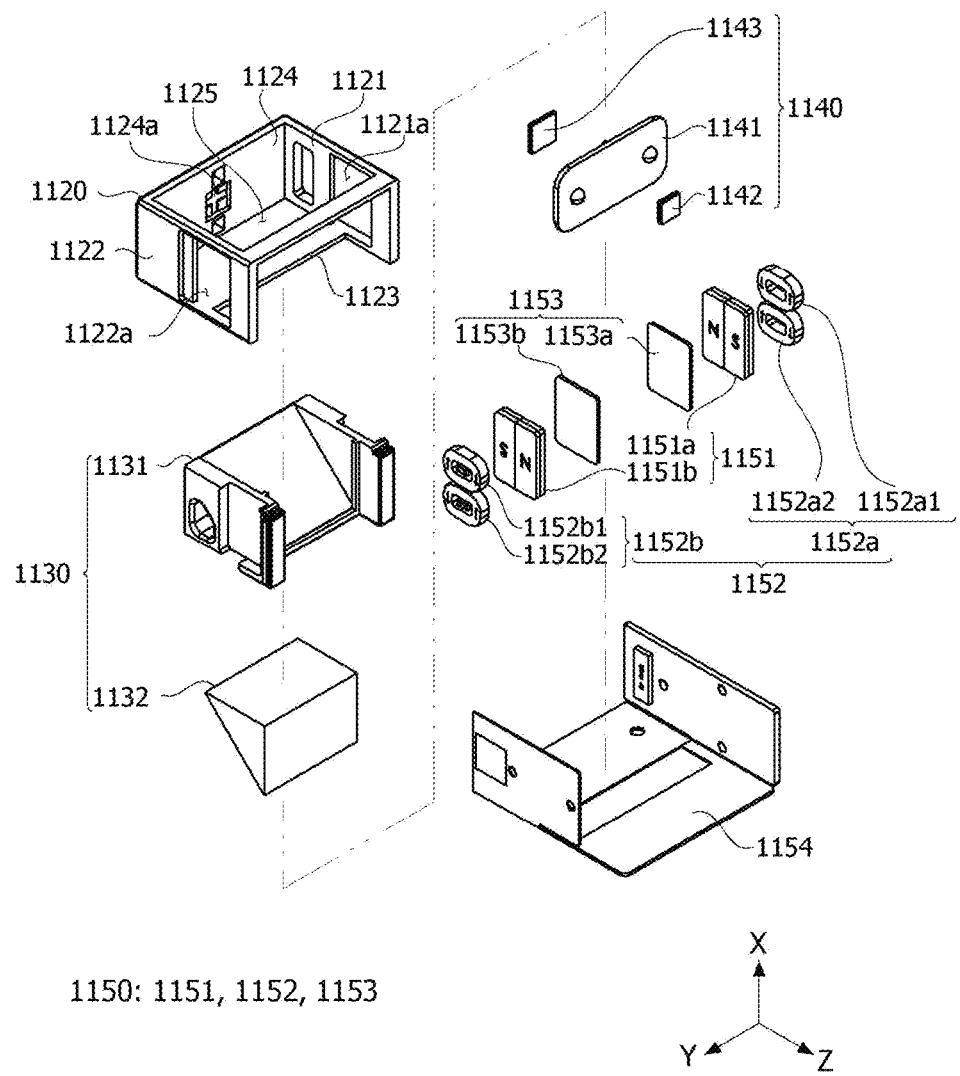
FIG. 14 is an exploded perspective view of a first camera actuator according to another embodiment.

FIG. 14 is a perspective view of a first camera actuator according to an embodiment.

A first camera actuator according to another embodiment includes a shield can (not shown), a first housing 1120, a mover 1130, a rotational part 1140, and a first driving part 1150. The above-described contents except for the following description may be applied in the same manner.

In the first camera actuator according to the embodiment, the coupling and positions of the housing 1120 and the mover 1130 may be different from those of the above-described embodiment. For example, in the first camera actuator according to the above-described embodiment, the mover 1130 may be positioned in the housing 1120 by the repulsive force between the first magnetic substance and the second magnetic substance. In the first camera actuator according to the embodiment, a coupling force between the housing 1120, the tilting guide part 1141, and the mover 1130 may be provided through the attractive force.

More specifically, the rotational part 1140 includes the tilting guide part 1141, the first magnetic substance 1142 having a coupling force with the tilting guide part 1141, and the second magnetic substance 1143 positioned in the tilting guide part 1141 or the housing (particularly, the third housing side portion). However, the first magnetic substance 1142 and the second magnetic substance 1143 may be positioned in the mover 1130, the tilting guide part 1141, and the housing 1120 and may provide the coupling force between the housing 1120, the tilting guide part 1141, and the mover 1130.

The tilting guide part 1141 may be coupled to the mover 1130 and the first housing 1120 described above. The tilting guide part 1141 may be disposed adjacent to the optical axis. Therefore, the actuator according to the embodiment may easily change the optical path according to a first axis tilt and a second axis tilt to be described below.

The tilting guide part 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be given below.

The first magnetic substance 1142 may be positioned in the outer surface of the holder 1131. In an embodiment, the first magnetic substance 1142 may be positioned on the fourth holder outer surface of the holder 1131. In addition, the second magnetic substance 1143 may be positioned in the housing hole 1124a of the fourth housing side portion 1124. Unlike the above-described fourth housing hole, in the embodiment, a groove may be formed.

With this configuration, the tilting guide part 1141 may be pressed by the holder 1131 and the housing 1120 between the holder 1131 and the housing 1120 by the magnetic force (attractive force) between the first magnetic substance 1142 and the second magnetic substance 1143. Therefore, the tilting guide part 1141 and the holder 1131 in the housing 1120 may be spaced apart from a bottom surface of the housing in the accommodating part 1125. In other words, the tilting guide part 1141 and the holder 1131 may be coupled to the housing 1120. However, as described above, the first magnetic substance 1142 and the second magnetic substance 1143 may be magnets having polarities different from or the same as each other, yokes, or the like and may be made of a material having an attractive force or a repulsive force to each other.

Figure 15:
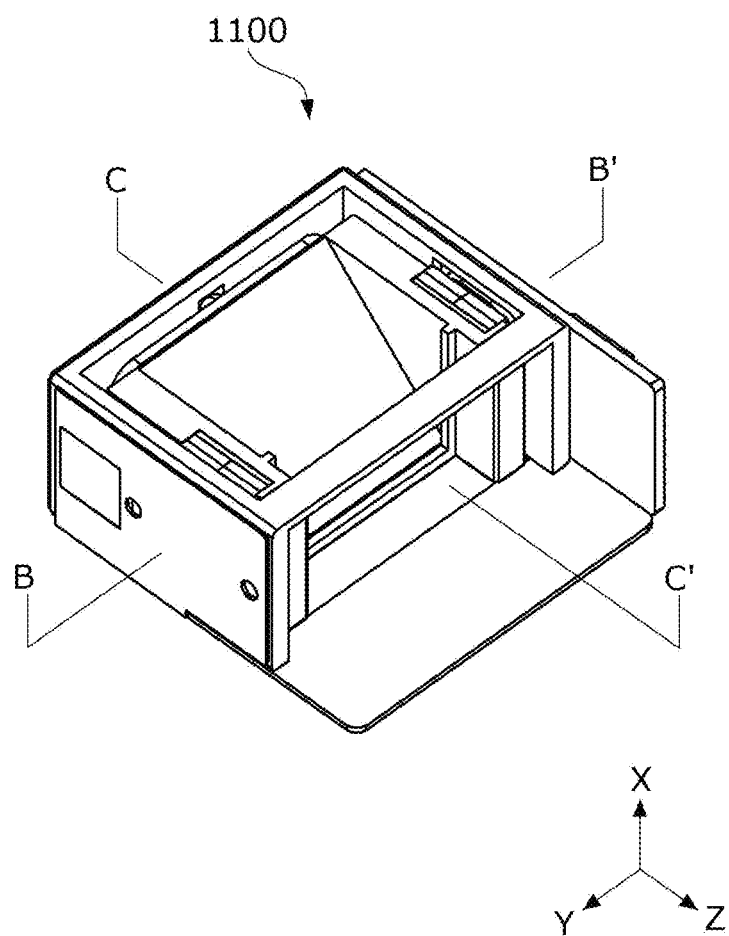
FIG. 15 is a perspective view of the first camera actuator according to another embodiment.
Figure 16:
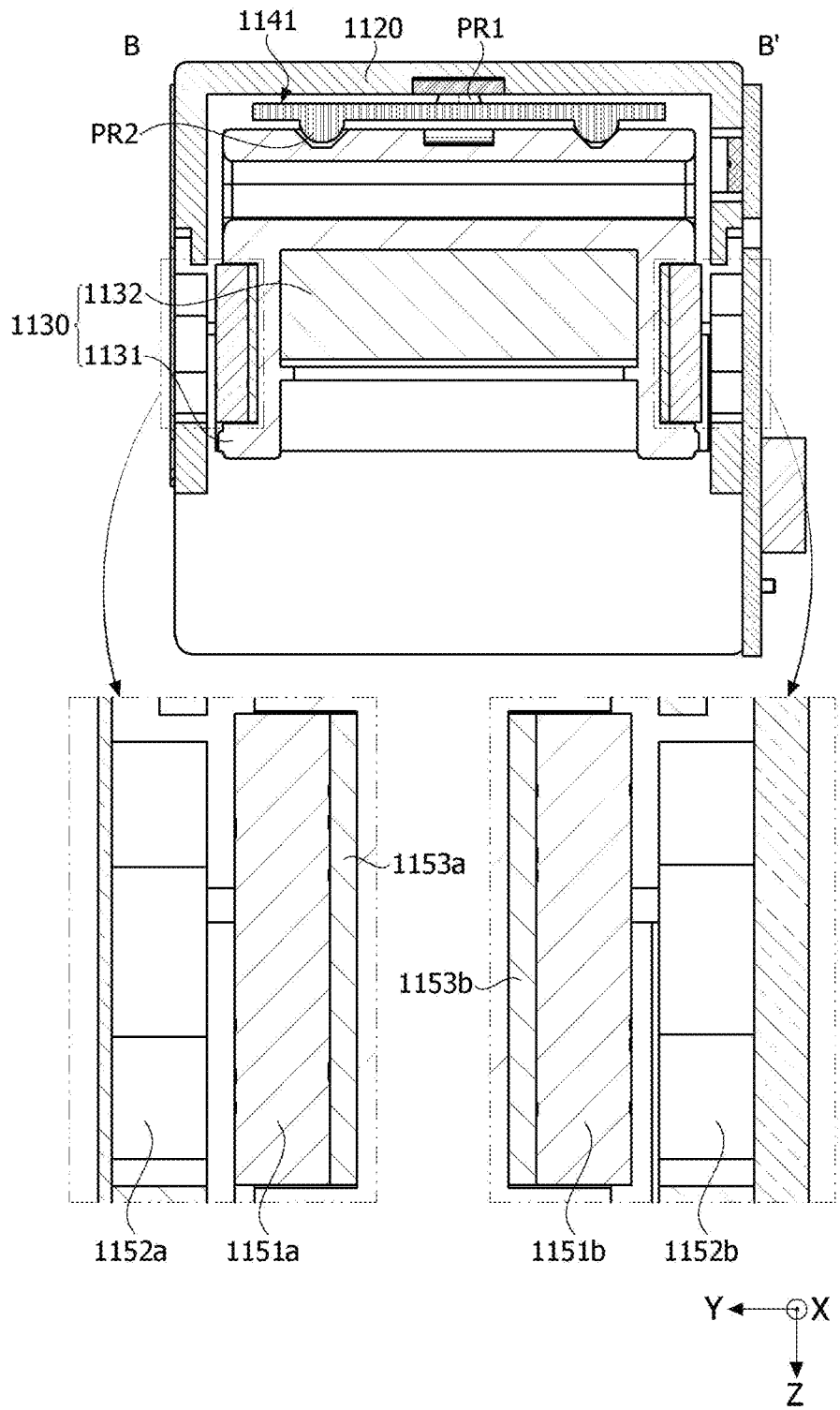
FIG. 16 is a cross-sectional view along line B-B' in FIG. 15.
Figure 17:
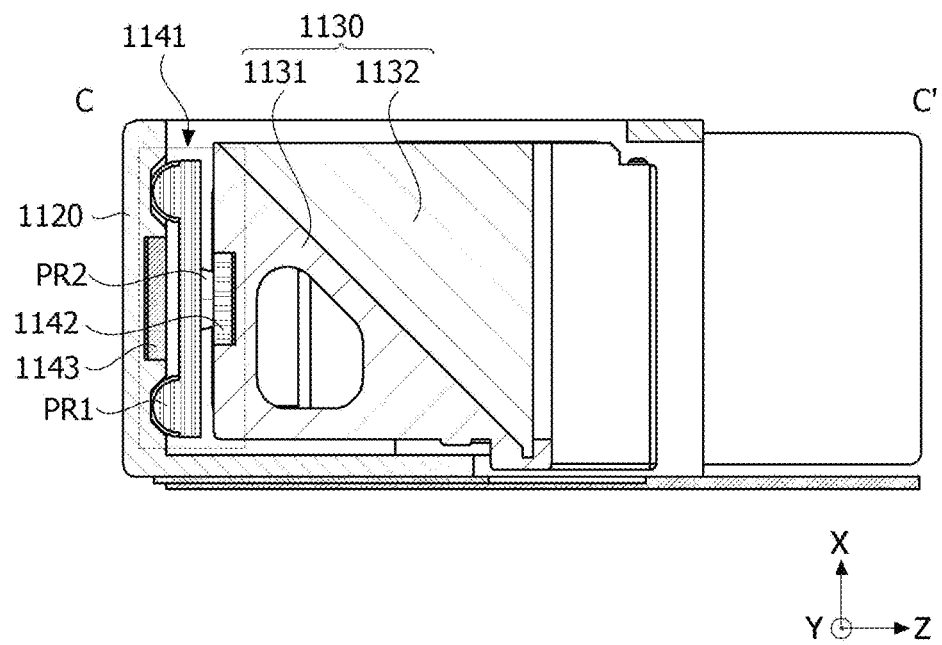
FIG. 17 is a cross-sectional view along line C-C' in FIG. 15.

FIG. 15 is a perspective view of the first camera actuator according to another embodiment, FIG. 16 is a cross-sectional view along line B-B' in FIG. 15, and FIG. 17 is a cross-sectional view along line C-C' in FIG. 15.

Referring to FIGS. 15 to 17, the first coil part 1152a may be positioned on the first housing side portion 1121, and the first magnet 1151a may be positioned on the first holder outer surface 1131S1 of the holder 1131. Therefore, the first coil part 1152a and the first magnet 1151a may be positioned opposite to or to face each other. At least a portion of the first magnet 1151a may overlap the first coil part 1152a in the second direction (Y-axis direction).

In addition, the second coil part 1152b may be positioned on the second housing side portion 1122, and the second magnet 1151b may be positioned on the second holder outer surface 1131S2 of the holder 1131. Therefore, the second coil part 1152b and the second magnet 1151b may be positioned opposite to or to face each other. At least a portion of the second magnet 1151b may overlap the second coil part 1152b in the second direction (Y-axis direction).

In addition, the first coil part 1152a and the second coil part 1152b overlap in the second direction (Y-axis direction), and the first magnet 1151a and the second magnet 1151b overlap in the second direction (Y-axis direction). With this configuration, the electromagnetic force applied to the outer surface of the holder (the first holder outer surface and the second holder outer surface) may be positioned on an axis parallel to the second direction (Y-axis direction) so that the X-axis or Y-axis tilting may be performed accurately and precisely.

In addition, the first protrusion PR1 of the tilting guide part 1141 may be in contact with a first protruding groove of the first housing 1120. In addition, when the X-axis tilting is performed, the first protrusion PR1 may be a reference axis (or a rotation axis) of the tilting. Therefore, the tilting guide part 1141 and the mover 1130 may move in a left-right direction.

In addition, the second protrusion PR2 of the tilting guide part 1141 may be in contact with a second protruding groove of the holder 1131. In addition, when the Y-axis tilting is performed, the second protrusion PR2 may be a reference axis (or a rotation axis) of the tilting. Therefore, the mover 1130 may be tilted with respect to the Y axis, that is, may move up and down.

As described above, the tilting guide part 1141 may be positioned between the fourth holder outer surface 1131S4 of the holder 1131 and the fourth housing side portion of the housing 1120.

Figure 18:
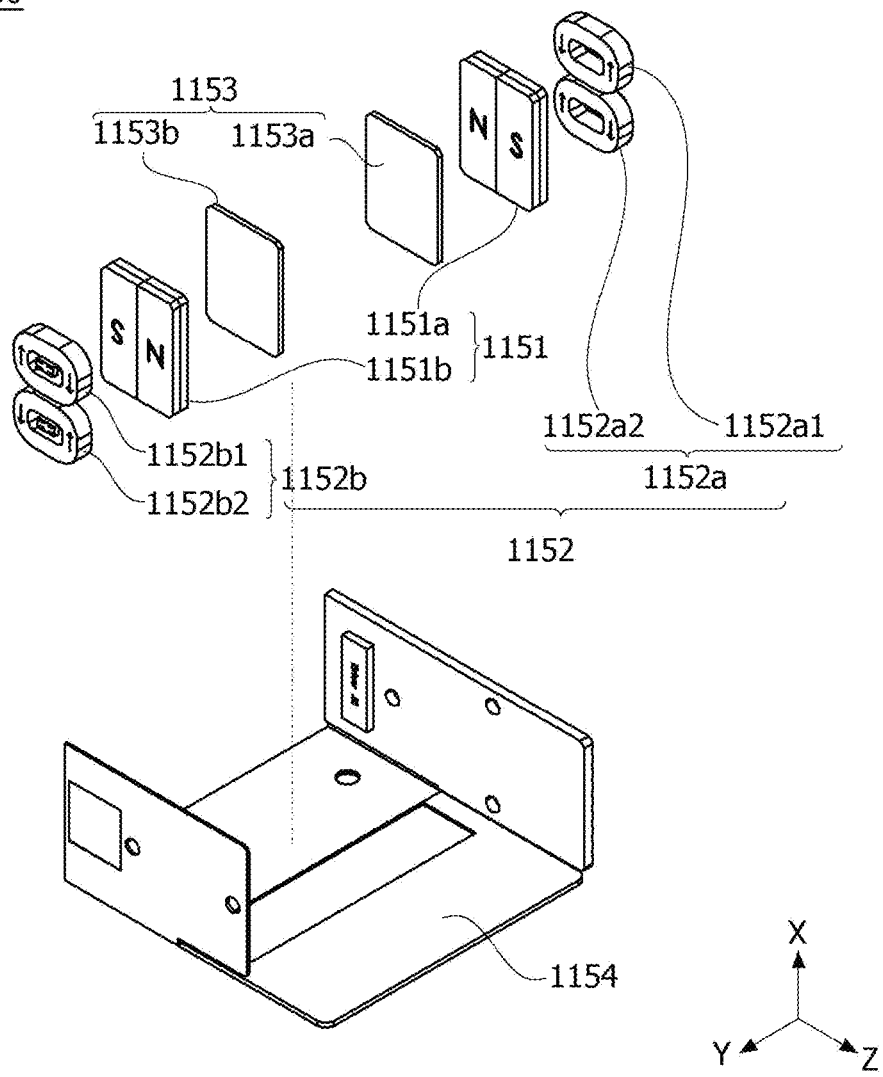
FIG. 18 is a view showing a first driving part of the first camera actuator according to another embodiment.
Figure 19:
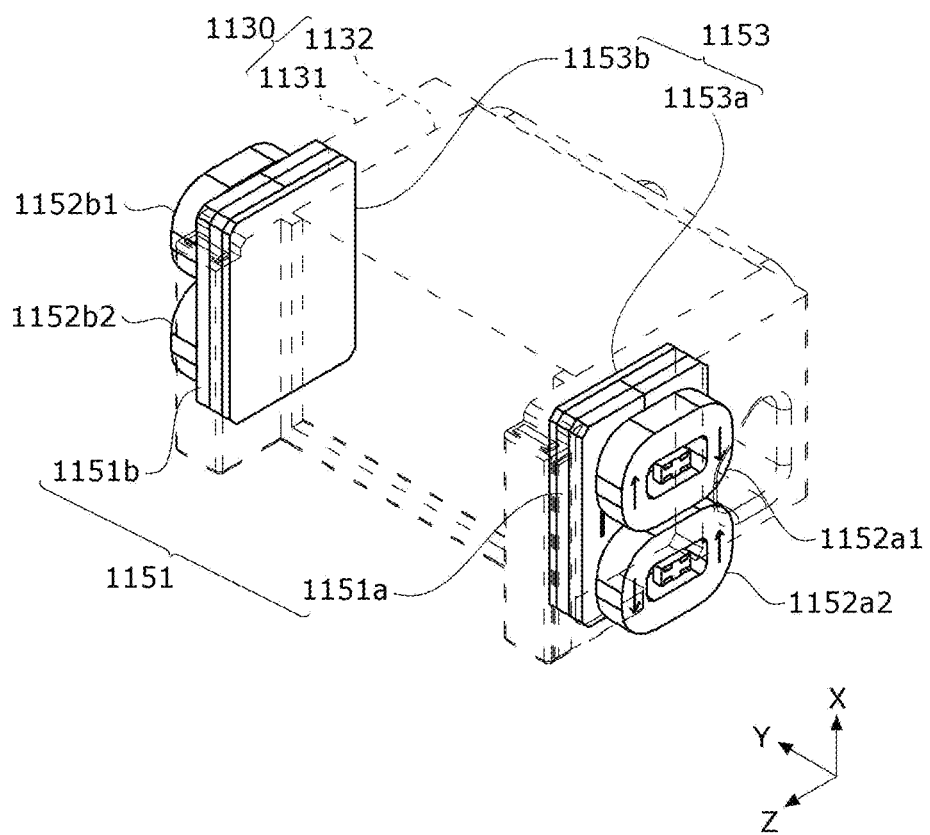
FIG. 19 is a view showing a driving magnet, a driving coil, a yoke part, and a mover in FIG. 18.
Figure 20:
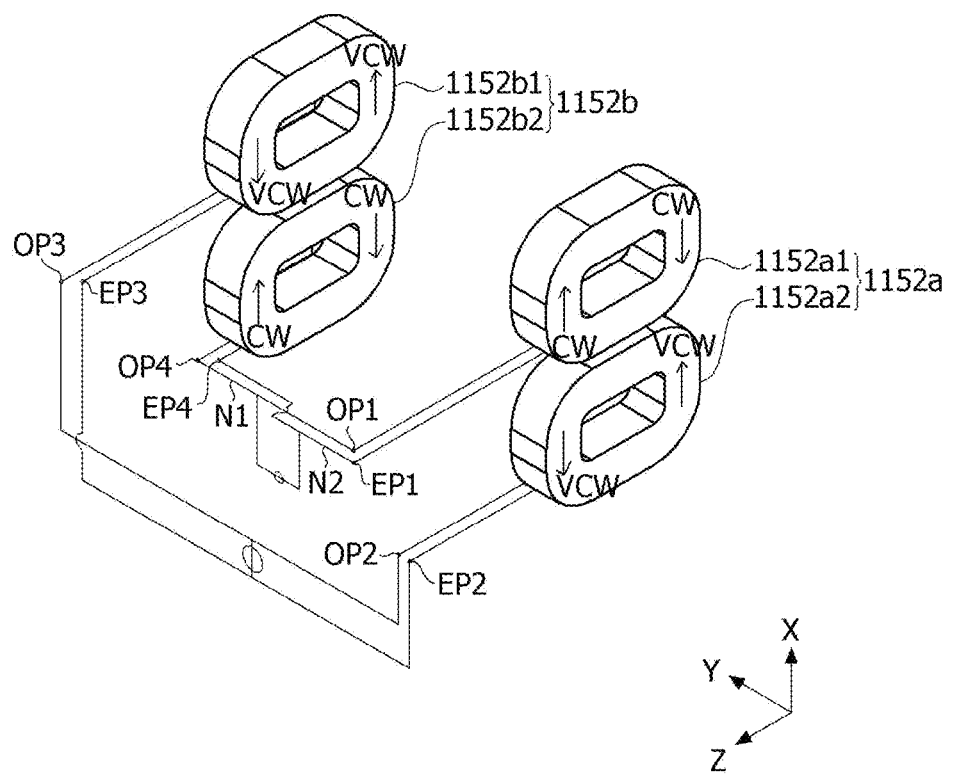
FIG. 20 is a view showing a driving coil according to an embodiment.

FIG. 18 is a view showing a first driving part of the first camera actuator according to another embodiment, FIG. 19 is a view showing a driving magnet, a driving coil, a yoke part, and a mover in FIG. 18, and FIG. 20 is a view showing a driving coil according to an embodiment.

Referring to FIGS. 18 to 20, the first driving part 1150 according to the embodiment includes the driving magnet 1151, the driving coil 1152, the yoke part 1153, the Hall sensor part (not shown), and the first board part 1154. The first driving part 1150 may move, rotate, or tilt the mover 1130.

The driving magnet 1151 may include a plurality of magnets. In an embodiment, the driving magnet 1151 may include the first magnet 1151a and the second magnet 1151b.

Each of the first magnet 1151a and the second magnet 1151b may be positioned on the outer surfaces of the holder 1131. In addition, the first magnet 1151a and the second magnet 1151b may be positioned to face each other. A detailed description thereof will be given below.

The driving coil 1152 may include a plurality of coils. In an embodiment, the driving coil 1152 may include the first coil part 1152a and the second coil part 1152b.

The first coil part 1152a may be positioned to correspond to the first magnet 1151a. In other words, the first coil part 1152a may be disposed to face the first magnet 1151a.

Therefore, as described above, the first coil part 1152*a* may be positioned in the first housing hole 1121*a* of the first housing side portion 1121.

In addition, the second coil part 1152*b* may be positioned to correspond to the second magnet 1151*b*. In other words, the second coil part 1152*b* may be disposed to face the second magnet 1151*b*. Therefore, as described above, the second coil part 1152*b* may be positioned in the second housing hole 1122*a* of the second housing side portion 1122.

In addition, the first coil part 1152*a* may be positioned to face the second coil part 1152*b*. In other words, the first coil part 1152*a* may be positioned symmetrically with the second coil part 1152*b* with respect to the first direction (X-axis direction). This may also be applied to the first magnet 1151*a* and the second magnet 1151*b* in the same manner. In other words, the first magnet 1151*a* and the second magnet 1151*b* may be positioned symmetrically with respect to the first direction (X-axis direction). In addition, the first coil part 1152*a*, the second coil part 1152*b*, the first magnet 1151*a*, and the second magnet 1151*b* may be disposed to at least partially overlap in the second direction (Y-axis direction). With this configuration, the X-axis tilting or the Y-axis tilting may be accurately performed without tilting to one side by the electromagnetic force between the first coil part 1152*a* and the first magnet 1151*a* and the electromagnetic force between the second coil part 1152*b* and the second magnet 1151*b*. Here, the X-axis tilting means tilting with respect to the X-axis, and the Y-axis tilting means tilting with respect to the Y-axis.

The yoke part 1153 may be positioned between the driving magnet 1151 and the holder 1131. The yoke part 1153 is positioned on the first holder outer surface and the second holder outer surface of the holder 1131 so that the driving magnet is easily coupled to the holder 1131. For example, the yoke part 1153 may include the first yoke 1153*a* and the second yoke 1153*b*, and the yokes may be disposed in the seating groove positioned in the outer surface of the holder and may have an attractive force with the driving magnet 1151. In other words, the yoke part 1153 can improve the coupling force between the driving magnet 1151 and the holder 1131.

The Hall sensor part (not shown) may include a plurality of Hall sensors. In an embodiment, the Hall sensor part (not shown) may include a first Hall sensor (not shown) and a second Hall sensor (not shown). The first Hall sensor (not shown) may be positioned inside or outside the first coil part 1152*a* or the second coil part 1152*b*. The first Hall sensor (not shown) may detect a change in magnetic flux inside the first coil part 1152*a* or the second coil part 1152*b*. Therefore, the position sensing between the first and second magnets 1151*a* and 1251*b* and the first Hall sensor (not shown) may be performed. Therefore, the first camera actuator according to the embodiment may control the X-axis or Y-axis tilt. The sensor part may be composed of a plurality of sensors.

The first board part 1154 may be positioned under the first driving part 1150. The first board part 1154 may be electrically connected to the driving coil 1152 and the Hall sensor part (not shown). For example, a current may be applied to the driving coil 1152 through the first board part 1154, and thus the mover 1130 may be tilted to the X axis or the Y axis. For example, the first board part 1154 may be coupled to the driving coil 1152 and the Hall sensor part (not shown) through SMT. However, the present invention is not limited to this method.

The first board part 1154 may be positioned between the shield can (not shown) and the first housing 1120 and coupled to the shield can and the first housing 1120. The coupling method may be variously performed as described above. In addition, the driving coil 1152 and the Hall sensor part (not shown) may be positioned in the outer surface of the first housing 1120 through the coupling.

The first board part 1154 may include the circuit board having wiring patterns that may be electrically connected, such as the rigid PCB, the flexible PCB, or the rigid flexible PCB. However, the present invention is not limited to these types.

More specifically, the driving coil 1152 according to the embodiment may include the first coil part 1152*a* and the second coil part 1152*b*. The first coil part 1152*a* and the second coil part 1152*b* may overlap in the second direction (Y-axis direction). In addition, the first coil part 1152*a* may include a plurality of coils disposed to be spaced apart from each other in the first direction (X-axis direction). The first coil part 1152*a* may include a 1-1 coil 1152*a*1 and a 1-2 coil 1152*a*2. The 1-1 coil 1152*a*1 and the 1-2 coil 1152*a*2 may be disposed side by side in the first direction (X-axis direction).

In addition, the second coil part 1152*b* may include a plurality of coils disposed to be spaced apart from each other in the first direction (X-axis direction). The second coil part 1152*b* may include a 2-1 coil 1152*b*1 and a 2-2 coil 1121*b*2. The 2-1 coil 1152*b*1 and the 2-2 coil 1121*b*2 may be disposed side by side in the first direction (X-axis direction).

The 1-1 coil 1152*a*1 may be disposed to overlap the 2-1 coil 1152*b*1 in the second direction (Y-axis direction). In addition, the 1-2 coil 1152*a*2 may be disposed to overlap the 2-2 coil 1152*b*2 in the second direction (Y-axis direction).

In addition, the 1-1 coil 1152*a*1 and the 2-2 coil 1152*b*2 may be disposed diagonally or to be misaligned from each other with respect to the holder 1131 or the mover 1130. In addition, the 1-2 coil 1152*a*2 and the 2-1 coil 1152*b*1 may be disposed diagonally or to be misaligned from each other with respect to the holder 1131 or the mover 1130.

In an embodiment, the 1-1 coil 1152*a*1 and the 2-2 coil 1152*b*2 may generate electromagnetic forces in different directions. In addition, the 1-2 coil 1152*a*2 and the 2-1 coil 1152*b*1 may generate electromagnetic forces in different directions. Furthermore, the 1-1 coil 1152*a*1 and the 1-2 coil 1152*a*2 may generate electromagnetic forces in the same direction or in different directions. In addition, the 2-1 coil 1152*b*1 and the 2-2 coil 1152*b*2 may generate electromagnetic forces in the same direction or in different directions.

In addition, the 1-1 coil 1152*a*1 may include a 1-1 winding portion turning from one end toward the other end, and the 1-2 coil 1152*a*2 may include a 1-2 winding portion turning from one end toward the other end.

In addition, the 2-1 coil 1152*b*1 may include a 2-1 winding portion turning from one end toward the other end, and the 2-2 coil 1152*b*2 may include a 2-2 winding portion turning from one end toward the other end.

In an embodiment, each of the 1-1 winding portion and the 2-2 winding portion may wind from one end to the other end in any one of clockwise and counterclockwise directions with respect to the second direction. In addition, each of the 1-2 winding portion and the 2-1 winding portion may wind from one end to the other end in the other of the clockwise and counterclockwise directions with respect to the second direction (Y-axis direction).

For example, the 1-1 winding portion and the 2-2 winding portion may wind from one end to the other end clockwise (CW) with respect to the second direction (Y-axis direction). In addition, each of the 1-2 winding portion and the 2-1 winding portion may wind from one end to the other end counterclockwise (VCW) with respect to the second direction (Y-axis direction).

In addition, in an embodiment, the 1-1 coil 1152a1 may include a 1-1 end OP1 and a 1-1 other end EP1. In addition, the 1-2 coil 1152a2 may include a 1-2 end OP2 and a 1-2 other end EP2. In addition, the 2-1 coil 1152b1 may include a 2-1 end OP3 and a 2-1 other end EP3. In addition, the 2-2 coil 1152b2 may include a 2-2 end OP2 and a 2-1 other end EP2.

Therefore, the 1-1 winding portion may be electrically connected to the 1-1 end OP1 and the 1-1 other end EP1 between the 1-1 end OP1 and the 1-1 other end EP1 and may wind from the 1-1 end OP1 to the 1-1 other end EP1 in any one of the clockwise and counterclockwise directions with respect to the second direction (Y-axis direction). In addition, the 1-2 winding portion may be electrically connected to the 1-2 end OP2 and the 1-2 other end EP2 between the 1-2 end OP2 and the 1-2 other end EP2 and may wind from the 1-2 end OP2 to the 1-2 other end EP2 in any one of the clockwise and counterclockwise directions with respect to the second direction (Y-axis direction). In addition, the 2-1 winding portion may be electrically connected to the 2-1 end OP3 and the 2-1 other end EP3 between the 2-1 end OP3 and the 2-1 other end EP3 and may wind from the 2-1 end OP3 to the 2-1 other end EP3 in any one of the clockwise and counterclockwise directions with respect to the second direction (Y-axis direction). In addition, the 2-2 winding portion may be electrically connected to the 2-2 end OP4 and the 2-2 other end EP4 between the 2-2 end OP4 and the 2-2 other end EP4 and may wind from the 2-2 end OP4 to the 2-2 other end EP4 in any one of the clockwise and counterclockwise directions with respect to the second direction (Y-axis direction).

The following description will be given on the basis of the fact that the 1-1 winding portion and the 2-2 winding portion wind clockwise (CW), and the 2-1 winding portion and the 1-2 winding portion wind counterclockwise (VCW).

In addition, a direction of a current flowing in the 1-1 winding portion according to the embodiment may be the same as a direction of a current flowing in the 2-2 winding portion with respect to the second direction. In addition, directions of magnetic forces generated by the first magnet and the second magnet may be opposite to each other. Therefore, an electromagnetic force generated from the 1-1 winding portion and an electromagnetic force generated from the 2-2 winding portion may be in opposite directions.

In addition, a direction of a current flowing in the 1-2 winding portion according to the embodiment may be the same as a direction of a current flowing in the 2-1 winding portion with respect to the second direction. In addition, directions of magnetic forces generated by the first magnet and the second magnet may be opposite to each other. Therefore, an electromagnetic force generated from the 1-2 winding portion and an electromagnetic force generated from the 2-1 winding portion may be in opposite directions.

In addition, the 1-1 end OP1 and the 2-2 end OP4 may be electrically connected to each other to form a first node N1. In addition, the 1-1 other end EP1 and the 2-2 other end EP4 may be electrically connected to each other to form a second node N2. Two closed loop circuits may be configured with respect to the first node N1 and the second node N2. In other words, the closed circuit may have a structure in which a current or the like may be applied to the first node N1 and the applied current may be output through the second node N2.

In addition, the 1-2 end OP2 and the 2-1 end OP3 may be electrically connected to each other to form a third node N3. In addition, the 1-2 other end EP2 and the 2-1 other end EP3 may be electrically connected to each other to form a fourth node N4. Two closed loop circuits may be configured with respect to the third node N3 and the fourth node N4. In other words, the closed circuit may have a structure in which a current or the like may be applied to the third node N3 and the applied current may be output through the fourth node N4.

Furthermore, in an embodiment, the current applied to the first node N1 and the current applied to the third node may be applied in the same direction. In other words, when a current applied to the first node N1 is positive (+), a current applied to the third node is also positive (+), and when a current applied to the first node N1 is negative (−), a current applied to the third node is also negative (−). Therefore, directions of an electromagnetic force generated from the 1-1 coil 1152a1 and an electromagnetic force generated from the 2-2 coil 1152b2 may be opposite to each other. In addition, directions of an electromagnetic force generated from the 1-2 coil 1152a2 and an electromagnetic force generated from the 2-1 coil 1152b1 may be opposite to each other.

As described above, the 1-1 coil 1152a1 and the 2-2 coil 1152b2 are formed as one channel and may receive the same current to move the mover. In other words, it is possible to facilitate control for driving the tilting of the mover. Likewise, the 1-2 coil 1152a2 and the 2-1 coil 1152b1 are also formed as one channel and may receive the same current to move the mover. In other words, it is possible to facilitate control for driving the tilting of the mover.

Furthermore, in the first camera actuator according to the embodiment, a plurality of coils of the driving coil are disposed in a mode symmetry, particularly, symmetrically in the first direction (X-axis direction), thereby minimizing the influence due to the posture difference. Furthermore, in the case of asymmetric coils, since a deviation of a change in current compared to a degree of tilting increases, when compared to a plurality of asymmetrically disposed coils, current control for driving may be linearly performed. In other words, the control can be facilitated.

Figure 21:
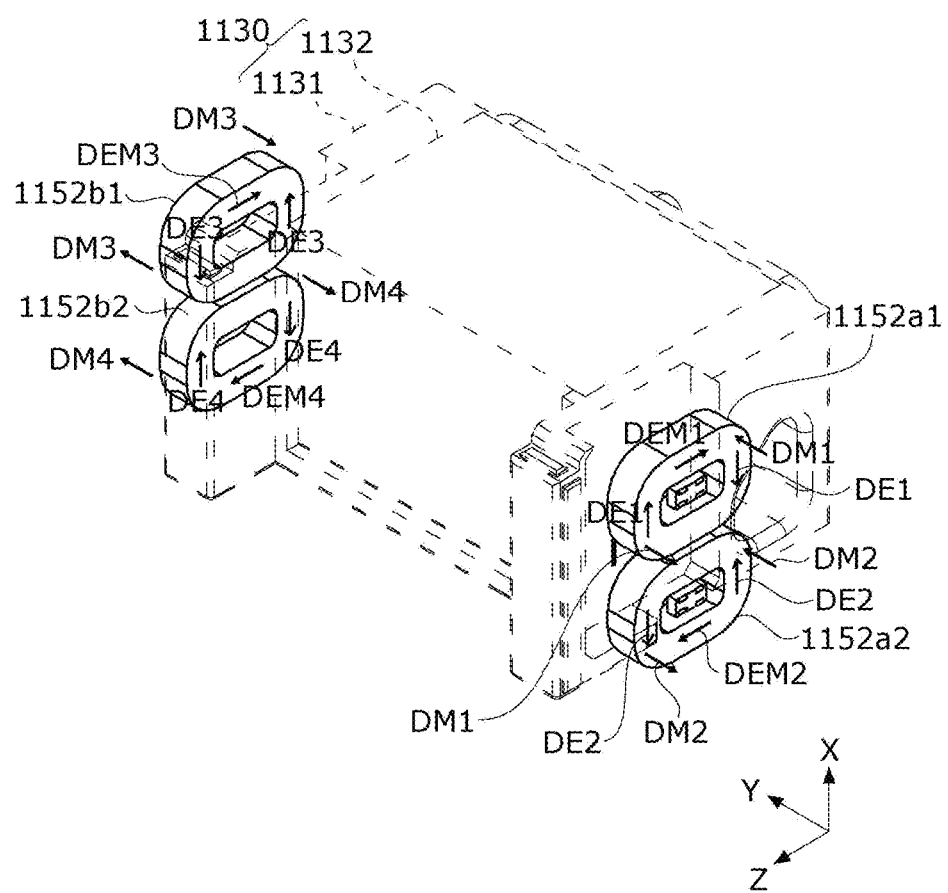
FIG. 21 is a view showing first driving of the driving coil according to the embodiment.
Figure 22:
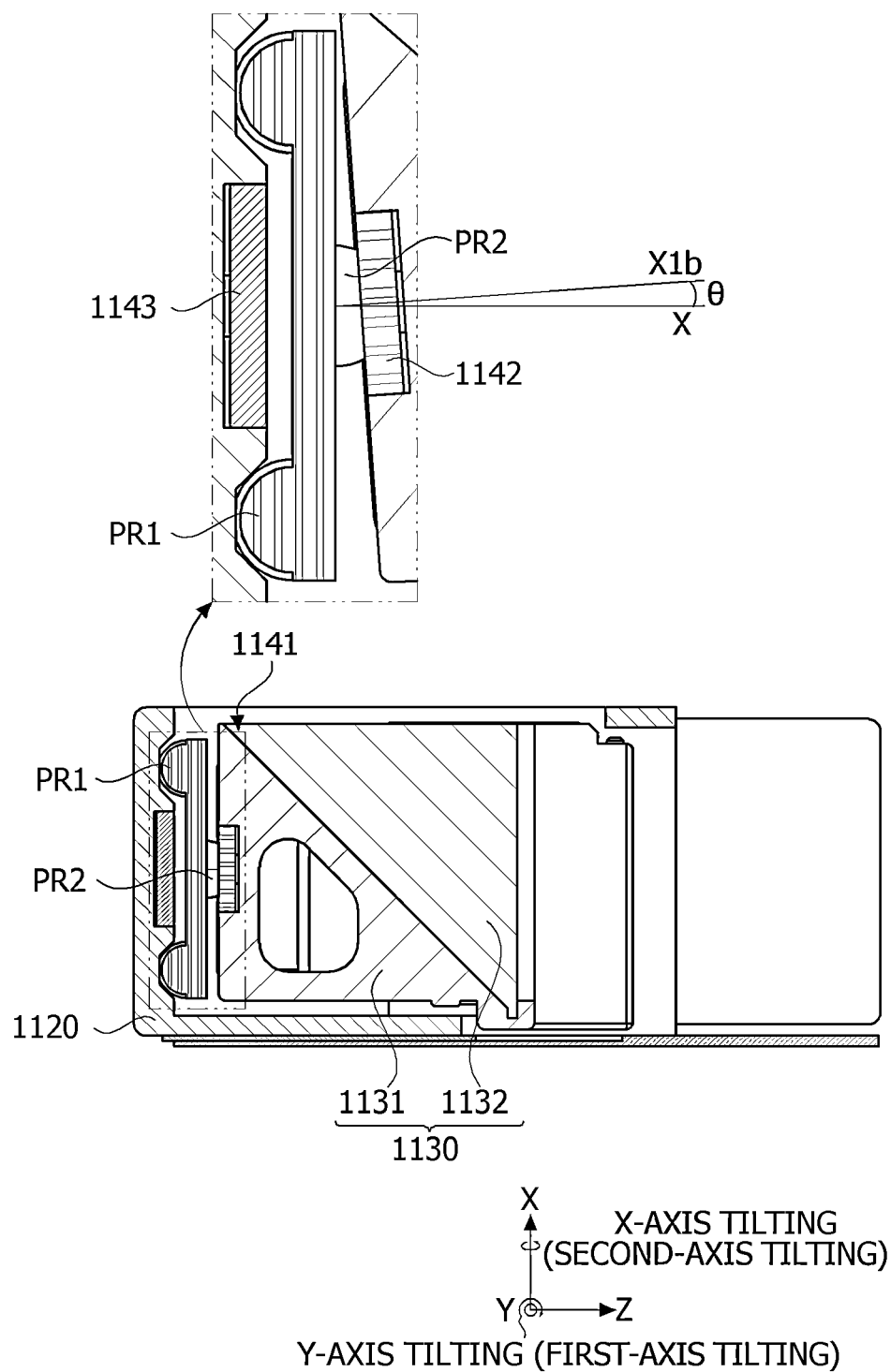
FIG. 22 is a view showing the movement of the mover by the first driving.

FIG. 21 is a view showing first driving of the driving coil according to the embodiment, and FIG. 22 is a view showing the movement of the mover by the first driving.

Referring to FIGS. 21 and 22, in the camera module according to the embodiment, the first magnet and the second magnet of the first camera actuator may be positioned on the outer surface of the holder, for example, by a vertical magnetization method. For example, in an embodiment, both of an N pole and an S pole of each of the first magnet and the second magnet may be positioned to face the first coil part and the second coil part. For example, the N pole may be positioned in the third direction compared to the S pole. For example, each of the N pole and the S pole of the first magnet 1151a may be disposed to correspond to regions in which a current flows in the X-axis direction or the opposite direction in the first coil part.

In an embodiment, magnetic forces DM1 and DM2 may be applied from the N pole of the first magnet in the direction opposite to the second direction (Y-axis direction), and when a current DE1 flows from the 1-1 coil 1152a1 corresponding to the N pole in the first direction (X-axis direction), an electromagnetic force DEM1 may act in a direction opposite to the third direction (Z-axis direction) according to the interaction of the electromagnetic force (e.g., Fleming's left-hand rule). Therefore, since the 1-1 coil 1152a1 is coupled to the housing and the position thereof is fixed, an upper portion of the holder may move in the third direction (Z-axis direction) by the electromagnetic force DEM1. A description of the electromagnetic force and the like will be given below on the basis of the N pole of each magnet.

In addition, in an embodiment, when a magnetic force may be applied from the N pole of the first magnet in the direction opposite to the second direction (Y-axis direction) and a current DE2 flows from the 1-2 coil 1152a2 corresponding the N pole in the direction opposite to the first direction (X-axis direction), an electromagnetic force DEM2 may act in the Z-axis direction according to the interaction of the electromagnetic force. At this time, since the 1-2 coil 1152a2 is in a state of being fixed to the side portion of the housing, a lower portion of the holder may move in the direction opposite to the Z-axis direction by the electromagnetic force DEM2.

In addition, in an embodiment, when magnetic forces DM3 and DM4 may be applied from the N pole of the second magnet in the second direction (Y-axis direction) and a current DE3 flows from the 2-1 coil 1152b1 corresponding to the N pole in the direction opposite to the first direction (X-axis direction), an electromagnetic force DEM3 may act in the direction opposite to the third direction (Z-axis direction) according to the interaction of the electromagnetic force (e.g., Fleming's left-hand rule). Therefore, since the 2-1 coil 1152b1 is coupled to the housing and the position thereof is fixed, the upper portion of the holder may move in the third direction (Z-axis direction) by the electromagnetic force DEM3.

In addition, in an embodiment, when the magnetic forces DM3 and DM4 may be applied from the N pole of the second magnet in the second direction (Y axis direction) and a current DE4 flows from the 2-2 coil 1152b2 corresponding to the N pole in the first direction (X-axis direction), an electromagnetic force DEM4 may act in the Z-axis direction according to the interaction of the electromagnetic force. At this time, since the 2-2 coil 1152b2 is in a state of being fixed to the side portion of the housing, the lower portion of the holder may move in the direction opposite to the Z-axis direction by the electromagnetic force DEM4.

Therefore, the Y-axis tilting may be performed by the electromagnetic forces DEM1 to DEM4. In other words, an OIS can be implemented by the rotation in the first direction (X-axis direction).

In an embodiment, the third magnet 1151c disposed under the holder 1131, along with the third coil 1152c, forms an electromagnetic force to tilt or rotate the mover 1130 in the first direction (X-axis direction).

Specifically, the tilting guide part 1141 may be coupled to the first housing 1120 and the mover 1130 by the first magnetic substance 1142 in the first housing 1120 and the second magnetic substance 1143 in the mover 1130. In addition, the first protrusions PR1 may be spaced apart from each other in the first direction (X-axis direction) and supported by the first housing 1120.

In addition, the tilting guide part 1141 may rotate or tilt about the second protrusion PR2 protruding toward the mover 1130, which is the reference axis (or the rotation axis). In other words, the tilting guide part 1141 may perform the Y-axis tilting about the second protrusion PR2, which is the reference axis.

For example, the mover 1130 may be tilted upward about the second protrusion PR2, which is the reference axis. In other words, an OIS can be implemented by rotating (X1→X1b (or X1a)) the mover 1130 at a first angle θ in the X-axis direction by the electromagnetic forces DEM1 to DEM4. The first angle θ may be in a range of ±1° to ±3°. However, the present invention is not limited thereto.

As described above, the optical member may move in a direction that is different from or the same as the direction in which the electromagnetic force is generated.

Figure 23:
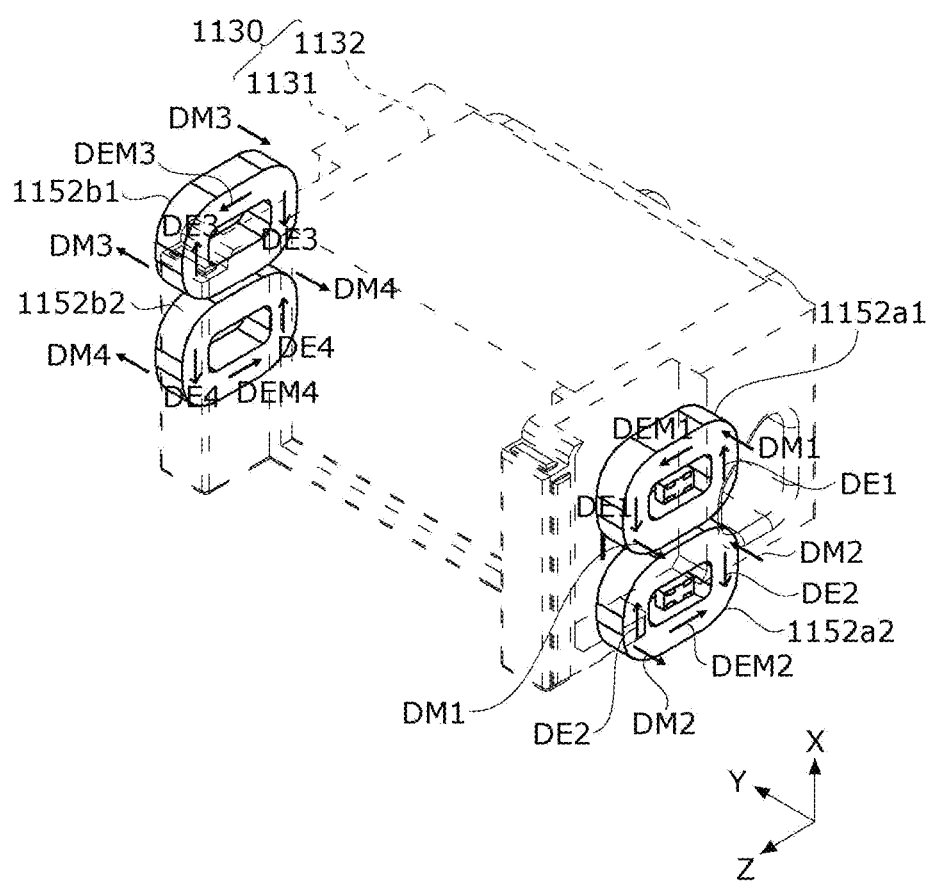
FIG. 23 is a view showing second driving of the driving coil according to the embodiment.
Figure 24:
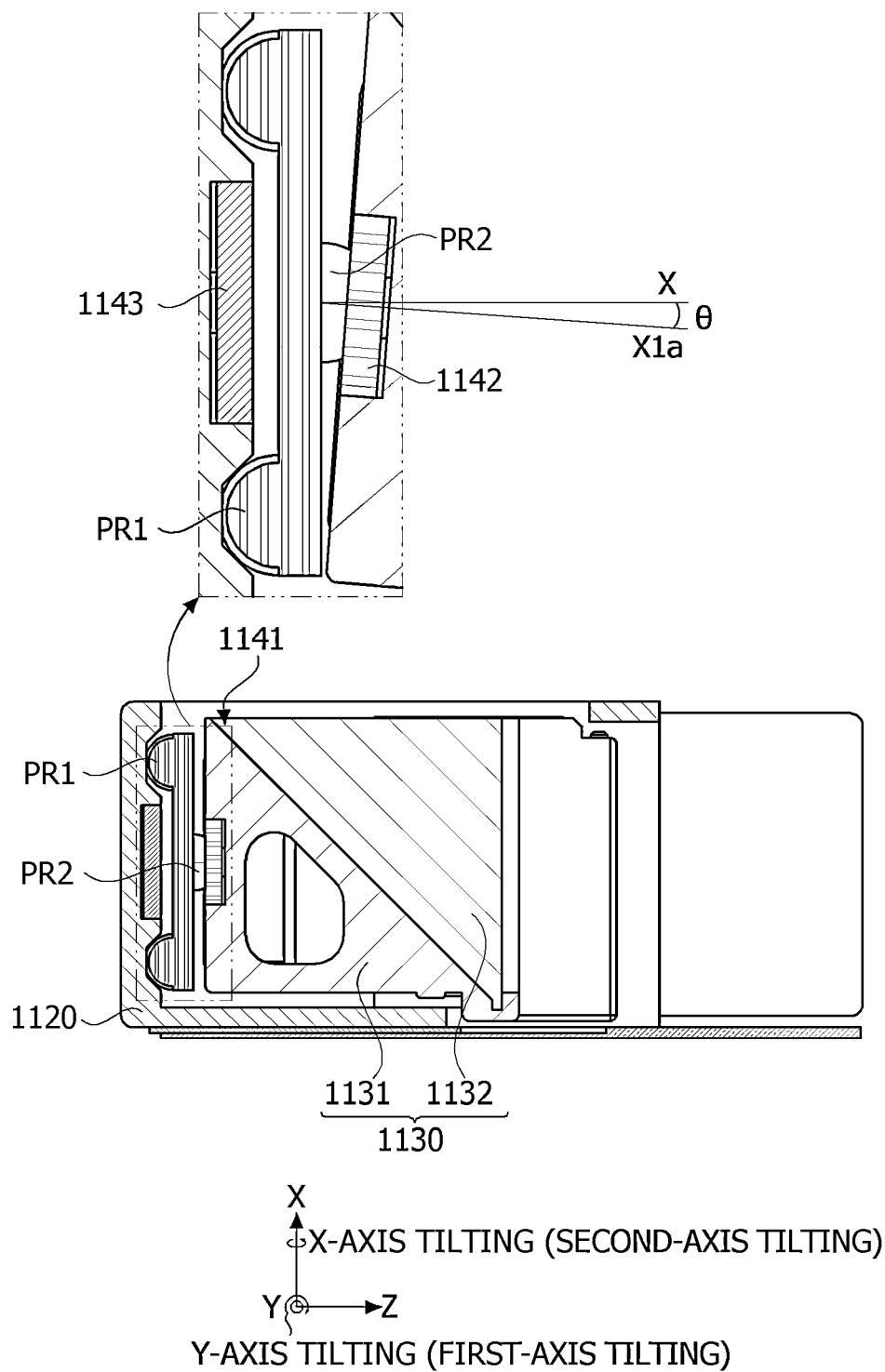
FIG. 24 is a view showing the movement of the mover by the second driving.

FIG. 23 is a view showing second driving of the driving coil according to the embodiment, and FIG. 24 is a view showing the movement of the mover by the second driving.

Referring to FIGS. 23 and 24, the contents described above in the first operation except for the following description may be applied in the same manner.

In an embodiment, when the magnetic forces DM1 and DM2 may be applied from the N pole of the first magnet in the direction opposite to the second direction (Y axis direction) and the current DE1 flows from the 1-1 coil 1152a1 corresponding to the N pole in the direction opposite to the first direction (X-axis direction), the electromagnetic force DEM1 may act in the third direction (Z-axis direction) according to the interaction of the electromagnetic force (e.g., Fleming's left-hand rule). Therefore, since the 1-1 coil 1152a1 is coupled to the housing and the position thereof is fixed, the upper portion of the holder may move in the direction opposite to the third direction (Z-axis direction) by the electromagnetic force DEM1.

In addition, in an embodiment, when the magnetic forces DM1 and DM2 may be applied from the N pole of the first magnet in the direction opposite to the second direction (Y-axis direction) and the current DE2 flows from the 1-2 coil 1152a2 corresponding to the N pole in the first direction (X-axis direction), the electromagnetic force DEM2 may act in the direction opposite to the Z-axis direction according to the interaction of the electromagnetic force. At this time, since the 1-2 coil 1152a2 is in a state of being fixed to the side portion of the housing, the lower portion of the holder may move in the Z-axis direction by the electromagnetic force DEM2.

In addition, in an embodiment, when the magnetic forces DM3 and DM4 may be applied from the N pole of the second magnet in the second direction (Y-axis direction) and the current DE3 flows from the 2-1 coil 1152b1 corresponding to the N pole in the first direction (X-axis direction), the electromagnetic force DEM3 may act in the third direction (Z-axis direction) according to the interaction of the electromagnetic force (e.g., Fleming's left-hand rule). Therefore, since the 2-1 coil 1152b1 is coupled to the housing and the position thereof is fixed, the upper portion of the holder may move in the direction opposite to the third direction (Z-axis direction) by the electromagnetic force DEM3.

In addition, in an embodiment, when the magnetic forces DM3 and DM4 may be applied from the N pole of the second magnet in the second direction (Y axis direction) and the current DE4 flows from the 2-2 coil 1152b2 corresponding to the N pole in the direction opposite to the first direction (X-axis direction), the electromagnetic force DEM4 may act in the Z-axis direction according to the interaction of the electromagnetic force. At this time, since the 2-2 coil 1152b2 is in a state of being fixed to the side portion of the housing, the lower portion of the holder may move in the Z-axis direction by the electromagnetic force DEM4.

Therefore, the Y-axis tilting may be performed by the electromagnetic forces DEM1 to DEM4. In other words, an OIS can be implemented by the rotation in the first direction (X-axis direction).

In an embodiment, the third magnet 1151c disposed under the holder 1131, along with the third coil 1152c, forms an electromagnetic force to tilt or rotate the mover 1130 in the first direction (X-axis direction).

The tilting guide part 1141 may be coupled to the first housing 1120 and the mover 1130 by the first magnetic substance 1142 in the first housing 1120 and the second magnetic substance 1143 in the mover 1130. In addition, the first protrusions PR1 may be spaced apart from each other in the first direction (X-axis direction) and supported by the first housing 1120.

In addition, the tilting guide part 1141 may rotate or tilt about the second protrusion PR2 protruding toward the mover 1130, which is the reference axis (or the rotation axis). In other words, the tilting guide part 1141 may perform the Y-axis tilting about the second protrusion PR2, which is the reference axis.

For example, the mover 1130 may be tilted downward about the second protrusion PR2, which is the reference axis. In other words, an OIS can be implemented by rotating (X1→X1$a$ (or X1$b$)) the mover 1130 at a first angle θ in the X-axis direction by the electromagnetic forces DEM1 to DEM4. The first angle θ may be in a range of ±1° to ±3°. However, the present invention is not limited thereto. Therefore, the mover may be vertically tilted by the first operation and the second operation.

Figure 25:
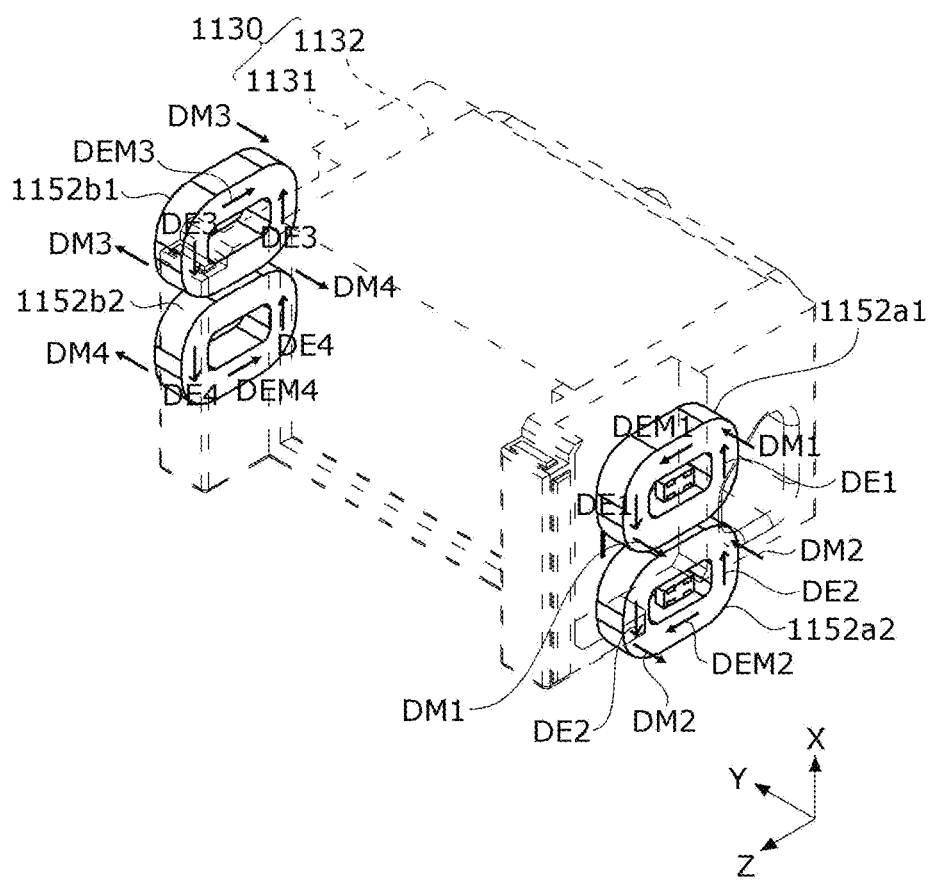
FIG. 25 is a view showing third driving of the driving coil according to the embodiment.
Figure 26:
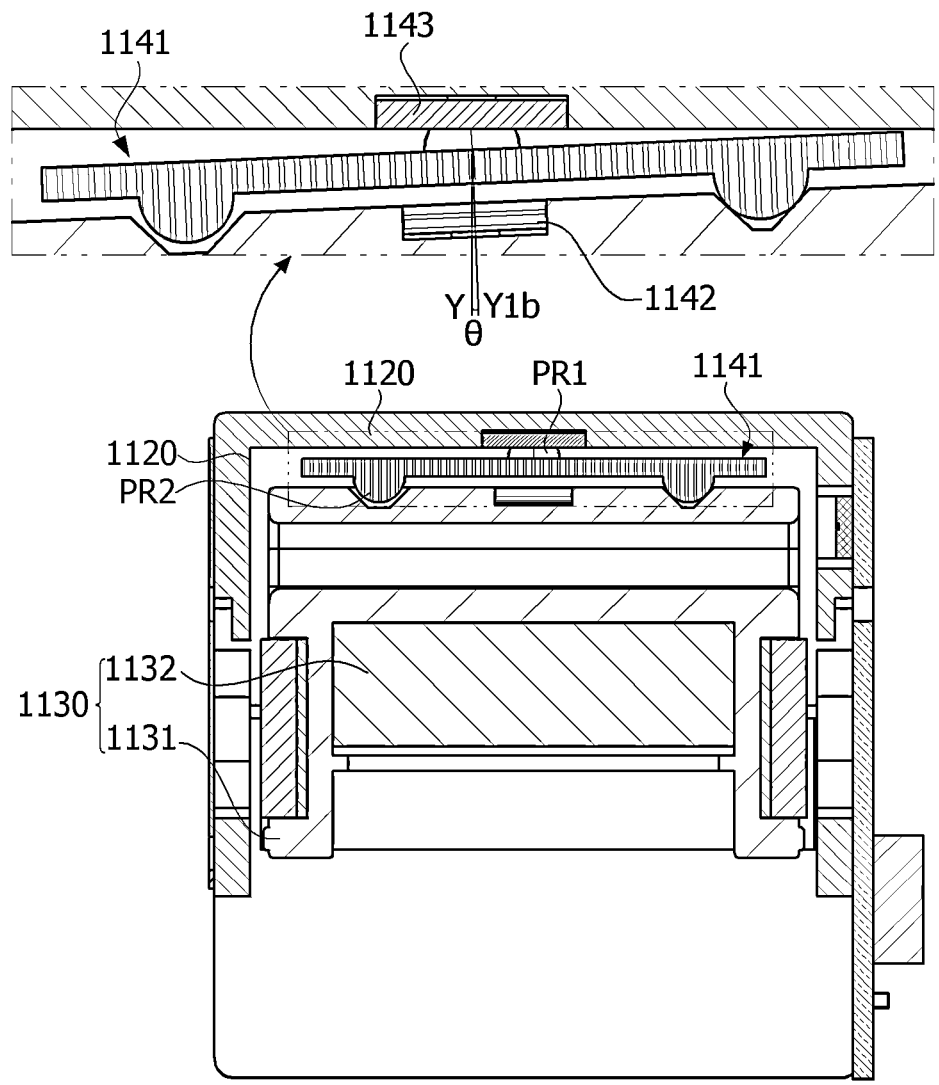
FIG. 26 is a view showing the movement of the mover by the third driving.

FIG. 25 is a view showing third driving of the driving coil according to the embodiment, and FIG. 26 is a view showing the movement of the mover by the third driving.

Referring to FIGS. 25 and 26, the contents described above in the first operation except for the following description may be applied in the same manner.

In an embodiment, when the magnetic forces DM1 and DM2 may be applied from the N pole of the first magnet in the direction opposite to the second direction (Y-axis direction) and the current DE1 flows from the 1-1 coil 1152$a$1 corresponding to the N pole in the direction opposite to the first direction (X-axis direction), the electromagnetic force DEM1 may act in the third direction (Z-axis direction) according to the interaction of the electromagnetic force (e.g., Fleming's left-hand rule). Therefore, since the 1-1 coil 1152$a$1 is coupled to the housing and the position thereof is fixed, the upper portion of the holder may move in the direction opposite to the third direction (Z-axis direction) by the electromagnetic force DEM1.

In addition, in an embodiment, when the magnetic forces DM1 and DM2 may be applied from the N pole of the first magnet in the direction opposite to the second direction (Y-axis direction) and the current DE2 flows from the 1-2 coil 1152$a$2 corresponding to the N pole in the direction opposite to the first direction (X-axis direction), the electromagnetic force DEM2 may act in the Z-axis direction according to the interaction of the electromagnetic force. At this time, since the 1-2 coil 1152$a$2 is in a state of being fixed to the side portion of the housing, the lower portion of the holder may move in the direction opposite to the Z-axis direction by the electromagnetic force DEM2.

In addition, in an embodiment, when magnetic forces DM3 and DM4 may be applied from the N pole of the second magnet in the second direction (Y-axis direction) and a current DE3 flows from the 2-1 coil 1152$b$1 corresponding to the N pole in the direction opposite to the first direction (X-axis direction), an electromagnetic force DEM3 may act in the direction opposite to the third direction (Z-axis direction) according to the interaction of the electromagnetic force (e.g., Fleming's left-hand rule). Therefore, the 2-1 coil 1152$b$1 is coupled to the housing and the position thereof is fixed, the upper portion of the holder may move in the third direction (Z-axis direction) by the electromagnetic force DEM3.

In addition, in an embodiment, when the magnetic forces DM3 and DM4 may be applied from the N pole of the second magnet in the second direction (Y-axis direction) and the current DE4 flows from the 2-2 coil 1152$b$2 corresponding to the N pole in the direction opposite to the first direction (X-axis direction), the electromagnetic force DEM4 may act in the Z-axis direction according to the interaction of the electromagnetic force. At this time, since the 2-2 coil 1152$b$2 is in a state of being fixed to the side portion of the housing, the lower portion of the holder may move in the Z-axis direction by the electromagnetic force DEM4.

Therefore, the X-axis tilting may be performed by the electromagnetic forces DEM1 to DEM4. In other words, an OIS can be implemented by the rotation in the second direction (Y-axis direction).

An OIS can be implemented by tilting or rotating (or the X-axis tilting) the mover 1130 in the Y-axis direction.

In an embodiment, the first magnet and the second magnet disposed in the holder 1131, along with the first coil part 1152$a$ and the second coil part 1152$b$, respectively, may form the electromagnetic force to tilt or move the tilting guide part and the mover 1130 in the second direction (Y-axis direction).

The tilting guide part 1141 may rotate or tilt (X-axis tilting) in the second direction about the first protrusion PR1, which is the reference axis (or the rotation axis).

For example, the mover 1130 may move (move in the left-right direction) toward the side portion of the housing (particularly, move toward the first housing side portion). In addition, OIS can be implemented by rotating (Y1→Y1$b$ (Y1)) the mover 1130 at a second angle θ in the Y-axis direction by the third operation. The second angle θ may be in a range of ±1° to ±3°. However, the present invention is not limited thereto.

Figure 27:
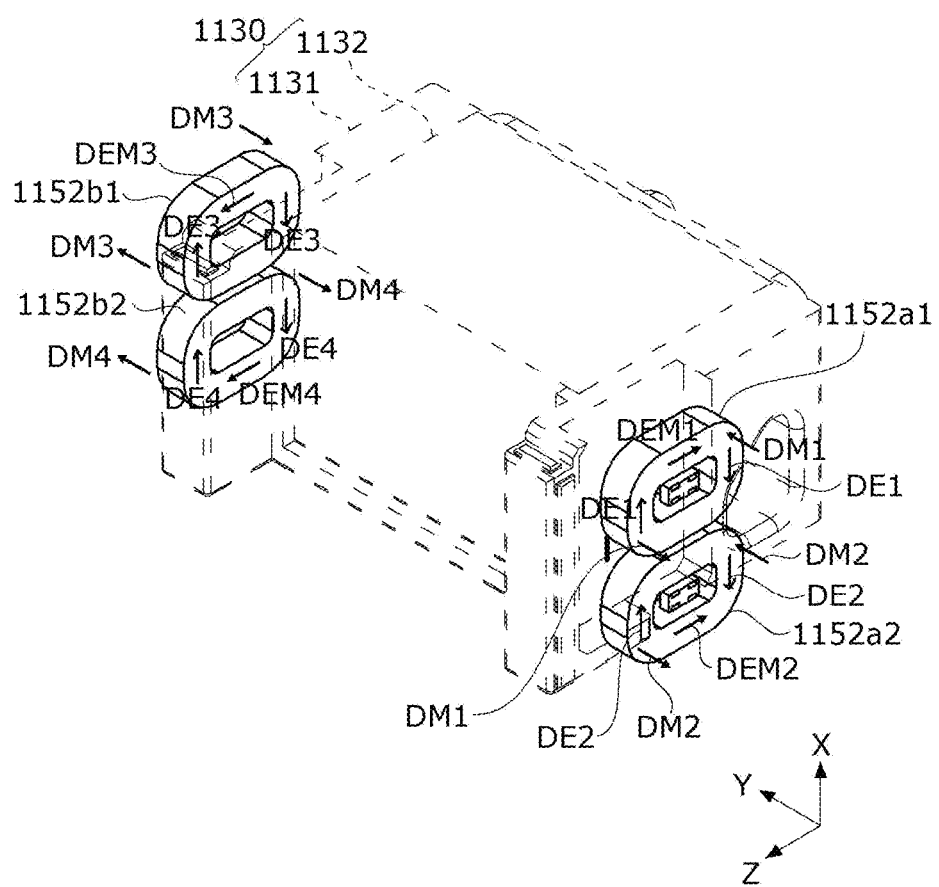
FIG. 27 is a view showing fourth driving of the driving coil according to the embodiment.
Figure 28:
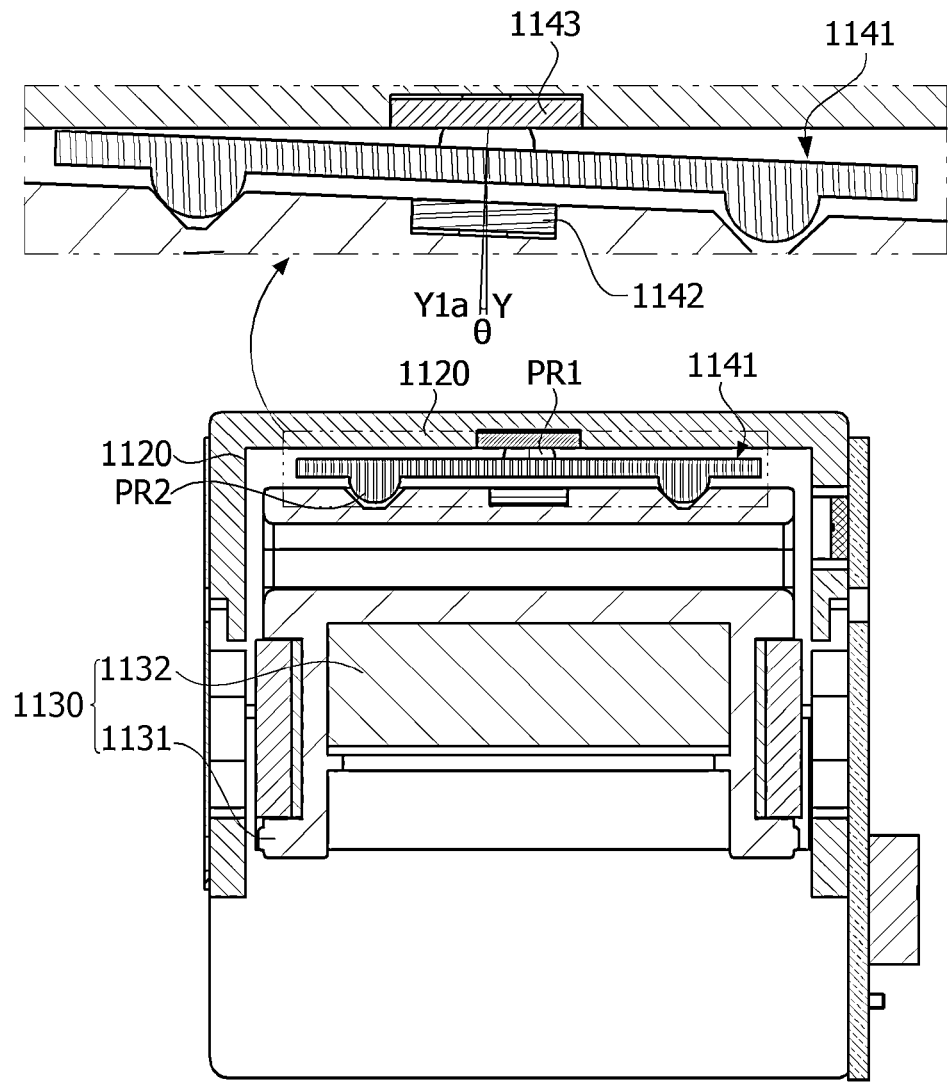
FIG. 28 is a view showing the movement of the mover by the fourth driving.

FIG. 27 is a view showing fourth driving of the driving coil according to the embodiment, and FIG. 28 is a view showing the movement of the mover by the fourth driving.

Referring to FIGS. 27 and 28, the contents described above in the first operation except for the following description may be applied in the same manner.

In an embodiment, when magnetic forces DM1 and DM2 may be applied from the N pole of the first magnet in the direction opposite to the second direction (Y-axis direction) and a current DE1 flows from the 1-1 coil 1152$a$1 corresponding to the N pole in the first direction (X-axis direction), an electromagnetic force DEM1 may act in a direction opposite to the third direction (Z-axis direction) according to the interaction of the electromagnetic force (e.g., Fleming's left-hand rule). Therefore, since the 1-1 coil 1152$a$1 is coupled to the housing and the position thereof is fixed, the upper portion of the holder may move in the third direction (Z-axis direction) by the electromagnetic force DEM1.

In addition, in an embodiment, when the magnetic forces DM1 and DM2 may be applied from the N pole of the first magnet in the direction opposite to the second direction (Y-axis direction) and the current DE2 flows from the 1-2 coil 1152$a$2 corresponding to the N pole in the first direction (X-axis direction), the electromagnetic force DEM2 may act in the direction opposite to the Z-axis direction according to the interaction of the electromagnetic force. At this time, since the 1-2 coil 1152$a$2 is in a state of being fixed to the side portion of the housing, the lower portion of the holder may move in the third direction (Z-axis direction) by the electromagnetic force DEM2.

In addition, in an embodiment, when the magnetic forces DM3 and DM4 may be applied from the N pole of the second magnet in the second direction (Y-axis direction) and the current DE3 flows from the 2-1 coil 1152$b$1 corresponding to the N pole in the first direction (X-axis direction), the electromagnetic force DEM3 may act in the third direction (Z-axis direction) according to the interaction of the electromagnetic force (e.g., Fleming's left-hand rule). Therefore, since the 2-1 coil 1152$b$1 is coupled to the housing and the position thereof is fixed, the upper portion of the holder may move in the direction opposite to the third direction (Z-axis direction) by the electromagnetic force DEM3.

In addition, in an embodiment, when the magnetic forces DM3 and DM4 may be applied from the N pole of the second magnet in the second direction (Y axis direction) and the current DE4 flows from the 2-2 coil 1152$b$2 corresponding to the N pole in the first direction (X-axis direction), the electromagnetic force DEM4 may act in the third direction (Z-axis direction) according to the interaction of the electromagnetic force. At this time, since the 2-2 coil 1152$b$2 is in a state of being fixed to the side portion of the housing, the lower portion of the holder may move in the direction opposite to the third direction (Z-axis direction) by the electromagnetic force DEM4.

Therefore, the X-axis tilting may be performed by the electromagnetic forces DEM1 to DEM4. In other words, an OIS can be implemented by the rotation in the second direction (Y-axis direction).

An OIS can be implemented by tilting or rotating (or the X-axis tilting) the mover 1130 in the Y-axis direction.

In an embodiment, the first magnet and the second magnet disposed in the holder 113, along 1 with the first coil part 1152$a$ and the second coil part 1152$b$, respectively, may form the electromagnetic force to tilt or move the tilting guide part and the mover 1130 in the second direction (Y-axis direction).

The tilting guide part 1141 may rotate or tilt (X-axis tilting) in the second direction about the first protrusion PR1, which is the reference axis (or the rotation axis).

For example, the mover 1130 may move (move in the left-right direction) toward the side portion of the housing (particularly, move toward the second housing side portion). In addition, OIS can be implemented by rotating (Y1→>Y1$a$(Y1$b$)) the mover 1130 in the Y-axis direction by the third operation. The second angle θ may be in a range of ±1° to ±3°. However, the present invention is not limited thereto.

Figure 29:
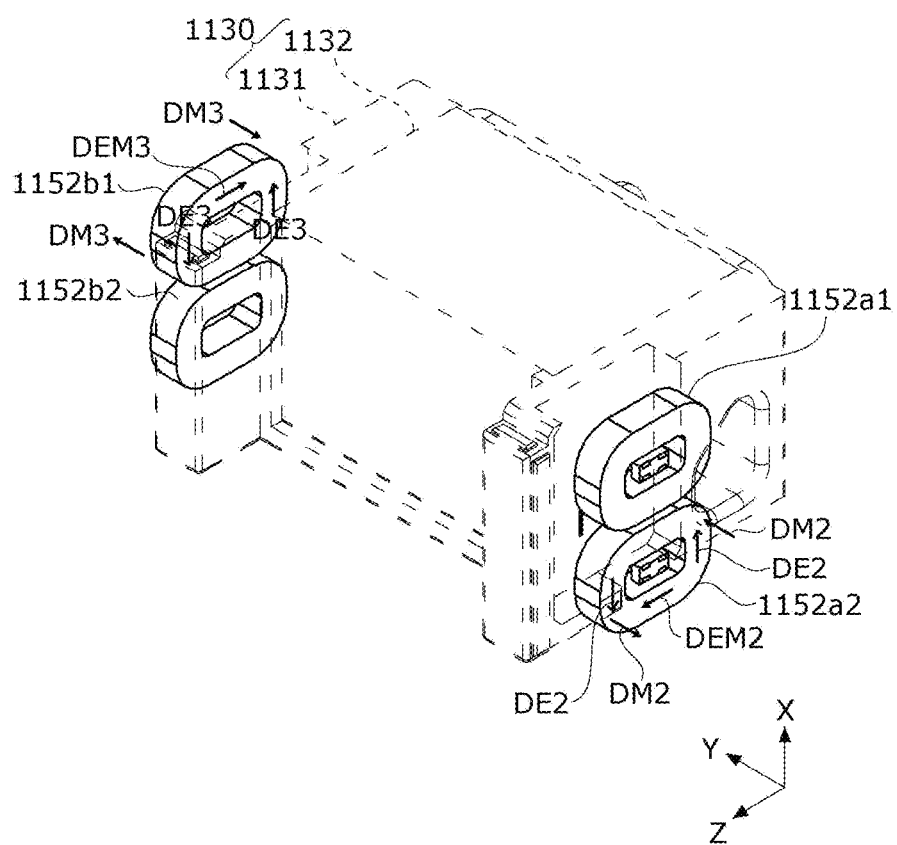
FIG. 29 is a view showing fifth driving of the driving coil according to the embodiment.
Figure 30:
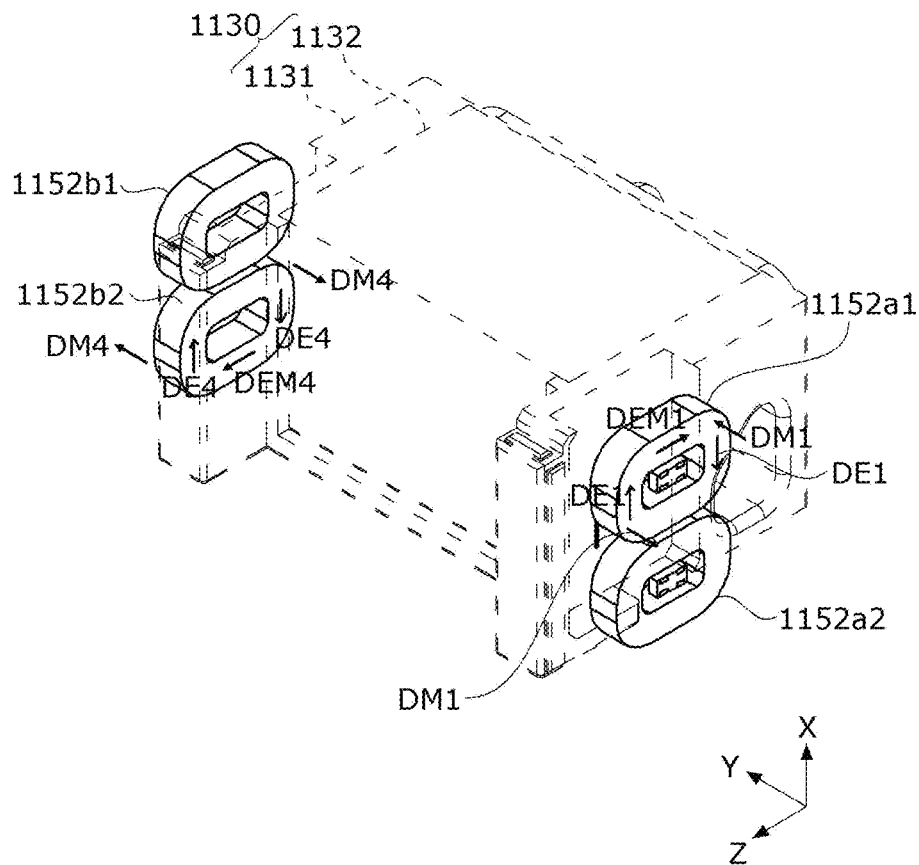
FIG. 30 is a view showing sixth driving of the driving coil according to the embodiment.

FIG. 29 is a view showing fifth driving of the driving coil according to the embodiment, and FIG. 30 is a view showing sixth driving of the driving coil according to the embodiment.

Referring to FIG. 29, in an embodiment, when the magnetic force DM2 may be applied from the N pole of the first magnet in the direction opposite to the second direction (Y-axis direction) and the current DE2 flows from the 1-2 coil 1152$a$2 corresponding to the N pole in the direction opposite to the first direction (X-axis direction), the electromagnetic force DEM2 may act in the Z-axis direction according to the interaction of the electromagnetic force. At this time, since the 1-2 coil 1152$a$2 is fixed to the side portion of the housing, the lower portion of the holder may move in the direction opposite to the third direction (Z-axis direction) by the electromagnetic force DEM2.

In addition, in an embodiment, when the magnetic force DM3 may be applied from the N pole of the second magnet in the second direction (Y-axis direction) and the current DE3 flows from the 2-1 coil 1152$b$1 corresponding to the N pole in the direction opposite to the first direction (X-axis direction), the electromagnetic force DEM3 may act in the direction opposite to the third direction (Z-axis direction) according to the interaction of the electromagnetic force (e.g., Fleming's left hand rule). Therefore, since the 2-1 coil 1152$b$1 is coupled to the housing and the position thereof is fixed, the upper portion of the holder may move in the third direction (Z-axis direction) by the electromagnetic force DEM3.

Therefore, the Y-axis tilting may be performed by the electromagnetic forces DEM2 and DEM3. In other words, an OIS can be implemented by the rotation (diagonal rotation) in the first direction and the second direction. In other words, diagonal tilting can be performed more easily.

Referring to FIG. 30, in an embodiment, when the magnetic force DM1 may be applied from the N pole of the first magnet in the direction opposite to the second direction (Y-axis direction) and the current DE1 flows from the 1-1 coil 1152$a$1 corresponding to the N pole in the first direction (X-axis direction), the electromagnetic force DEM1 may act in the direction opposite to the third direction (Z-axis direction) according to the interaction of the electromagnetic force (e.g., Fleming's left-hand rule). Therefore, since the 1-1 coil 1152$a$1 is coupled to the housing and the position thereof is fixed, the upper portion of the holder may move in the third direction (Z-axis direction) by the electromagnetic force DEM1.

In addition, in an embodiment, when the magnetic force DM4 may be applied from the N pole of the second magnet in the second direction (Y-axis direction) and the current DE4 flows from the 2-2 coil 1152$b$2 corresponding to the N pole in the first direction (X-axis direction), the electromagnetic force DEM4 may act in the third direction (Z-axis direction) according to the interaction of the electromagnetic force. At this time, since the 2-2 coil 1152$b$2 is fixed to the side portion of the housing, the lower portion of the holder may move in the direction opposite to the third direction (Z-axis direction) by the electromagnetic force DEM4.

The mover may move along the first axis, move along the second axis, or move along the first axis and the second axis by the above-described first to sixth operations.

Furthermore, as in the first driving part according to another embodiment, the description of the first coil part and the second coil part may also be applied to the first driving part according to the embodiment in the same manner. In other words, the first camera actuator according to the embodiment shown in FIG. 5 may also include the first coil part having the 1-1 coil and the 1-2 coil and the second coil part having the 2-1 coil and the 2-2 coil. Furthermore, the description of the driving described with reference to FIGS. 19 to 30 may also be applied to the first camera actuator according to the embodiment (see FIGS. 4 and 5) in the same manner.

Figure 31:
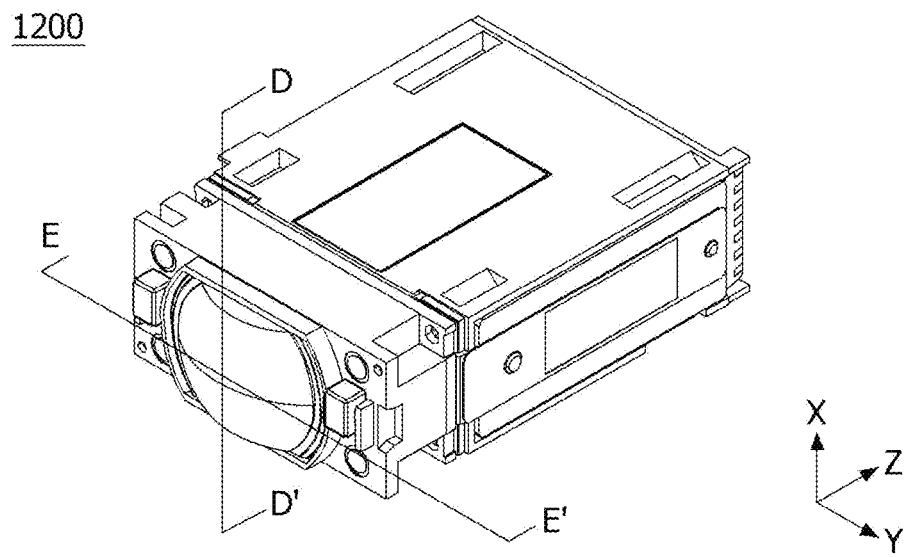
FIG. 31 is a perspective view of a second camera actuator according to an embodiment.
Figure 32:
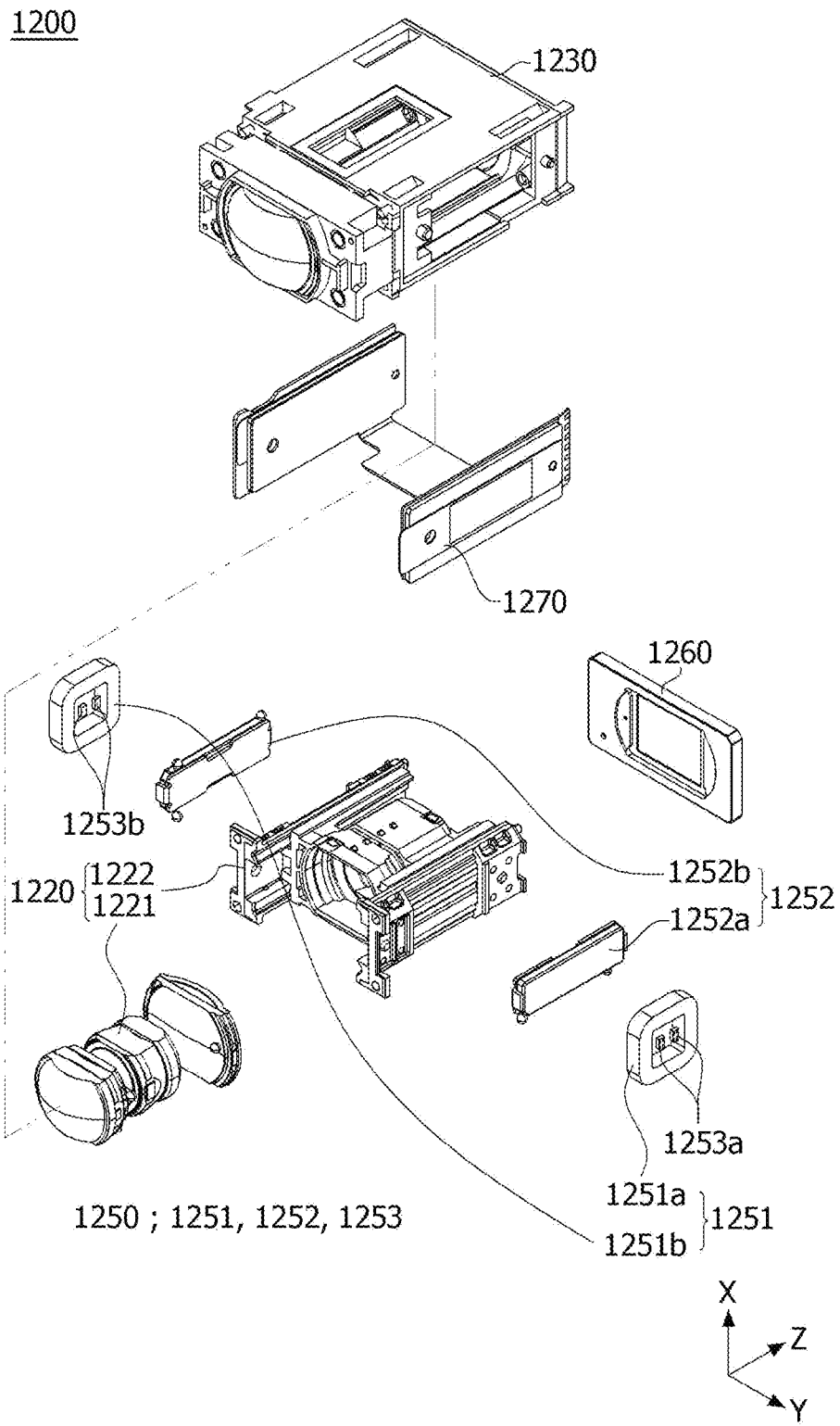
FIG. 32 is an exploded perspective view of the second camera actuator according to the embodiment.
Figure 33:
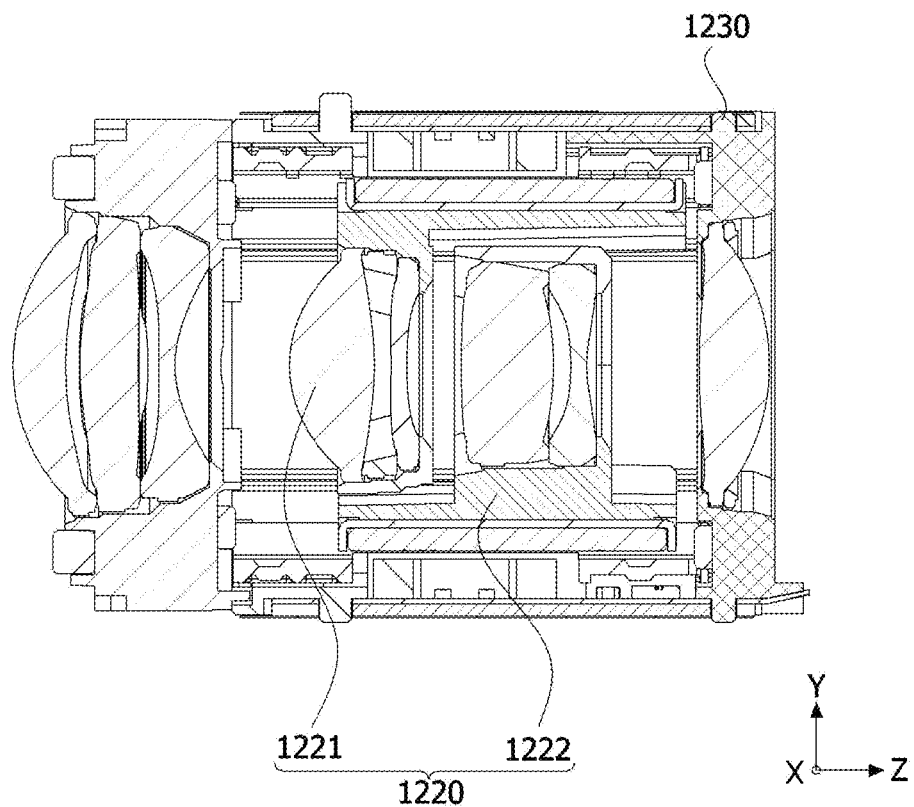
FIG. 33 is a cross-sectional view along line D-D' in FIG. 31.
Figure 34:
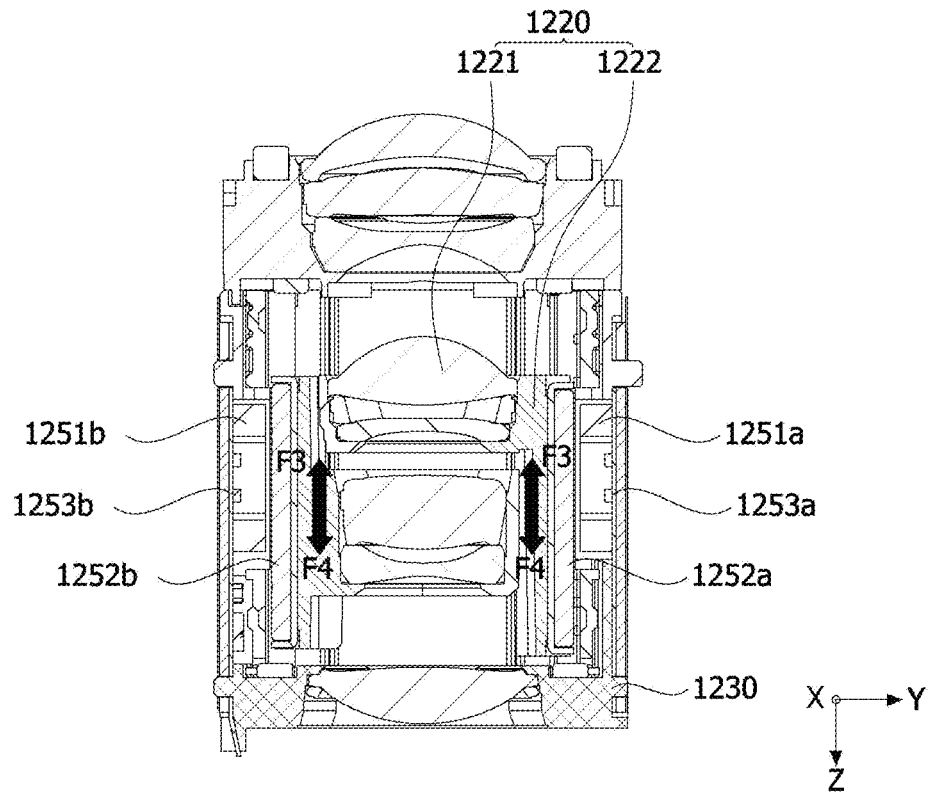
FIG. 34 is a cross-sectional view along line E-E' in FIG. 31.

FIG. 31 is a perspective view of a second camera actuator according to an embodiment, FIG. 32 is an exploded perspective view of the second camera actuator according to the embodiment, FIG. 33 is a cross-sectional view along line D-D' in FIG. 31, and FIG. 34 is a cross-sectional view along line E-E' in FIG. 31.

Referring to FIGS. 31 to 34, a second camera actuator 1200 according to the embodiment may include a lens part 1220, a second housing 1230, a second driving part 1250, a base part (not shown), and a second board part 1270. Furthermore, the second camera actuator 1200 may further include a second shield can (not shown), an elastic part (not shown), and a bonding member (not shown). Furthermore, the second camera actuator 1200 according to the embodiment may further include an image sensor IS.

The second shield can (not shown) may be positioned in one region (e.g., an outermost side) of the second camera actuator 1200 and positioned to surround components (the lens part 1220, the second housing 1230, the elastic part (not shown), the second driving part 1250, the base part (not shown), the second board part 1270, and the image sensor (IS)) to be described below.

The second shield can (not shown) may block or reduce electromagnetic waves generated from the outside. Therefore, it is possible to reduce the occurrence of a malfunction of the second driving part 1250.

The lens part 1220 may be positioned in the second shield can (not shown). The lens part 1220 may move in the third direction (Z-axis direction). Therefore, the AF function described above may be performed.

Specifically, the lens part 1220 may include a lens assembly 1221 and a bobbin 1222.

The lens assembly 1221 may include one or more lenses. In addition, a plurality of lens assemblies 1221 may be present, but the following description will be given on the basis of one lens assembly.

The lens assembly 1221 may be coupled to the bobbin 1222 and may move in the third direction (Z-axis direction) by electromagnetic forces generated from a fourth magnet 1252*a* and a second magnet 1252*b* coupled to the bobbin 1222.

The bobbin 1222 may include an opening region surrounding the lens assembly 1221. In addition, the bobbin 1222 may be coupled to the lens assembly 1221 by various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to the elastic parts (not shown) on upper and rear ends thereof. Therefore, the bobbin 1222 may be supported by the elastic part (not shown) while moving in the third direction (Z-axis direction). In other words, as the position of the bobbin 1222 is maintained, the bobbin 1222 may be maintained in the third direction (Z-axis direction). The elastic part (not shown) may be formed as a leaf spring.

The second housing 1230 may be disposed between the lens part 1220 and the second shield can (not shown). In addition, the second housing 1230 may be disposed to surround the lens part 1220.

A hole may be formed in a side portion of the second housing 1230. A fourth coil 1251*a* and a fifth coil 1251*b* may be disposed in the hole. The hole may be positioned to correspond to the groove of the bobbin 1222 described above.

The fourth magnet 1252*a* may be positioned to face the fourth coil 1251*a*. In addition, the second magnet 1252*b* may be positioned to face the fifth coil 1251*b*.

The elastic part (not shown) may include a first elastic member (not shown) and a second elastic member (not shown). The first elastic member (not shown) may be coupled to an upper surface of the bobbin 1222. The second elastic member (not shown) may be coupled to a lower surface of the bobbin 1222. In addition, the first elastic member (not shown) and the second elastic member (not shown) may be formed as the leaf spring as described above.

In addition, the first elastic member (not shown) and the second elastic member (not shown) may provide elasticity for the movement of the bobbin 1222.

The second driving part 1250 may provide driving forces F3 and F4 for moving the lens part 1220 in the third direction (Z-axis direction). The second driving part 1250 may include a second driving coil 1251 and a second driving magnet 1252.

The lens part 1220 may move in the third direction (Z-axis direction) by an electromagnetic force formed between the second driving coil 1251 and the second driving magnet 1252.

The second driving coil 1251 may include the fourth coil 1251*a* and the fifth coil 1251*b*. The fourth coil 1251*a* and the fifth coil 1251*b* may be disposed in the hole formed on the side portion of the second housing 1230. In addition, the fourth coil 1251*a* and the fifth coil 1251*b* may be electrically connected to the second board part 1270. Therefore, the fourth coil 1251*a* and the fifth coil 1251*b* may receive a current or the like through the second board part 1270.

The second driving magnet 1252 may include the fourth magnet 1252*a* and the fifth magnet 1252*b*. The fourth magnet 1252*a* and the fifth magnet 1252*b* may be disposed in the groove of the bobbin 1222 described above and positioned to correspond to the fourth coil 1251*a* and the fifth coil 1251*b*.

The base part (not shown) may be positioned between the lens part 1220 and the image sensor IS. A component such as a filter may be fixed to the base part (not shown). In addition, the base part (not shown) may be disposed to surround the image sensor IS. With this configuration, the image sensor IS can be free from foreign substances or the like, thereby improving the reliability of the device.

In addition, the second camera actuator may be a zoom actuator or an AF actuator. For example, the second camera actuator may support one lens or a plurality of lenses and perform an auto focusing function or a zoom function by moving the lens according to a control signal from a predetermined control part.

In addition, the second camera actuator may be a fixed zoom or a continuous zoom. For example, the second camera actuator may provide the movement of the lens assembly 1221.

In addition, the second camera actuator may include a plurality of lens assemblies. For example, at least one of a first lens assembly (not shown), a second lens assembly (not shown), a third lens assembly (not shown), and a guide pin (not shown) may be disposed in the second camera actuator. The above description may be applied to a description thereof. Therefore, the second camera actuator may perform a high-magnification zoom function through the driving part. For example, the first lens assembly (not shown) and the second lens assembly (not shown) may be moving lenses that move through the driving part and the guide pin (not shown), and the third lens assembly (not shown) may be a fixed lens, but the present invention is not limited thereto. For example, the third lens assembly (not shown) may perform a function of a focator by which light forms an image at a specific position, and the first lens assembly (not shown) may perform a function of a variator for re-forming an image formed by the third lens assembly (not shown), which is the focator, at another position. Meanwhile, the first lens assembly (not shown) may be in a state in which a magnification change is large because a distance to a subject or an image distance is greatly changed, and the first lens assembly (not shown), which is the variator, may play an important role in a focal length or magnification change of the optical system. Meanwhile, imaging points of an image formed by the first lens assembly (not shown), which is the variator, may be slightly different depending on a position. Therefore, the second lens assembly (not shown) may perform a position compensation function for the image formed by the variator. For example, the second lens assembly (not shown) may perform a function of a compensator for accurately forming an image at an actual position of the image sensor using the imaging points of the image formed by the first lens assembly (not shown) which is the variator.

The image sensor IS may be positioned on an inner side or outer side of the second camera actuator. In an embodiment, as shown, the image sensor IS may be positioned on the inner side of the second camera actuator. The image sensor IS may receive light and convert the received light into an electrical signal. In addition, the image sensor IS may include a plurality of pixels in an array form. In addition, the image sensor IS may be positioned on the optical axis.

Figure 35:
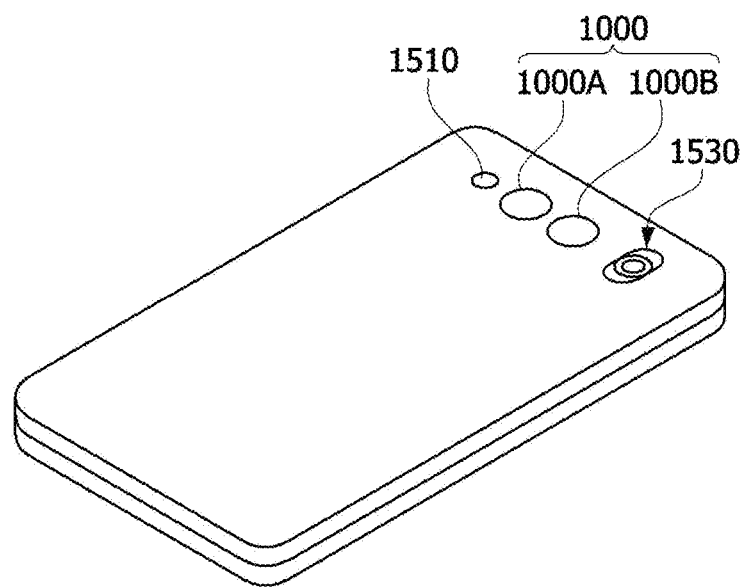
FIG. 35 is a perspective view of a mobile terminal to which the camera module according to the embodiment is applied.

FIG. 35 is a perspective view of a mobile terminal to which the camera module according to the embodiment is applied.

As shown in FIG. 35, a mobile terminal 1500 of the embodiment may include a camera module 1000, a flash module 1530, and an auto focus device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display part and stored in a memory. A camera (not shown) may also be disposed on a front surface of a body of the mobile terminal.

For example, the camera module 1000 may include a first camera module 1000A and a second camera module 1000B, and the first camera module 1000A may implement OIS along with an AF or zoom function. In addition, the AF, zoom, and OIS functions may be performed by the second camera module 1000b. In this case, since the first camera module 1000A includes both of the first camera actuator and the second camera actuator described above, the camera device or the camera module can be easily miniaturized by changing an optical path.

The flash module 1530 may include a light emitting device for emitting light therein. The flash module 1530 may be operated by an operation of a camera of the mobile terminal or a user's control.

The auto focus device 1510 may include one of the packages of a surface light emitting laser device as a light emitting part.

The auto focus device 1510 may include the AF function using a laser. The auto focus device 1510 may be mainly used in a condition in which the AF function using the image of the camera module 1000 is degraded, for example, a proximity of 10 m or less or a dark environment.

The auto focus device 1510 may include a light emitting part including a vertical cavity surface emitting laser (VCSEL) semiconductor device and a light receiving part, such as a photodiode, for converting light energy into electrical energy.

Figure 36:
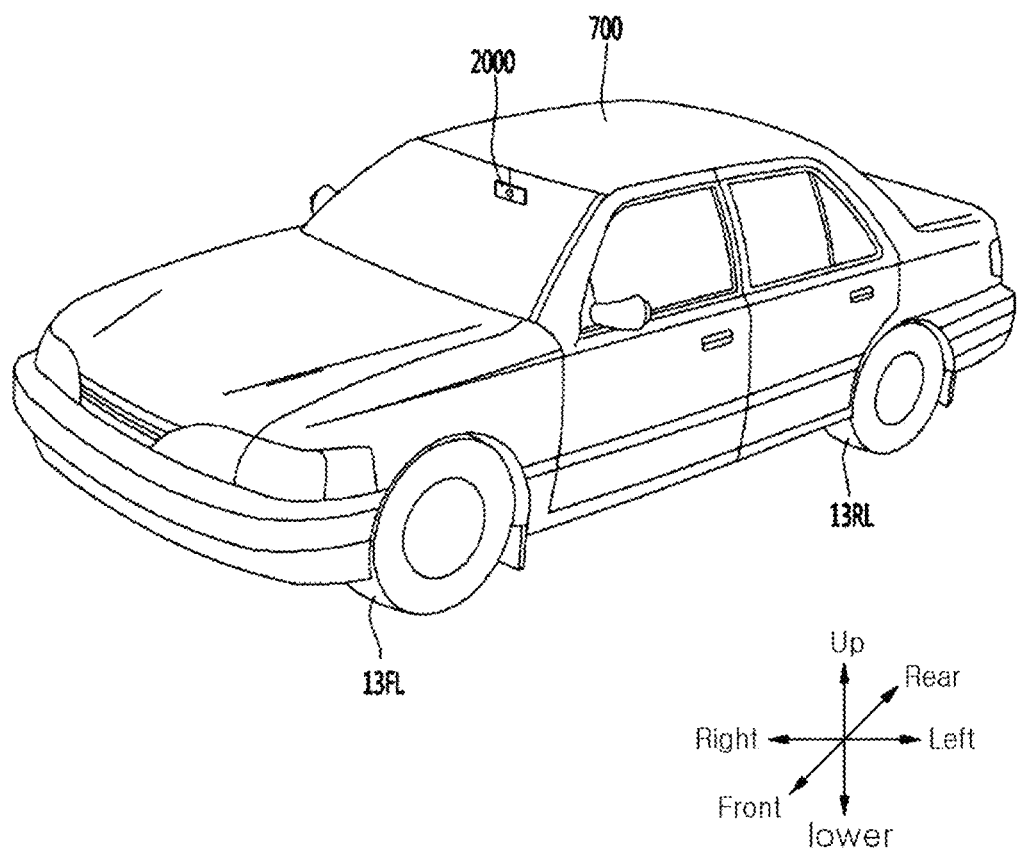
FIG. 36 is a perspective view of a vehicle to which the camera module according to the embodiment is applied.

FIG. 36 is a perspective view of a vehicle to which the camera module according to the embodiment is applied.

For example, FIG. 36 is an external view of a vehicle equipped with a vehicle driver assistance system to which the camera module 1000 according to the embodiment is applied.

Referring to FIG. 36, a vehicle 700 in the embodiment may include wheels 13FL and 13FR rotated by a power source and a predetermined sensor. The sensor may be a camera sensor 2000, but the present disclosure is not limited thereto.

The camera sensor 2000 may be a camera sensor to which the camera module 1000 according to the embodiment is applied. The vehicle 700 in the embodiment may acquire image information through the camera sensor 2000 for capturing a front image or a surrounding image, determine a situation in which a lane line is not identified using the image information, and generate a virtual lane line when the lane line is not identified.

For example, the camera sensor 2000 may acquire a front image by capturing a view in front of the vehicle 700, and a processor (not shown) may acquire image information by analyzing an object included in the front image.

For example, when objects, such as a median, a curb, or a street tree corresponding to a lane line, an adjacent vehicle, a traveling obstacle, and an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process a still image or a moving image obtained by the image sensor (e.g., a complementary metal-oxide semiconductor (CMOS) or a charge-coupled device (CCD)).

The image processing module may process the still image or moving image acquired through the image sensor to extract necessary information, and transmit the extracted information to the processor.

At this time, the camera sensor 2000 may include a stereo camera for improving the measurement accuracy of the object and further securing information such as a distance between the vehicle 700 and the object, but the present disclosure is not limited thereto.

Although embodiments have been mainly described above, these are only illustrative and do not limit the present disclosure, and those skilled in the art to which the present disclosure pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present disclosure defined in the appended claims.

The invention claimed is:

1. A camera actuator comprising:
a housing;
a mover disposed in the housing and including an optical member;
a tilting guide part configured to guide tilting of the mover; and
a driving part disposed in the housing and configured to drive the mover,
wherein the driving part includes at least one magnet and at least one coil, and
wherein at least a portion of the at least one magnet overlaps the tilting guide part in a first direction perpendicular to an optical axis or in a second direction perpendicular to the optical axis.

2. The camera actuator of claim 1, wherein the mover includes a holder on which the optical member is seated, and
wherein the holder includes a first holder outer surface, a second holder outer surface facing the first holder outer surface, and a third holder outer surface disposed on a lower portion of the holder between the first holder outer surface and the second holder outer surface.

3. The camera actuator of claim 2, wherein the at least one magnet includes:
a first magnet disposed on the first holder outer surface; and
a second magnet disposed on the second holder outer surface, and
wherein the first magnet and the second magnet overlap in the second direction.

4. The camera actuator of claim 3, wherein the tilting guide part includes a base, a first protrusion protruding from a first surface of the base, and a second protrusion protruding from a second surface of the base, and
wherein the first protrusion is disposed between the mover and the base.

5. The camera actuator of claim 4, wherein the first protrusion overlaps the first magnet and the second magnet in the second direction.

6. The camera actuator of claim 4, wherein at least a portion of the base overlaps the first magnet and the second magnet in the second direction.

7. The camera actuator of claim 4, wherein the at least one magnet includes a third magnet disposed on the third holder outer surface, and
wherein at least a portion of the third magnet overlaps the first protrusion in the first direction.

8. The camera actuator of claim 1, wherein the mover includes a holder coupled to the optical member and a fastening member coupled to the holder,
wherein the fastening member passes through one side portion of the housing and includes a first groove disposed in an inner surface thereof, and
wherein the housing includes a second groove disposed in an outer surface of the one side portion of the housing.

9. The camera actuator of claim 8, further-comprising:
a first magnetic substance disposed in the first groove; and
a second magnetic substance disposed in the second groove.

10. The camera actuator of claim 9, wherein the tilting guide part is in close contact with the one side portion of the housing and the holder by a repulsive force between the first magnetic substance and the second magnetic substance.

11. A camera actuator comprising:
a mover including a reflective member;
a tilting guide part configured to guide tilting of the mover; and
a driving part configured to drive the mover,
wherein the driving part includes at least one magnet and at least one coil, and
at least a portion of the driving part overlaps the tilting guide part in a direction perpendicular to an optical axis.

12. The camera actuator of claim 11, wherein the mover includes a holder on which the reflective member is seated, and
wherein the holder includes a first holder outer surface, a second holder outer surface facing the first holder outer surface, and a third holder outer surface disposed on a lower portion of the holder between the first holder outer surface and the second holder outer surface.

13. The camera actuator of claim 12, wherein the at least one magnet includes a first magnet disposed adjacent to the first holder outer surface and a second magnet disposed on the second holder outer surface,
wherein the at least one coil includes a first coil corresponding to the first magnet and a second coil corresponding to the second magnet,
wherein the first magnet and the second magnet overlap in a second direction, and
wherein the first coil and the second coil overlap in the second direction.

14. The camera actuator of claim 13, wherein the tilting guide part includes a base, a first protrusion protruding from a first surface of the base, and a second protrusion protruding from a second surface of the base, and
wherein the first protrusion is disposed between the mover and the base.

15. The camera actuator of claim 14, wherein the first protrusion overlaps the first magnet, the second magnet, the first coil, and the second coil in the second direction.

16. The camera actuator of claim 14, wherein at least a portion of the base overlaps the first magnet, the second magnet, the first coil, and the second coil in the second direction.

17. The camera actuator of claim 14, wherein the at least one magnet includes a third magnet disposed adjacent to the third holder outer surface, and
wherein at least a portion of the third magnet overlaps the first protrusion in the direction perpendicular to the optical axis.

18. The camera actuator of claim 17, wherein the at least one coil includes a third coil corresponding to the third magnet, and
wherein at least a portion of the third coil overlaps the first protrusion in a first direction.

19. A camera actuator comprising:
a mover including a reflective member;
a tilting guide part configured to guide tilting of the mover; and
a magnet or a coil disposed on the mover,
wherein the mover includes a first sidewall on which the magnet or the coil is disposed and a second sidewall disposed perpendicular to the first sidewall and including a cavity in which the tilting guide part is disposed, and
wherein at least a portion of the cavity overlaps at least a portion of the magnet or the coil in a direction perpendicular to an optical axis.

20. The camera actuator of claim 19, wherein at least a portion of the tilting guide part is in contact with the at least a portion of the cavity.

* * * * *